United States Patent
Katoh

(10) Patent No.: US 9,995,534 B2
(45) Date of Patent: Jun. 12, 2018

(54) HEAT EXCHANGER

(71) Applicant: DENSO CORPORATION, Kariya, Aichi-pref. (JP)

(72) Inventor: Yoshiki Katoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 775 days.

(21) Appl. No.: 14/360,861

(22) PCT Filed: Nov. 28, 2012

(86) PCT No.: PCT/JP2012/007625
§ 371 (c)(1),
(2) Date: May 27, 2014

(87) PCT Pub. No.: WO2013/080532
PCT Pub. Date: Jun. 6, 2013

(65) Prior Publication Data
US 2014/0318749 A1    Oct. 30, 2014

(30) Foreign Application Priority Data

Nov. 29, 2011   (JP) .................................. 2011-260522
Nov. 14, 2012   (JP) .................................. 2012-250501

(51) Int. Cl.
*F28D 1/04*   (2006.01)
*F28F 9/02*   (2006.01)
(Continued)

(52) U.S. Cl.
CPC ........ *F28D 1/0408* (2013.01); *B60H 1/00328* (2013.01); *B60H 1/00921* (2013.01);
(Continued)

(58) Field of Classification Search
CPC ........ F28F 9/027; F28F 9/0278; F28F 9/0221; F28F 9/0229; F28F 9/22; F28F 2009/222;
(Continued)

(56) References Cited

U.S. PATENT DOCUMENTS 5,152,339 A * 10/1992 Calleson ............. F28D 1/05391
  165/173
6,827,139 B2 * 12/2004 Kawakubo ............ F28D 1/0476
  165/173
(Continued)

FOREIGN PATENT DOCUMENTS

DE  102004044861 A1    3/2006
DE  102005059920    *  6/2007 ........... F28D 1/0476
(Continued)

OTHER PUBLICATIONS

International Search Report and Written Opinion of the International Searching Authority for PCT/JP2012/007625 (in Japanese with English translations), dated Jan. 15, 2013; ISA/JP.

*Primary Examiner* — Jianying Atkisson
*Assistant Examiner* — For K Ling
(74) *Attorney, Agent, or Firm* — Harness, Dickey & Pierce, P.L.C.

(57) ABSTRACT

In a heat exchanger, a second fluid flowing space communicating with second tubes is formed to be divided from a first tank space within a tank unit forming a first tank space that collects or distributes a refrigerant. The tank unit is defrosted by a coolant flowing in the second fluid flowing space, which is higher in temperature than the refrigerant flowing in the first tank space. With this configuration, heat from the second fluid flowing in the second fluid flowing space included in the tank unit is effectively transferred to a portion of the tank unit which is likely to be frosted.

21 Claims, 26 Drawing Sheets

(51) Int. Cl.
  *F28D 1/053* (2006.01)
  *B60H 1/00* (2006.01)
  *F28D 1/02* (2006.01)

(52) U.S. Cl.
  CPC ......... *F28D 1/0246* (2013.01); *F28D 1/0452* (2013.01); *F28D 1/05391* (2013.01); *F28F 9/0278* (2013.01)

(58) Field of Classification Search
  CPC .............. F28F 2009/224; F28D 1/0435; F28D 1/05391; F28D 1/0426; F28D 1/0408; F28D 1/0147; F28D 1/0443
  USPC ......................................... 165/140, 173, 174
  See application file for complete search history.

(56) References Cited

U.S. PATENT DOCUMENTS

| | | | |
|---|---|---|---|
| 6,986,385 B1 | 1/2006 | Gilles et al. | |
| 9,410,745 B2 | 8/2016 | Katoh | |
| 9,625,214 B2 | 4/2017 | Katoh | |
| 2003/0188857 A1 | 10/2003 | Kawakubo et al. | |
| 2004/0060316 A1* | 4/2004 | Ito | B60H 1/00328 62/324.1 |
| 2005/0217838 A1* | 10/2005 | Katoh | F28F 17/005 165/176 |
| 2008/0028788 A1* | 2/2008 | Higashiyama | F25B 39/02 62/515 |
| 2008/0314076 A1* | 12/2008 | Ichiyanagi | F25B 9/008 62/513 |
| 2009/0126920 A1* | 5/2009 | Demuth | F28D 1/0478 165/173 |
| 2009/0229800 A1 | 9/2009 | Bhatti et al. | |
| 2010/0186934 A1 | 7/2010 | Bellenfant et al. | |
| 2010/0319894 A1 | 12/2010 | Biver et al. | |
| 2012/0199327 A1* | 8/2012 | Gaiser | F28D 1/05341 165/160 |
| 2013/0061631 A1 | 3/2013 | Katoh | |

FOREIGN PATENT DOCUMENTS

| | | |
|---|---|---|
| EP | 1108575 A1 | 6/2001 |
| EP | 2090851 A1 | 8/2009 |
| JP | H0330068 U | 3/1991 |
| JP | H0433860 U | 3/1992 |
| JP | 11157326 A | 6/1999 |
| JP | 2000-062446 A | 2/2000 |
| JP | 2001055036 A | 2/2001 |
| JP | 2004003810 A | 1/2004 |
| JP | 2004205056 A | 7/2004 |
| JP | 2008151396 A | 7/2008 |
| JP | 4193741 B2 | 12/2008 |
| JP | 4239121 B2 | 3/2009 |
| JP | 2010-038378 A | 2/2010 |
| JP | 2010175241 A | 8/2010 |
| JP | 2012007821 A | 1/2012 |
| WO | WO-2013080534 A1 | 6/2013 |
| WO | WO-2013080535 A1 | 6/2013 |

* cited by examiner

HEAT EXCHANGER

CROSS REFERENCE TO RELATED APPLICATIONS

This application is a U.S. National Phase Application under 35 U.S.C. 371 of International Application No. PCT/JP2012/007625, filed on Nov. 28, 2012 and published in Japanese as WO/2013/080532 A1 on Jun. 6, 2013. This application is based on Japanese Patent Applications No. 2011-260522 filed on Nov. 29, 2011, and No. 2012-250501 filed on Nov. 14, 2012. The disclosures of all of the above applications are incorporated herein by reference.

TECHNICAL FIELD

The present disclosure relates to a combined heat exchanger configured to enable heat exchange among three types of fluids.

BACKGROUND ART

Conventionally, a combined heat exchanger configured to enable heat exchange among three types of fluids has been known. For example, a heat exchanger disclosed in Patent Document 1 is a combined heat exchanger configured to enable both heat exchange between a refrigerant of a refrigeration cycle device and a vehicle exterior air (outside air) and heat exchange between the refrigerant and a coolant that cools an engine.

Specifically, the heat exchanger of this Patent Document 1 is configured such that multiple linear refrigerant tubes each having both ends connected to refrigerant tanks that collect and distribute refrigerant is stacked, a heat pipe having one end connected to a coolant tank through which a coolant flows is arranged in parallel to the refrigerant tubes between the respective stacked refrigerant tubes, and fins for promotion of heat exchange are arranged in outside air passages formed between the refrigerant tubes and the heat pipe.

In the refrigeration cycle device of Patent Document 1, when the combined heat exchanger is permitted to function as an evaporator that allows the refrigerant to absorb a heat of an outside air and a heat (that is, waste heat of the engine) of the coolant to evaporate the refrigerant, frost formation of the heat exchanger is suppressed by the heat waste of the engine which is transmitted from the heat pipe.

PRIOR ART DOCUMENT

Patent Document

Patent Document 1: JP-A-11-157326

SUMMARY OF THE INVENTION

According to the present inventors' study, in the conventional art, attention is paid to melt frost generated in the vicinity of an outer surface of first tubes (refrigerant tubes), but frost generated on outer surfaces of collection/distribution tank units (refrigerant tanks) for distributing a first fluid (refrigerant) to the first tubes, or collecting the first fluid from the first tubes may not be sufficiently considered.

The frost thus generated on the outer surface of the tank units not only causes the discharge of melted water obtained by melting the frost generated on the outer surface of the tubes to be blocked, but also may cause the melted water to be refrozen.

An object of the present disclosure is to provide a heat exchanger that is likely to defrost the tank units.

To achieve the above-described object, according to a first example of the present disclosure, a heat exchanger includes: a first heat exchange portion including first tubes through which a first fluid flows, and performing heat exchange between the first fluid and a third fluid flowing on peripheries of the first tubes; a second heat exchange portion including second tubes through which a second fluid flows, and performing heat exchange between the second fluid and the third fluid flowing on peripheries of the second tubes; a tank portion forming a first tank space communicating with the first tubes to collect the first fluid from the first tubes or distribute the first fluid to the first tubes; a third fluid passage through which the third fluid flows; and an outer fin. At least one of the first tubes is arranged between the second tubes, and at least one of the second tubes is arranged between the first tubes. The third fluid passage is formed between the first tubes and the second tubes. The outer fin is arranged in the third fluid passage, promotes heat exchange in the first and second heat exchange portions, and enables heat transfer between the first fluid flowing through the first tubes and the second fluid flowing through the second tubes. The tank portion includes therein a second fluid flowing space communicating with the second tubes, and the second fluid flowing space is partitioned from the first tank space. The second fluid flowing space is positioned adjacent in a stack direction of the first and second tubes to a connection portion of the tank portion which is connected to the first tubes. The tank portion is defrosted by the second fluid that flows in the second fluid flowing space and is higher in temperature than the first fluid flowing in the first tank space.

According to the above configuration, since heat from the second fluid within the second fluid flowing space included in the tank unit is effectively transferred to a portion of the tank unit which is likely to be frosted, the defrosting of the tank unit can be promoted. When the tank unit is defrosted, since the second fluid within the second fluid flowing space functions as a heat source that conducts defrosting, a temperature of the second fluid is, for example, equal to or higher than 0° C. On the other hand, since a temperature of the first fluid causes frosting, the temperature is, for example, 0° C. or lower.

According to a second example of the present disclosure, in the heat exchanger of the above-described first example, the second fluid flowing space may be formed so that the second fluid flows in contact with an outer wall of the tank portion.

With the above configuration, the heat transfer from the second fluid toward the outer wall of the tank unit can be improved to further promote the defrosting of the tank unit.

According to a third example of the present disclosure, in the heat exchanger of the above-described first or second example, leading ends of the second tubes may protrude into the second fluid flowing space. The second fluid flowing space may include a second tube adjacent space adjacent to the leading ends of the second tubes in the stack direction of the first and second tubes. The second tube adjacent space may be defined by the outer wall of the tank portion between the first tubes and the second tubes which are adjacent to each other so that the second fluid flowing in the second tube adjacent space comes into contact with the outer wall of the tank portion.

With the above configuration, the heat from the second fluid within the second fluid flowing space can be efficiently transferred to a portion of the outer wall of the tank unit which is likely to be frosted.

According to a fourth example of the present disclosure, in the heat exchanger of any one of the above-described first to third examples, the first tubes and the second tubes may be spaced apart from each other so that the second fluid within the second fluid flowing space is kept from directly contacting the first tubes.

With the above configuration, as compared with a configuration of the heat exchanger in which the second fluid within the second fluid flowing space comes in direct thermal contact with the first tubes, since the heat from the second fluid is hardly consumed by the first tubes, the heat from the second fluid can be efficiently transferred to the portion of the tank unit, which is likely to be frosted.

According to a fifth example of the present disclosure, in the heat exchanger of any one of the above-described first to fourth examples, the tank portion may include an intermediate plate member that partitions an internal space of the tank portion into the first tank space and the second fluid flowing space. The intermediate plate member may be provided with communication holes through which the first tubes communicate with the first tank space. Whether the first fluid flows into the first tubes and whether the second fluid flows into the second tubes may be determined on the basis of an arrangement of the communication holes in the intermediate plate member.

With the above configuration, which of the multiple tubes each of the first fluid and the second fluid is let flow in can be easily determined according to the configuration of the intermediate plate member.

According to a sixth example of the present disclosure, in the heat exchanger of any one of the above-described first to fourth examples, the tank portion may include an intermediate plate member that partitions an internal space of the tank portion into the first tank space and the second fluid flowing space. The intermediate plate member may include a tube side plate member and a partition plate member which are stacked on each other in a thickness direction of the intermediate plate member. The tube side plate member may be located to be nearer to the first tubes than the partition plate member. The tube side plate member may include through-holes, and the partition plate member may include through-holes. The through-holes of the partition plate member may overlap with a part of the through-holes of the tube side plate member in the thickness direction of the intermediate plate member. Whether the first fluid flows in the first tubes and whether the second fluid flows in the second tubes may be determined on the basis of an arrangement of the communication holes in the partition plate member.

According to a seventh example of the present disclosure, in the heat exchanger of any one of the above-described first to fourth examples, the second fluid flowing space may be arranged to be nearer to an exposed portion of the first tubes exposed to an exterior than the first tank space.

With the above configuration, the tank unit can be efficiently defrosted.

According to an eighth example of the present disclosure, in the heat exchanger of the above-described seventh example, the tank portion may include an intermediate plate member that partitions an internal space of the tank portion into the first tank space and the second fluid flowing space. The intermediate plate member may be provided with communication holes through which the first tubes communicate with the first tank space, and the first tubes may penetrate through the communication holes to communicate with the first tank space.

According to a ninth example of the present disclosure, in the heat exchanger of any one of the above-described first to eighth examples, a width of the second fluid flowing space may be larger than a width of the second tubes in a flow direction of the third fluid.

With the above configuration, since the heat of the second fluid is likely to be transferred to a large area of the tank unit, the defrosting of the tank unit can be further promoted.

According to a tenth example of the present disclosure, in the heat exchanger of any one of the above-described first to ninth examples, a width of the second fluid flowing space may be larger than a width of the second tubes in the stack direction of the first and second tubes.

With the above configuration, since the heat of the second fluid is likely to be transferred to the large area of the tank unit, the defrosting of the tank unit can be further promoted.

According to an eleventh example of the present disclosure, in the heat exchanger of any one of the above-described first to tenth examples, a width of the second fluid flowing space may be larger than a width of the first tank space in a flow direction of the third fluid.

With the above configuration, since the heat of the second fluid is likely to be transferred to the large area of the tank unit, the defrosting of the tank unit can be further promoted.

According to a twelfth example of the present disclosure, in the heat exchanger of any one of the above-described first to eleventh examples, the tank portion may form a second tank space that collects or distributes the second fluid flowing through the second tubes. The second fluid flowing space may be arranged between the second tank space and the second tubes.

According to a thirteenth example of the present disclosure, in the heat exchanger of the above-described twelfth example, a width of the second fluid flowing space may be smaller than a width of the second tank space in a flow direction of the third fluid.

With the above configuration, a width of the space in which the second fluid flows is sequentially reduced in the following order: the second tank space; the second fluid flowing space; and the second tube, and sequentially enlarged in the following order: the second tube; the second fluid flowing space; and the second tank space. For that reason, a pressure loss of the second fluid can be reduced. As a result, the basic performance of the exhaust heat recovery operation becomes improved, and the defrosting performance can be also improved.

According to a fourteenth example of the present disclosure, in the heat exchanger of the above-described twelfth or thirteenth example, the first tubes and the second tubes may be arranged in multiple rows in a flow direction of the third fluid, and the first tank space and the second tank space may be aligned in the flow direction of the third fluid.

According to a fifteenth example of the present disclosure, in the heat exchanger of the above-described fourteenth example, the first tank space may include a first fluid collection space that collects the first fluid, and a first fluid distribution space that distributes the first fluid. The first fluid collection space and the first fluid distribution space may be aligned in the stack direction of the first and second tubes. The second tank space may include a second fluid collection space that collects the second fluid, and a second fluid distribution space that distributes the second fluid. The second fluid collection space and the second fluid distribution space may be aligned in the stack direction of the first and second tubes.

With the above configuration, there is advantageous in that the external pipes connected to the heat exchanger are likely to be consolidated in one of core portions in which the first and second tubes are stacked on each other.

According to a sixteenth example of the present disclosure, in the heat exchanger of any one of the above-described first to eleventh examples, the first tubes may be arranged in multiple rows in a flow direction of the third fluid. The tank portion may form multiple first tank spaces along the flow direction of the third fluid.

According to a seventeenth example of the present disclosure, in the heat exchanger of the above-described sixteenth example, the second fluid flowing space may extend in the flow direction of the third fluid over the multiple first tank spaces.

According to the above configuration, the second fluid flowing space can be increased in the flow direction of the third fluid, and the second fluid flows along the flow direction of the third fluid in the second fluid flowing space. As a result, the heat conductivity can be improved.

According to an eighteenth example of the present disclosure, in the heat exchanger of any one of the above-described first to seventeenth examples, the first fluid and the second fluid may be heat media circulating in fluid circulation circuits different from each other.

According to a nineteenth example of the present disclosure, in the heat exchanger of any one of the above-described first to eighteenth examples, the heat exchanger may be used as an evaporator that evaporates a refrigerant in a refrigerant cycle of a vapor compression type. The first fluid may be a refrigerant of the refrigerant cycle, and the second fluid may be a heat medium which absorbs heat of an external heat source. The third fluid may be air.

According to the above configuration, even the evaporator (heat exchanger) is frosted when the refrigerant which is the first fluid is evaporated to exert a heat absorption action, defrosting can be conducted by the amount of heat provided in the heat medium which is the second fluid.

According to a twentieth example of the present disclosure, in the heat exchanger of any one of the above-described first to eighteenth examples, the heat exchanger may be applied to a vehicle cooling system. The first fluid may be a heat medium which absorbs heat of a first in-vehicle device that generates heat during actuation. The second fluid may be a heat medium which absorbs heat of a second in-vehicle device that generates heat during actuation. The third fluid may be air.

In this example, various in-vehicle devices that generate heat during actuation are mounted on the vehicle, and the amount of heat generation in those in-vehicle devices is changed according to a travel state (travel load) of the vehicle. Therefore, according to the twentieth example, the amount of heat of the in-vehicle devices large in the amount of heat generation can be radiated to not only air, but also to the in-vehicle device small in the amount of heat generation. As the in-vehicle devices that generate the heat during actuation, there are an engine (internal combustion engine), a travel electric motor, an inverter, and an electric device.

According to a twenty-first example of the present disclosure, a heat exchanger includes: a first heat exchange portion including first tubes through which a first fluid flows, and performing heat exchange between the first fluid and a third fluid flowing on peripheries of the first tubes; a second heat exchange portion including second tubes through which a second fluid flows, and performing heat exchange between the second fluid and the third fluid flowing on peripheries of the second tubes; a tank portion forming a first tank space that communicates with the first tubes and performs at least one of collection of the first fluid from the first tubes and distribution of the first fluid to the first tubes; a third fluid passage through which the third fluid flows; and an outer fin. At least one of the first tubes is arranged between the second tubes, and at least one of the second tubes is arranged between the first tubes. The third fluid passage is formed between the first tubes and the second tubes. The outer fin is arranged in the third fluid passage, promotes heat exchange in the first and second heat exchange portions, and enables heat transfer between the first fluid flowing through the first tubes and the second fluid flowing through the second tubes. The tank portion includes an outer wall component that configures an outer wall of the tank portion, and an intermediate plate member arranged within the outer wall component. The first tank space is defined by the outer wall component and the intermediate plate member and is located on an opposite side of the intermediate plate member to the first tubes. The intermediate plate member is provided with communication holes through which the first tank space communicates with the first tubes. A side surface portion of the intermediate plate member is provided with a protrusion contacting a side wall portion of the outer wall component. The side surface portion other than the protrusion and the side wall portion define therebetween a separation space that is separated from the first tank space by the intermediate plate member. The side wall portion other than a portion contacting the protrusion is provided with a recess concaved toward the separation space, or a notch notched toward the separation space.

According to the above configuration, since the recesses or notches formed in the outer wall of the tank unit function as the drain ditches, drainage performance of the melted water defrosted by the first heat exchanger can be improved.

Also, the recesses are concaved toward the separation space separated from the first tank space, and the notches are notched toward the separation space separated from the first tank space. With this configuration, the drain ditches can be formed in the outer wall of the tank unit without damaging sealing of the first tank space.

According to a twenty-second example of the present disclosure, A heat exchanger includes: a first heat exchange portion including first tubes through which a first fluid flows, and performing heat exchange between the first fluid and a third fluid flowing on peripheries of the first tubes; a second heat exchange portion including second tubes through which a second fluid flows, and performing heat exchange between the second fluid and the third fluid flowing on peripheries of the second tubes; a tank portion forming a first tank space that communicates with the first tubes and performs at least one of collection of the first fluid from the first tubes and distribution of the first fluid to the first tubes; a third fluid passage through which the third fluid flows; and an outer fin. At least one of the first tubes is arranged between the second tubes, and at least one of the second tubes is arranged between the first tubes. The third fluid passage is formed between the first tubes and the second tubes. The outer fin is arranged in the third fluid passages, promotes heat exchange in the first and second heat exchange portions, and enables heat transfer between the first fluid flowing through the first tubes and the second fluid flowing through the second tubes. The tank portion includes an outer wall component that configures an outer wall of the tank portion, and an intermediate plate member arranged within the outer wall component. The first tank space is surrounded by the outer wall component and the intermediate plate member and is located at an opposite side of the intermediate plate member to the first tubes. The intermediate plate member is formed with communication holes through which the first tank space communicates with the refrigerant tubes, and the intermediate plate member includes a tube side plate member and a partition plate member. The tube side plate member and the partition plate member are stacked on each other in a thick direction of the intermediate plate member. The tube side plate member is located to be nearer to the first tubes than the partition plate member. The partition plate member is located to be nearer to the first tank space than the tube side plate member. A side surface portion of the tube side plate member is provided with a cut inward of the tube side plate member. A part of the side wall portion of the outer wall component, which corresponds to the cut, is provided with a notch notched toward the cut, or a recess concaved toward the cut.

According to the above configuration, since the notches or recesses formed in the outer wall of the tank unit function as the drain ditches, the drainage performance of the melted water defrosted by the first heat exchanger can be improved.

Also, since notches or cuts corresponding to the recesses are formed in the tube side plate member, and the partition plate member is not cut, the drain ditches can be formed in the outer wall of the tank unit without damaging sealing of the first tank space.

According to a twenty-third example of the present disclosure, in the heat exchanger of the above-described twenty-first or twenty-second example, the notch or the recess may be formed on an end edge of the side wall portion on a side of the first tubes and may extend inward of the side wall portion, in the side wall portion of the outer wall component. A width dimension of the notch or the recess in the stack direction of the first and second tubes may become smaller from the end edge of the side wall portion on the side of the first tubes inward of the side wall portion on an outer surface of the side wall portion.

EMBODIMENTS FOR EXPLOITATION OF THE INVENTION

Figure 1:
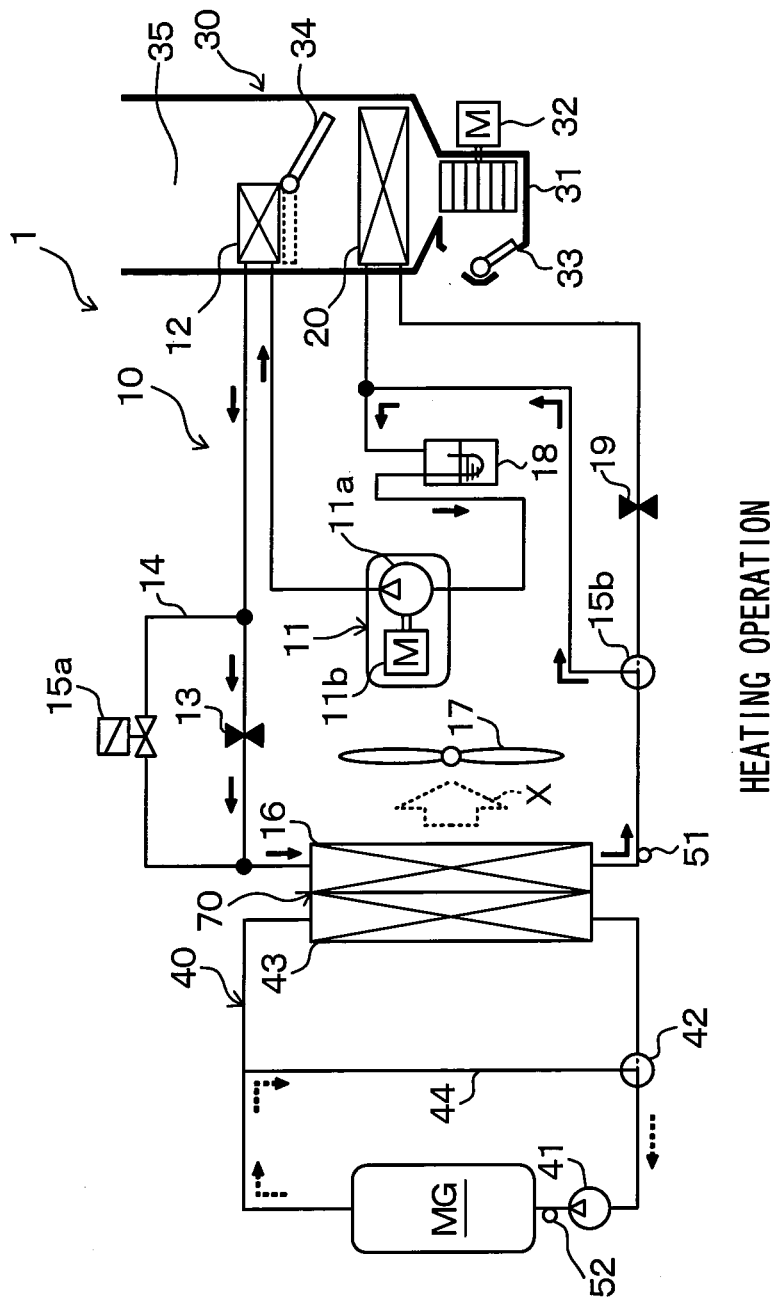
FIG. 1 is a schematic diagram illustrating a heating operation of a vehicle air conditioner including a heat exchanger according to a first embodiment of the present disclosure.

Multiple embodiments for implementing the present disclosure will be described with reference to the drawings. In the respective embodiments, parts corresponding to items described in preceding embodiments are denoted by the same reference symbols, and a repetitive description thereof may be omitted. In the respective embodiments, when only a part of the configuration is described, another embodiment described precedingly can be applied to the other portions of the configuration. Also, in the subsequent embodiments, parts corresponding to the items described in the preceding embodiment are denoted by reference symbols different in only hundreds or higher digit to express a correspondence relationship, and a repetitive description thereof may be omitted. In the respective embodiments, in addition to the combinations of the respective parts which can be explicitly specifically combined together, the respective embodiments can be partially combined together even if not explicitly described, if no problem particularly occurs in the combination.

First Embodiment

A first embodiment will be described with reference to FIGS. 1 to 8. In this embodiment, a heat exchanger 70 according to the present disclosure is applied to a heat pump cycle 10 that regulates a temperature of a vehicle interior blowing air in a vehicle air conditioner 1. FIGS. 1 to 4 are diagrams illustrating an overall configuration of the vehicle air conditioner 1 according to this embodiment. The vehicle air conditioner 1 is applied to a so-called hybrid electric vehicle that obtains a drive force for vehicle travel from an internal combustion engine (engine) and a travel electric motor MG.

The hybrid electric vehicle runs or stops the engine according to a travel load of the vehicle, and can switch between a travel state in which the vehicle obtains the drive force from both the engine and the travel electric motor MG, and a travel state in which the vehicle stops the engine and obtains the drive force from only the travel electric motor MG to travel. With the above configuration, the hybrid electric vehicle can improve a vehicle fuel consumption as compared with normal vehicles that obtain the drive force for vehicle travel from only the engine.

The heat pump cycle 10 is configured by a fluid circulating circuit in which a refrigerant as a first fluid circulates. Specifically, the heat pump cycle 10 is a vapor compression refrigeration cycle that performs a function of heating or cooling the vehicle interior blowing air blown into a vehicle interior which is a space to be air-conditioned, in the vehicle air conditioner 1. Thus, the heat pump cycle 10 switches a refrigerant passage to another so as to execute the heating operation (heating operation) for heating the vehicle interior blowing air which is a fluid to be subjected to a heat exchange to heat the vehicle interior, and the cooling operation (cooling operation) for cooling the vehicle interior blowing air to cool the vehicle interior.

Further, the heat pump cycle 10 can execute the defrosting operation during the heating operation for melting and removing frost attached to a vehicle exterior heat exchange unit 16 of the later-described combined heat exchanger 70 functioning as an evaporator that evaporates the refrigerant, and the waste heat recovery operation during the heating operation for allowing the refrigerant to absorb a heat quantity of the travel electric motor MG as an external heat source. In the overall configuration diagrams of the heat pump cycle 10 illustrated in FIGS. 1 to 4, flows of the refrigerant in the respective operation are indicated by solid arrows.

Also, the heat pump cycle 10 according to this embodiment applies a general fluorocarbon refrigerant as the refrigerant, and configures a subcritical refrigeration cycle in which a high pressure side refrigerant pressure does not exceed a critical pressure of the refrigerant. A refrigerant oil for lubricating a compressor 11 is mixed in the refrigerant, and a part of the refrigerant oil circulates in the cycle together with the refrigerant.

First, the compressor 11 is an electric compressor which is arranged within an engine room, sucks, compresses, and discharges the refrigerant in the heat pump cycle 10, and drives a fixed displacement compressor 11a having a fixed discharge capacity by an electric motor 11b. As the fixed displacement compressor 11a, various compression mechanisms such as a scroll compression mechanism or a vane compression mechanism can be applied specifically.

The electric motor 11b is controlled in the operation (rotating speed) according to a control signal output from an air conditioning control device which will be described later, and may be applied with any type of an AC motor and a DC motor. A refrigerant discharge capability of the compressor 11 is changed by controlling the rotating speed. Therefore, in this embodiment, the electric motor 11b configures a discharge capability changing device of the compressor 11.

A refrigerant discharge port of the compressor 11 is connected with a refrigerant inlet side of a vehicle interior condenser 12 as a use side heat exchanger. The vehicle interior condenser 12 is a heat exchanger for heating which is arranged within a casing 31 of a vehicle interior air conditioning unit 30 in the vehicle air conditioner 1, and exchange a heat between a high-temperature and high-pressure refrigerant flowing in the vehicle interior condenser 12 and the vehicle interior blowing air that has passed through a vehicle interior evaporator 20 which will be described later. A detailed configuration of the vehicle interior air conditioning unit 30 will be described later.

A refrigerant output side of the vehicle interior condenser 12 is connected with a heating fixed aperture 13 as a decompressing device for heating operation for decompressing and expanding the refrigerant flowing out of the vehicle interior condenser 12 during the heating operation. As the heating fixed aperture 13, an orifice or a capillary tube can be applied. An output side of the heating fixed aperture 13 is connected with a refrigerant inlet side of the vehicle exterior heat exchange unit 16 in the combined heat exchanger 70.

Further, a refrigerant outlet side of the vehicle interior condenser 12 is connected with a fixed aperture bypass passage 14 that allows the refrigerant flowing out of the vehicle interior condenser 12 to bypass the heating fixed aperture 13, and guides the refrigerant toward the vehicle exterior heat exchange unit 16. An on-off valve 15a that opens and closes the fixed aperture bypass passage 14 is arranged in the fixed aperture bypass passage 14. The on-off valve 15a is an electromagnetic valve whose open/close operation is controlled by a control voltage output from the air conditioning control device.

Also, a pressure loss generated when the refrigerant passes through the on-off valve 15a is extremely smaller than a pressure loss generated when the refrigerant passes through the fixed aperture 13. Therefore, the refrigerant flowing out of the vehicle interior condenser 12 flows into the vehicle exterior heat exchange unit 16 through the fixed aperture bypass passage 14 side when the on-off valve 15a is opened. The refrigerant flows into the vehicle exterior heat exchange unit 16 of the heat exchanger 70 through the heating fixed aperture 13 when the on-off valve 15a is closed.

With the above operation, the on-off valve 15a can switch the refrigerant passage of the heat pump cycle 10 to another. Therefore, the on-off valve 15a according to this embodiment functions as a refrigerant passage switching device. As the refrigerant passage switching device, there may be applied an electric three-way valve that switches between a refrigerant circuit that connects the vehicle interior condenser 12 outlet side and the heating fixed aperture 13 inlet side, and a refrigerant circuit that connects between the vehicle interior condenser 12 outlet side and the fixed aperture bypass passage 14 inlet side.

The vehicle exterior heat exchange unit 16 in the heat exchanger 70 is a heat exchange unit that performs heat exchange between the refrigerant flowing in the vehicle exterior heat exchange unit 16 and the outside air blown by an air blowing fan 17. The vehicle exterior heat exchange unit 16 is arranged within the engine room, and functions as an evaporation heat exchange unit that evaporates a low pressure refrigerant to exercise a heat absorption action during the heating operation, or functions as a radiation heat exchange unit that radiates a high pressure refrigerant during the cooling operation.

Also, the air blowing fan 17 is an electric blower whose operating rate, that is, rotating speed (blowing air volume) is controlled by the control voltage output from the air conditioning control device. Further, in the heat exchanger 70 according to this embodiment, the above-mentioned vehicle exterior heat exchange unit 16 is integrated with a described-later radiator unit 43 that exchanges a heat between the coolant cooling the travel electric motor MG and the outside air blown by the air blowing fan 17.

For that reason, the air blowing fan 17 according to this embodiment configures a vehicle exterior blowing device for blowing the outside air toward both the vehicle exterior heat exchange unit 16 and the radiator unit 43. The detailed configuration of the combined heat exchanger 70 that integrates the vehicle exterior heat exchange unit 16 and the radiator unit 43 together will be described later.

An outlet side of the vehicle exterior heat exchange unit 16 is connected with an electric three-way valve 15b. The electric three-way valve 15b is controlled in operation by the control voltage output from the air conditioning control device, and configures the refrigerant passage switching device together with the above-mentioned on-off valve 15a.

More specifically, the three-way valve 15b switches the passage to a refrigerant passage that connects an outlet side of the vehicle exterior heat exchange unit 16 and an inlet side of an accumulator 18 during the heating operation. The three-way valve 15b switches the passage to a refrigerant passage that connects the outlet side of the vehicle exterior heat exchange unit 16 and an inlet side of a cooling fixed aperture 19 during the cooling operation.

The cooling fixed aperture 19 is a decompressing device for the cooling operation for decompressing and expanding the refrigerant flowing from the vehicle exterior heat exchange unit 16 during the cooling operation, and a basic configuration thereof is identical with that of the heating fixed aperture 13. An outlet side of the cooling fixed aperture 19 is connected with a refrigerant inlet side of the vehicle interior evaporator 20.

The vehicle interior evaporator 20 is a cooling heat exchanger that is arranged upstream of the vehicle interior condenser 12 along an air flow within the casing 31 of the vehicle interior air conditioning unit 30, and exchanges the heat between the refrigerant flowing therein and an vehicle interior blowing air to cool the vehicle interior blowing air. A refrigerant outlet side of the vehicle interior evaporator 20 is connected with an inlet side of the accumulator 18.

The accumulator 18 is a gas-liquid separator for a low pressure side refrigerant, which separates gas and liquid of the refrigerant flowing into the accumulator 18 from each other to store an excess refrigerant within the cycle therein. A gas-liquid refrigerant outlet of the accumulator 18 is connected with a suction side of the compressor 11. Therefore, the accumulator 18 performs a function of preventing a liquid-phase refrigerant from being sucked into the compressor 11, and preventing a liquid compression of the compressor 11.

Subsequently, the vehicle interior air conditioning unit 30 will be described. The vehicle interior air conditioning unit 30 is arranged inside of a dashboard (instrument panel) in a vehicle interior frontmost portion, and houses a blower 32, the above-mentioned vehicle interior condenser 12, and the vehicle interior evaporator 20 within the casing 31 forming an outer envelope thereof.

The casing 31 forms an air passage of the vehicle interior blowing air blown into the vehicle interior, and is molded in resin (for example, polypropylene) having a certain level of elasticity, and excellent in strength. An inside/outside air switching device 33 that selectively introduces the vehicle interior air (inside air) and the outside air is arranged most upstream of the vehicle interior blowing air flow within the casing 31.

The inside/outside air switching device 33 is formed with an inside air introduction port for introducing the inside air into the casing 31, and an outside air introduction port for introducing the outside air. Further, an inside/outside air switching door that continuously regulates opening areas of the inside air introduction port and the outside air introduction port to change an air volume rate of an air volume of the inside air to an air volume of the outside air is arranged within the inside/outside air switching device 33.

The blower 32 that blows the air sucked through the inside/outside air switching device 33 toward the vehicle interior through the inside/outside air switching device 33 is arranged downstream of the inside/outside air switching device 33 along the air flow. The blower 32 is an electric blower that drives a centrifugal multi-blade fan (sirocco fan) by an electric motor, whose rotating speed (blowing quantity) is controlled by the control voltage output from the air conditioning control device.

The vehicle interior evaporator 20 and the vehicle interior condenser 12 are arranged downstream of the blower 32 in the air flow in this order with respect to a flow of the vehicle interior blowing air. In other words, the vehicle interior evaporator 20 is arranged upstream of the vehicle interior condenser 12 in the flow direction of the vehicle interior blowing air.

Further, an air mix door 34 that regulates a volume rate of the air that passes through the vehicle interior condenser 12 to the blowing air that has passed through the vehicle interior evaporator 20 is arranged downstream of the vehicle interior evaporator 20 along the air flow and upstream of the vehicle interior condenser 12 along the air flow. Also, a mixture space 35 that mixes the blowing air which is heat-exchanged with the refrigerant and heated by the vehicle interior condenser 12 with the blowing air that bypasses the vehicle interior condenser 12 and is not heated is disposed downstream of the vehicle interior condenser 12 along the air flow.

A wind outlet that blasts out air-conditioned wind mixed in the mixture space 35 toward the vehicle interior which is a space to be cooled is arranged most downstream of the casing 31 along the air flow. Specifically, as the wind outlet, there are provided a face wind outlet that blows out the air-conditioned wind toward an upper body of a passenger within the vehicle interior, a foot wind outlet that blows out the air-conditioned wind toward feet of the passenger, and a defroster wind outlet that blows out the air-conditioned wind toward an inside surface of a vehicle front window glass (all not shown).

Therefore, the rate of air volume allowed to pass through the vehicle interior condenser 12 is regulated by the air mix door 34 to regulate a temperature of the air-conditioned wind mixed in the mixture space 35, and the temperature of the air-conditioned wind blown from the respective wind outlets is regulated. That is, the air mix door 34 configures a temperature regulating device for regulating the temperature of the air-conditioned wind to be blown into the vehicle interior.

In other words, the air mix door 34 performs a function as a heat exchange quantity regulating device for regulating a heat exchange quantity between the compressor 11 discharge refrigerant and the vehicle interior blowing air in the vehicle interior condenser 12 configuring the use side heat exchanger. The air mix door 34 is driven by a servo motor not shown whose operation is controlled according to the control signal output from the air conditioning control device.

Further, a face door that regulates an opening area of the face wind outlet, a foot door that regulates an opening area of the face wind outlet, and a defroster door (all not shown) that regulates an opening area of the defroster wind outlet are arranged upstream of the face wind outlet, the foot wind outlet, and the defroster wind outlet along the air flow, respectively.

The face door, the foot door, and the defroster door configure a wind outlet mode switching device for switching a wind outlet mode to another. The face door, the foot door, and the defroster door are driven by a servo motor not shown which is controlled in operation according to the control signal output from the air conditioning control device through a link mechanism, etc.

Subsequently, a description will be given of the coolant circulation circuit 40 that circulates the coolant as a second fluid which is a material different in type from the refrigerant used in the heat pump cycle 10. As illustrated in FIGS. 1 to 4, the coolant circulation circuit 40 is a fluid circulation circuit different from the heat pump cycle 10. Specifically, the coolant circulation circuit 40 is a coolant circulation circuit that circulates a coolant (for example, ethylene glycol aqueous solution) as the cooling medium (heating medium) in a coolant passage formed within the above-described travel electric motor MG which is one of in-vehicle devices that generate heat during operation to cool the travel electric motor MG.

A coolant pump 41, an electric three-way valve 42, the radiator unit 43 of the combined heat exchanger 70, and a bypass passage 44 that bypasses the radiator unit 43, and allows the coolant to flow therein are arranged in the coolant circulation circuit 40.

The coolant pump 41 is an electric pump that pumps the coolant into a coolant passage formed within the travel electric motor MG in the coolant circulation circuit 40, whose rotating speed (flow rate) is controlled according to the control signal output from the air conditioning control device. Therefore, the coolant pump 41 functions as a cooling capability regulating device for changing a flow rate of the coolant that cools the travel electric motor MG to regulate a cooling capability.

The three-way valve 42 switches between a coolant circuit that connects an inlet side of the coolant pump 41 and an outlet side of the radiator unit 43 to allow the coolant to flow into the radiator unit 43, and a coolant circuit that connects the inlet side of the coolant pump 41 and an outlet side of the bypass passage 44 to allow the coolant to bypass the radiator unit 43. The three-way valve 42 is controlled in the operation according to the control voltage output from the air conditioning control device, and configures a circuit switching device of the coolant circuit.

That is, the coolant circulation circuit 40 according to this embodiment can switch as indicated by dashed arrows in FIG. 1, etc. between a coolant circuit in which the coolant circulates in the following order: the coolant pump 41; the travel electric motor MG; the radiator unit 43; and the coolant pump 41, and a coolant circuit in which the coolant circulates in the following order: the coolant pump 41; the travel electric motor MG; the bypass passage 44; and the coolant pump 41.

Therefore, when the three-way valve 42 switches to the coolant circuit that allows the coolant to flow while bypassing the radiator unit 43 during the actuation of the travel electric motor MG, the coolant increases a temperature thereof without radiating the heat by the radiator unit 43. That is, when the three-way valve 42 switches to the coolant circuit that allows the coolant to flow while bypassing the radiator unit 43, the heat quantity (the amount of heat generation) of the travel electric motor MG is stored in the coolant.

The radiator unit 43 is arranged within an engine room, and functions as a radiation heat exchange unit that conducts heat exchange between the coolant and the outside air blown by the air blowing fan 17. As described above, the radiator unit 43 configures the combined heat exchanger 70 in cooperation with the vehicle exterior heat exchange unit 16.

Figure 5:
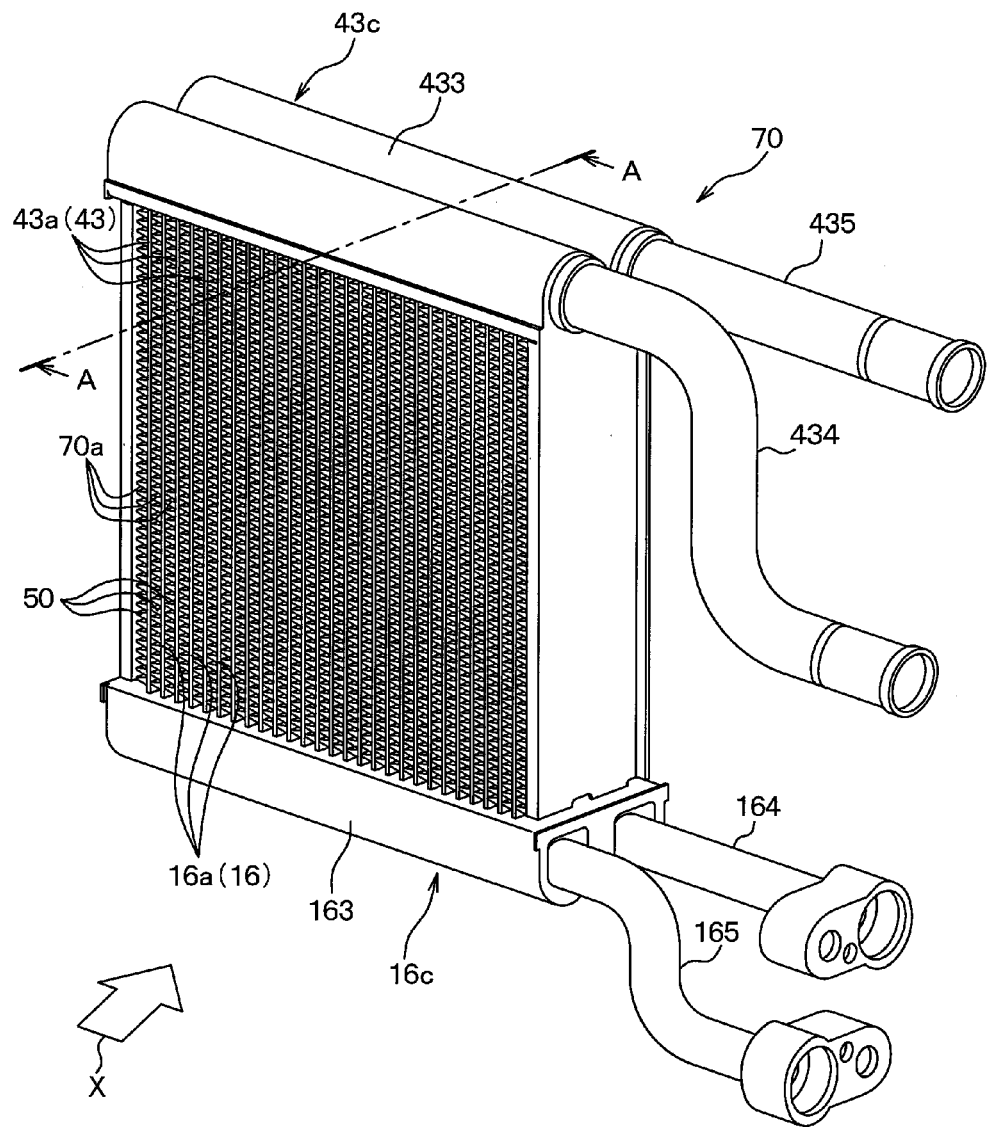
FIG. 5 is a perspective view of the heat exchanger according to the first embodiment.
Figure 6:
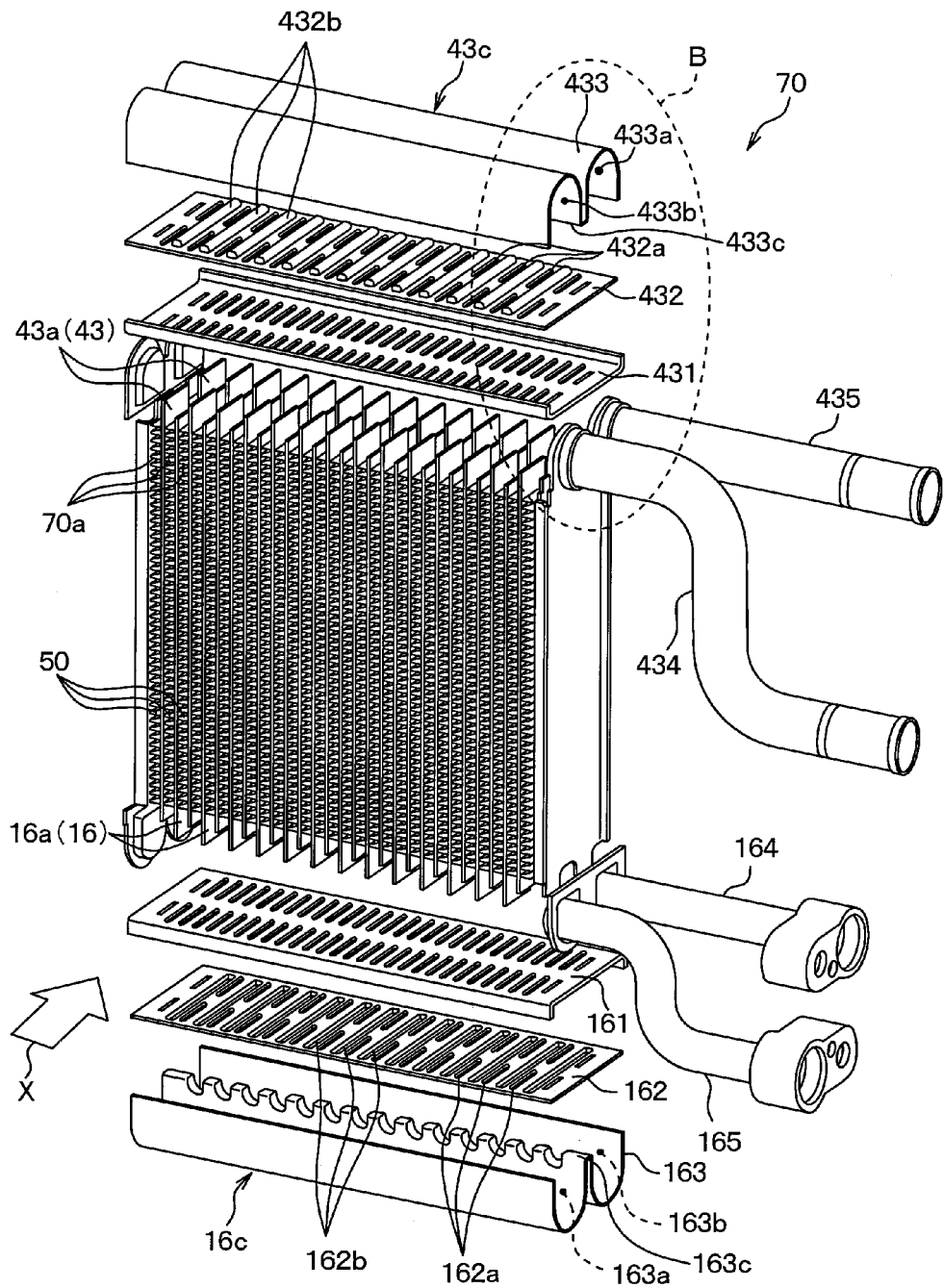
FIG. 6 is an exploded view of the heat exchanger according to the first embodiment.
Figure 7:
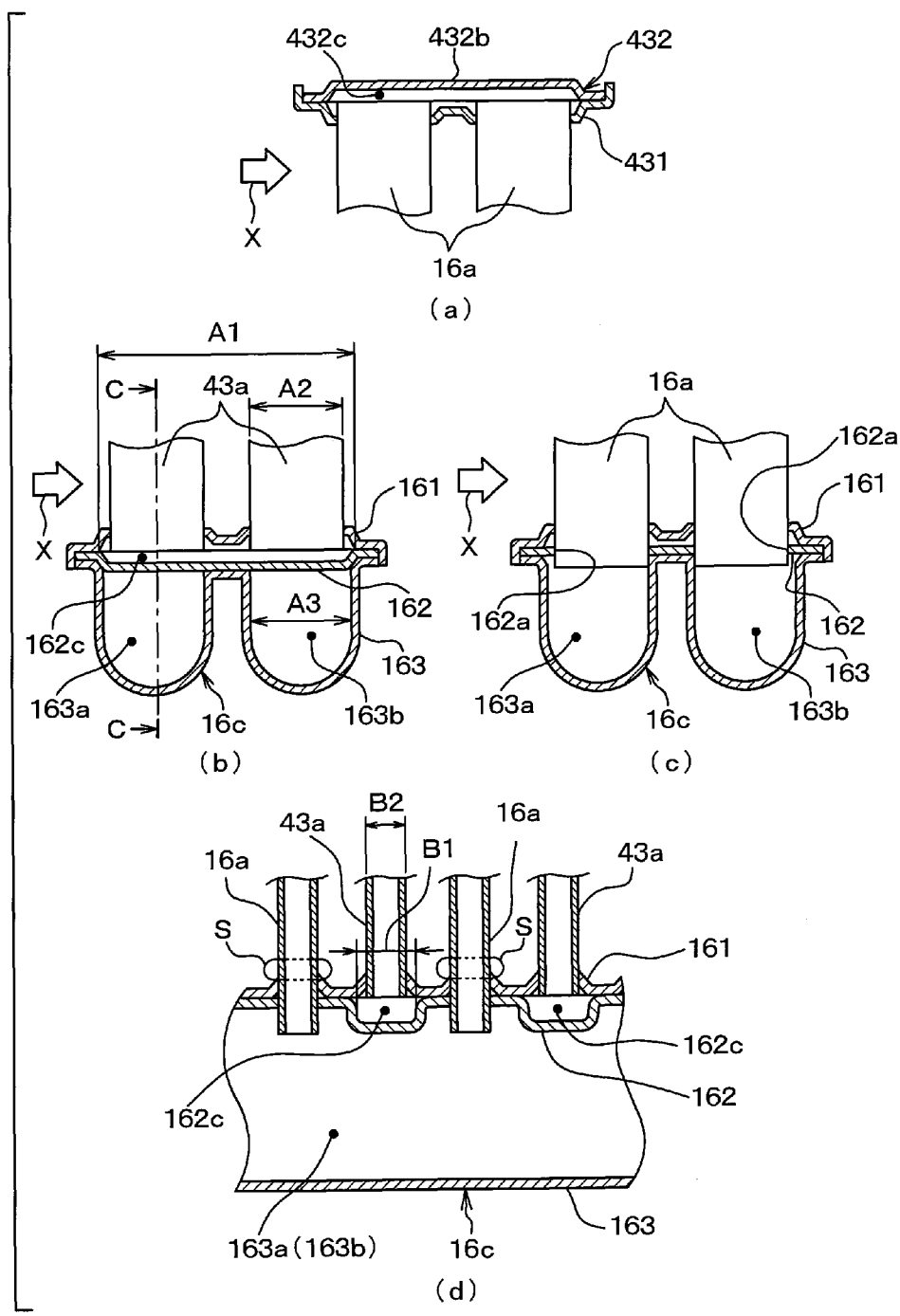
FIG. 7(a) is a cross-sectional view taken along a line A-A in FIG. 5.
FIG. 7(b) is a cross-sectional view of a portion in which coolant tubes overlap with each other in an air flow direction in a refrigerant side tank unit of a heat exchanger according to the first embodiment.
FIG. 7(c) is a cross-sectional view of a portion in which refrigerant tubes overlap with each other in the air flow direction in the refrigerant side tank unit of the heat exchanger according to the first embodiment.
FIG. 7(d) is a cross-sectional view taken along a line C-C in FIG. 7(b).
Figure 8:
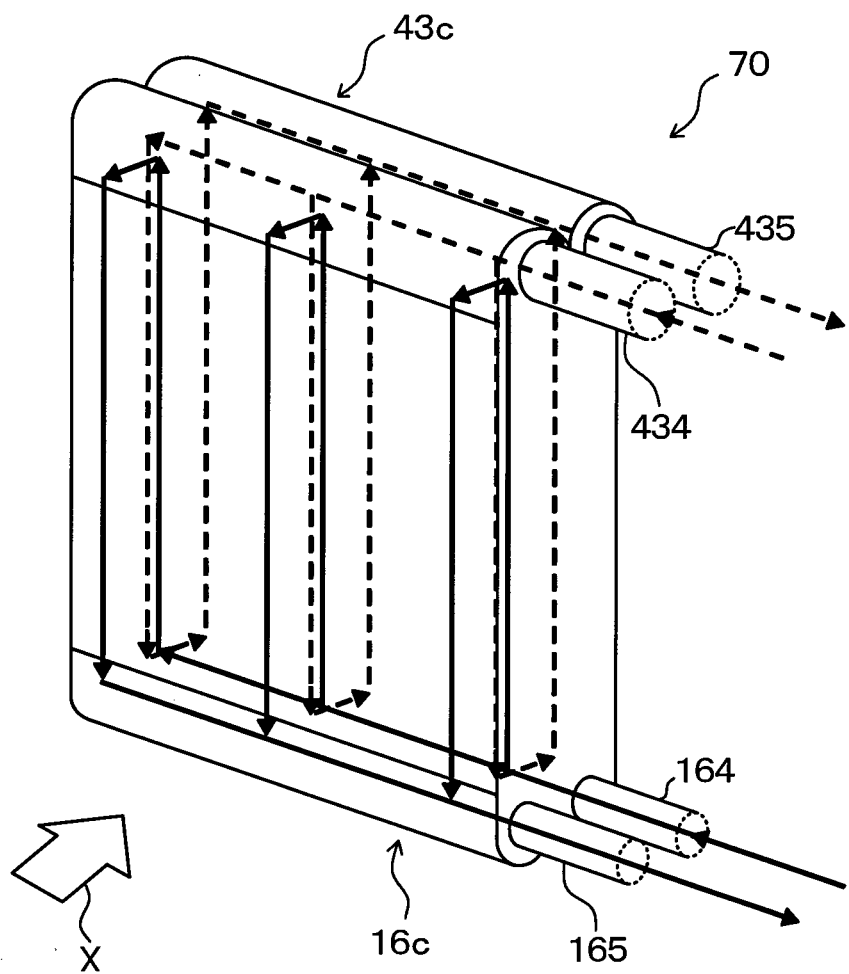
FIG. 8 is a schematic diagram illustrating flows of refrigerant and coolant in the heat exchanger according to the first embodiment.

Now, a detailed configuration of the combined heat exchanger 70 according to this embodiment will be described with reference to FIGS. 5 to 8. FIG. 5 is an external perspective view of the heat exchanger 70 according to this embodiment, and FIG. 6 is an exploded view of the heat exchanger 70. FIG. 7 shows cross-sectional views of the heat exchanger 70, and FIG. 8 is a schematic perspective view illustrating a refrigerant flow and a coolant flow in the heat exchanger 70.

First, as illustrated in FIGS. 5 and 6, the vehicle exterior heat exchange unit 16 (first heat exchange portion) and the radiator unit 43 (second heat exchange portion) are each configured by a so-called tank and tube type heat exchanger structure having multiple tubes in which the refrigerant or the coolant flows, and a pair of collection and distribution tanks that is arranged on both end sides of the multiple tubes, and collects or distributes the refrigerant or the coolant which flows in the respective tubes.

More specifically, the vehicle exterior heat exchange unit 16 includes multiple refrigerant tubes 16a (first tubes) within which the refrigerant flows as a first fluid, and a refrigerant side tank unit 16c (tank portion) that is extended in a stack direction of the multiple refrigerant tubes 16a, and collects or distributes the refrigerant flowing through the refrigerant tubes 16a. The vehicle exterior heat exchange unit 16 also conducts heat exchange between the refrigerant flowing through the refrigerant tubes 16a, and air (outside air blown by the air blowing fan 17) as a third fluid flowing on peripheries of the refrigerant tubes 16a.

On the other hand, the radiator unit 43 includes coolant tubes 43a (second tubes) within which the coolant is circuited as a second fluid, and a coolant side tank unit 43c that is extended in a stack direction of the coolant tubes 43a, and collects or distributes the coolant flowing through the coolant tubes 43a. The radiator unit 43 also conducts heat exchange between the coolant flowing through the coolant tubes 43a, and air (the outside air blown by the air blowing fan 17) flowing on peripheries of the coolant tubes 43a.

First, flattened tubes flat in a cross-section perpendicular to the longitudinal direction of the tubes are employed as the refrigerant tubes 16a and the coolant tubes 43a. As illustrated in an exploded perspective view of FIG. 6, the refrigerant tubes 16a of the vehicle exterior heat exchange unit 16 and the coolant tubes 43a of the radiator unit 43 are each arranged in two rows (multiple rows) along the flow direction X of the outside air blown by the air blowing fan 17.

Further, the refrigerant tubes 16a and the coolant tubes 43a arranged on the windward side in the flow direction of the outside air are arranged to be alternately stacked on each other at given intervals so that respective flat surfaces of their outer surfaces are parallel to each other, and face each other. Likewise, the refrigerant tubes 16a and the coolant tubes 43a arranged on the leeward side in the flow direction of the outside air are stacked on each other at given intervals.

In other words, according to this embodiment, the refrigerant tubes 16a are arranged between the respective coolant tubes 43a, and the coolant tubes 43a are arranged between the respective refrigerant tubes 16a. Spaces formed between the refrigerant tubes 16a and the coolant tubes 43a form outside air passages 70a (third fluid passages) through which the outside air blown by the air blowing fan 17 flows.

Outer fins 50 are arranged in the outside air passages 70a, which facilitate heat exchange between the refrigerant and the outside air in the vehicle exterior heat exchange unit 16, and heat exchange between the coolant and the outside air in the radiator unit 43, and also enable heat transfer between the refrigerant flowing through the refrigerant tubes 16a, and the coolant flowing through the coolant tubes 43a.

Corrugated fins formed by bending a metal thin plate excellent in heat conductivity into a corrugated shape are applied as the outer fins 50, and in this embodiment, the outer fins 50 are joined to both the refrigerant tubes 16a and the coolant tubes 43a, to thereby enable heat transfer between the refrigerant tubes 16a and the coolant tubes 43a.

Subsequently, the refrigerant side tank unit 16c and the coolant side tank unit 43c will be described. The basic configurations of those tank units 16c and 43c are identical with each other. The coolant side tank unit 43c includes a coolant side fixing plate member 431 to which both the refrigerant tubes 16a and the coolant tubes 43a each arranged in two rows are fixed, a coolant side intermediate plate member 432 fixed to the coolant side fixing plate member 431, and a coolant side tank formation member 433.

As illustrated in FIG. 7(a), multiple recesses 432b forming multiple refrigerant communication spaces 432c communicated with the refrigerant tubes 16a between the coolant side intermediate plate member 432 and the coolant side fixing plate member 431 are formed in the coolant side intermediate plate member 432 by fixing the coolant side intermediate plate member 432 to the coolant side fixing plate member 431. The spaces 432c function as refrigerant communication spaces for communicating the respective refrigerant tubes 16a aligned in two rows in the flow direction X of the outside air with each other.

For clarification of the illustration, FIG. 7(a) illustrates a cross-section of a periphery of the recesses 432b formed in the coolant side intermediate plate member 432.

Also, first communication holes 432a that penetrate through both sides of the coolant side intermediate plate member 432 are formed in portions of the coolant side intermediate plate member 432, which correspond to the coolant tubes 43a, and the coolant tubes 43a each penetrate through the first communication holes 432a. With the above configuration, the coolant tubes 43a are communicated with a space formed within the coolant side tank formation member 433.

Further, on an end of the coolant side tank unit 43c side, the coolant tubes 43a are protruded toward the coolant side tank unit 43c side more than the refrigerant tubes 16a. That is, an end of the coolant tubes 43a on the refrigerant side tank unit 16c side, and an end of the refrigerant tubes 16a on the refrigerant side tank unit 16c side are unevenly arranged.

The coolant side tank formation member 433 is fixed to the coolant side fixing plate member 431 and the coolant side intermediate plate member 432, to thereby form a collection space 433a for collecting the coolant, and a distribution space 433b for distributing the coolant therein. Specifically, the coolant side tank formation member 433 is formed into a two-mountain shape (W-shape) when viewed from the longitudinal direction thereof, by subjecting a plate metal to pressing.

A center portion 433c of the two-mountain shape of the coolant side tank formation member 433 is joined to the coolant side intermediate plate member 432 to section the collection space 433a and the distribution space 433b. In this embodiment, the distribution space 433b is arranged on the windward side in the flow direction X of the outside air, and the collection space 433a is also arranged on the leeward side in the flow direction X of the outside air.

The center portion 433c is formed into a shape suited to the recesses 432b formed in the coolant side intermediate plate member 432. The collection space 433a and the distribution space 433b are sectioned so that the internal coolant is prevented from being leaked from a joint portion of the coolant side fixing plate member 431 and the coolant side intermediate plate member 432.

Further, as described above, the coolant tubes 43a penetrate through the first communication holes 432a of the coolant side intermediate plate member 432, and protrude into the collection space 433a or the distribution space 433b formed within the coolant side tank formation member 433. With the above configuration, the coolant tubes 43a arrayed on the windward side in the flow direction X of the outside air are communicated with the distribution space 433b, and the coolant tubes 43a arrayed on the leeward side in the flow direction X of the outside air are communicated with the collection space 433a.

Also, one end side of the coolant side tank formation member 433 in the longitudinal direction thereof is connected with a coolant inflow pipe 434 that allows the coolant to flow into the distribution space 433b, and also connected with a coolant outflow pipe 435 that allows the coolant to flow out of the collection space 433a. Further, the other end side of the coolant side tank unit 43c in the longitudinal direction thereof is closed by a closing member.

On the other hand, likewise, the refrigerant side tank unit 16c includes a refrigerant side fixing plate member 161 to which both the refrigerant tubes 16a and the coolant tubes 43a each arranged in two rows are fixed, a refrigerant side intermediate plate member 162 fixed to the refrigerant side fixing plate member 161, and a refrigerant side tank formation member 163.

As illustrated in FIG. 7(b), multiple recesses 162b forming multiple coolant communication spaces 162c (second fluid flowing spaces) communicated with the coolant tubes 43a between the refrigerant side intermediate plate member 162 and the refrigerant side fixing plate member 161 are formed in the refrigerant side intermediate plate member 162 by fixing the refrigerant side intermediate plate member 162 to the refrigerant side fixing plate member 161. The spaces 162c function as coolant communication spaces for communicating the respective coolant tubes 43a aligned in two rows in the flow direction X of the outside air with each other.

Also, as illustrated in FIG. 7(c), second communication holes 162a (communication holes) that penetrate through both sides of the refrigerant side intermediate plate member 162 are formed in portions of the refrigerant side intermediate plate member 162, which correspond to the refrigerant tubes 16a, and the refrigerant tubes 16a each penetrate through the second communication holes 162a. With the above configuration, the refrigerant tubes 16a are communicated with a space formed within the refrigerant side tank formation member 163.

Further, on an end of the refrigerant side tank unit 16c side, the refrigerant tubes 16a are protruded toward the refrigerant side tank unit 16c side more than the coolant tubes 43a. That is, an end of the refrigerant tubes 16a on the refrigerant side tank unit 16c side, and an end of the coolant tubes 43a on the refrigerant side tank unit 16c side are unevenly arranged.

The refrigerant side tank formation member 163 is fixed to the refrigerant side fixing plate member 161 and the refrigerant side intermediate plate member 162, to thereby form a collection space 163a (first tank space) for collecting the refrigerant, and a distribution space 163b (first tank space) for distributing the refrigerant therein. Specifically, the refrigerant side tank formation member 163 is formed into a two-mountain shape (W-shape) when viewed from the longitudinal direction thereof, by subjecting a plate metal to pressing. The collection space 163a and the distribution space 163b may be used as an example of the first tank space.

A center portion 163c of the two-mountain shape of the refrigerant side tank formation member 163 is joined to the refrigerant side intermediate plate member 162 to section the collection space 163a and the distribution space 163b (multiple first tank spaces).

In this embodiment, the collection space 163a and the distribution space 163b are aligned in the flow direction X of the outside air. Specifically, the collection space 163a is arranged on the windward side in the flow direction X of the outside air, and the distribution space 163b is also arranged on the leeward side in the flow direction X of the outside air.

As illustrated in FIG. 6, the center portion 163c is formed into a shape suited to the recesses 162b formed in the refrigerant side intermediate plate member 162. The collection space 163a and the distribution space 163b are sectioned so that the internal refrigerant is prevented from being leaked from a joint portion of the refrigerant side fixing plate member 161 and the refrigerant side intermediate plate member 162.

Further, as described above, the refrigerant tubes 16a penetrate through the second communication holes 162a of the refrigerant side intermediate plate member 162, and protrude into the collection space 163a or the distribution space 163b formed within the refrigerant side tank formation member 163. With the above configuration, the refrigerant tubes 16a arrayed on the windward side in the flow direction X of the outside air are communicated with the collection space 163a, and the refrigerant tubes 16a arrayed on the leeward side in the flow direction X of the outside air are communicated with the distribution space 163b.

Also, one end side of the refrigerant side tank formation member 163 in the longitudinal direction thereof is connected with a refrigerant inflow pipe 164 that allows the refrigerant to flow into the distribution space 163b, and also connected with a refrigerant outflow pipe 165 that allows the refrigerant to flow out of the collection space 163a. Further, the other end side of the refrigerant side tank formation member 163 in the longitudinal direction thereof is closed by a closing member.

Incidentally, a temperature of the cooling medium (coolant) flowing into the distribution space 433b of the coolant side tank formation member 433 through the coolant inflow pipe 434 is higher than 0° C., and higher than a temperature of the refrigerant flowing into the distribution space 163b of the refrigerant side tank formation member 163 through the refrigerant inflow pipe 164.

Now, the above-mentioned coolant communication spaces 162c will be described in detail. As illustrated in FIG. 7(b), at least a part of the coolant communication spaces 162c is separated by only an external of the refrigerant side tank unit 16c and the refrigerant side fixing plate member 161. Therefore, in the coolant communication spaces 162c, the coolant is capable of flowing in contact with an outer wall of the refrigerant side tank unit 16c.

The coolant communication spaces 162c are arranged to be nearer to the vehicle exterior heat exchange unit 16 than the collection space 163a and the distribution space 163b. In other words, the coolant communication spaces 162c are arranged to be nearer than the collection space 163a and the distribution space 163b to an exposed portion exposed to the external of the refrigerant tubes 16a, that is, an exposed portion in which each outer peripheral surface of the refrigerant tubes 16a comes in contact with the outside air. Also, the coolant communication spaces 162c are extended in the flow direction X of the outside air, and formed over the collection space 163a and the distribution space 163b.

In the flow direction X of the outside air, a width A1 of the coolant communication spaces 162c is set to be larger than a width A2 of the coolant tubes 43a. Also, in the flow direction X of the outside air, the width A1 of the coolant communication spaces 162c is set to be larger than respective widths A3 of the collection space 163a and the distribution space 163b.

As illustrated in FIG. 7(d), in a stack direction of the refrigerant tubes 16a and the coolant tubes 43a, a width B1 of the coolant communication spaces 162c is set to be larger than a width B2 of the coolant tubes 43a.

In the heat exchanger 70 according to this embodiment, as illustrated in a schematic perspective view of FIG. 8, the refrigerant flowing into the distribution space 163b of the refrigerant side tank unit 16c through the refrigerant inflow pipe 164 flows into the respective refrigerant tubes 16a arrayed on the leeward side in the flow direction X of the outside air, of the refrigerant tubes 16a aligned in two rows.

Then, the refrigerant flowing out of the respective refrigerant tubes 16a arrayed on the leeward side flows into the respective refrigerant tubes 16a arrayed on the windward side in the flow direction X of the outside air, through the refrigerant communication spaces 432c formed between the coolant side fixing plate member 431 and the coolant side intermediate plate member 432 of the coolant side tank unit 43c.

Further, as indicated by solid arrows in FIG. 8, the refrigerant flowing out of the respective refrigerant tubes 16a arrayed on the windward side is collected into the collection space 163a of the refrigerant side tank unit 16c, and flows out of the refrigerant outflow pipe 165. That is, in the heat exchanger 70 according to this embodiment, the refrigerant flows in a U-turn manner in the following order: the refrigerant tubes 16a on the leeward side; the refrigerant communication spaces 432c of the coolant side tank unit 43c; and the refrigerant tubes 16a on the windward side.

Likewise, the coolant flows in the U-turn manner in the following order: the coolant tubes 43a on the windward side; the coolant communication spaces 162c of the refrigerant side tank unit 16c; and the coolant tubes 43a on the leeward side. Therefore, the flow directions of the refrigerant flowing through the refrigerant tubes 16a, and the coolant flowing through the coolant tubes 43a which are adjacent to each other are opposite to each other.

Also, the refrigerant tubes 16a of the vehicle exterior heat exchange unit 16, the coolant tubes 43a of the radiator unit 43, the respective components of the refrigerant side tank unit 16c, the respective components of the coolant side tank unit 43c, and the outer fins 50 as described above are each made of the same metal material (aluminum alloy in this embodiment).

Then, the refrigerant side fixing plate member 161 and the refrigerant side tank formation member 163 are fixed by caulking in a state where the refrigerant side intermediate plate member 162 is sandwiched between the refrigerant side fixing plate member 161 and the refrigerant side tank formation member 163. Also, the coolant side fixing plate member 431 and the coolant side tank formation member 433 are fixed by caulking in a state where the coolant side intermediate plate member 432 is sandwiched between the coolant side fixing plate member 431 and the coolant side tank formation member 433.

Further, the overall heat exchanger 70 which is fixed by caulking is carried into a heating furnace, and heated. A brazing filler metal cladded in advance is melted on a surface of the respective components, and the heat exchanger 70 is cooled until the brazing filler metal is gain solidified so that the respective components are brazed integrally. As a result, the vehicle exterior heat exchange unit 16 and the radiator unit 43 are integrated together.

Subsequently, an electric control unit according to this embodiment will be described. The air conditioning control device includes a known microcomputer having a CPU, a ROM, and a RAM, and peripheral circuits thereof, conducts various calculations and processing on the basis of an air conditioning control program stored in the ROM, and controls the actuation of the various air conditioning control equipments 11, 15a, 15b, 17, 41, and 42, etc. connected to an output side.

Also, an input side of the air conditioning control device is connected with a sensor group for various air conditioning controls such as an inside air sensor for detecting an vehicle interior temperature, an outside air sensor for detecting an outside air temperature, an insolation sensor for detecting the amount of insolation within the vehicle interior, an evaporator temperature sensor for detecting a blowing air temperature (evaporator temperature) of the vehicle interior evaporator 20, a blow refrigerant temperature sensor for detecting a blow refrigerant temperature of the compressor 11, an outlet refrigerant temperature sensor 51 for detecting an outlet side refrigerant temperature Te of the vehicle exterior heat exchange unit 16, and a coolant temperature sensor 52 as a coolant temperature detecting device for detecting a coolant temperature Tw flowing into the travel electric motor MG.

In this embodiment, the coolant temperature Tw pumped from the coolant pump 41 is detected by the coolant temperature sensor 52. Alternatively, the coolant temperature Tw sucked into the coolant pump 41 may be detected by the coolant temperature sensor 52.

Further, the input side of the air conditioning control device is connected with an operating panel not shown which is arranged in the vicinity of an instrument panel in a front portion of the vehicle interior, and receives operation signals from various air conditioning operation switches disposed in the instrument panel. As the various air conditioning operation switches disposed in the operating panel, there are provided an operation switch of the vehicle air conditioner, a vehicle interior temperature setting switch for setting the vehicle interior temperature, and a select switch for operation modes.

Also, the air conditioning control device is integrated with the control device for controlling the electric motor 11b of the compressor 11, and the on-off valve 15a, etc., and controls the operation thereof. In this embodiment, in the air conditioning control device, a configuration (hardware and software) that controls the actuation of the compressor 11 configures a refrigerant blow capability control device, a configuration that controls the actuations of the various devices 15a and 15b configuring the refrigerant passage switching device configures a refrigerant passage control device, and a configuration that controls the actuation of the three-way valve 42 configuring the circuit switching device for the coolant configures a refrigerant medium circuit control device.

Further, the air conditioning control device according to this embodiment has a configuration (frost formation determining device) for determining whether frost is formed in the vehicle exterior heat exchange unit 16, or not, on the basis of detection signals of the sensor group for the air conditioning control described above. Specifically, in the frost formation determining device, when a velocity of the vehicle is equal to or lower than a predetermined reference vehicle velocity (20 km/h in this embodiment), and the outlet side refrigerant temperature Te of the vehicle exterior heat exchange unit 16 is equal to or lower than 0° C., it is determined that the frost is formed in the vehicle exterior heat exchange unit 16.

Subsequently, the actuation of the vehicle air conditioner 1 according to this embodiment in the above configuration will be described. The vehicle air conditioner 1 according to this embodiment can execute the heating operation for heating the vehicle interior, and the cooling operation for cooling the vehicle interior, and can also execute the defrosting operation and the waste heat recovery operation during the heating operation. Hereinafter, the actuation in the respective operation will be described.

(a) Heating Operation

The heating operation starts when the heating operation mode is selected by the select switch in a state where the actuation switch of the operating panel is on. Then, in the heating operation, if it is determined by the frost formation determining device that the frost is formed in the vehicle exterior heat exchange unit 16, the defrosting operation is executed. If the coolant temperature Tw detected by the coolant temperature sensor 52 becomes equal to or higher than a predetermined reference temperature (60° C. in this embodiment), the waste heat recovery operation is executed.

First, in the normal heating operation, the air conditioning control device closes the on-off valve 15a, and switches the three-way valve 15b to the refrigerant passage that connects the outlet side of the vehicle exterior heat exchange unit 16 and the inlet side of the accumulator 18. Further, the air conditioning control device actuates the coolant pump 41 so as to pump a predetermined given flow rate of coolant, and also switches the three-way valve 42 of the coolant circulation circuit 40 to the coolant circuit that allows the coolant to flow while bypassing the radiator unit 43.

With the above configuration, the heat pump cycle 10 is switched to the refrigerant passage in which the refrigerant flows as indicated by the solid arrows in FIG. 1, and the coolant circulation circuit 40 is switched to the coolant circuit in which the coolant flows as indicated by dashed arrows in FIG. 1.

With the above configuration of the refrigerant passage and the coolant circuit, the air conditioning control device reads the detection signals of the sensor group for the air conditioning control, and the operation signals of the operation panel described above. Then, the air conditioning control device calculates a target blowing temperature TAO which is a target temperature of the air blown into the vehicle interior on the basis of values of the detection signals and the operation signals. Further, the air conditioning control device determines the actuation states of the various air conditioning control equipments connected to the output side of the air conditioning control device on the basis of the calculated target blowing temperature TAO and the detection signals of the sensor group.

For example, the refrigerant discharge capability of the compressor 11, that is, the control signal output to the electric motor of the compressor 11 is determined as follows. First, a target evaporator blowing temperature TEO of the vehicle interior evaporator 20 is determined with reference to a control map stored in the air conditioning control device in advance, on the basis of the target blowing temperature TAO.

Then, the control signal output to the electric motor in the compressor 11 is determined so that the blowing air temperature from the vehicle interior evaporator 20 approaches the target evaporator blowing temperature TEO with the use of a feedback control technique, on the basis of a deviation between the target evaporator blowing temperature TEO and the blowing air temperature from the vehicle interior evaporator 20 which is detected by the evaporator temperature sensor.

Also, the control signal output to a servo motor of the air mix door 34 is determined so that the temperature of air blown into the vehicle interior reaches a temperature desired by a passenger which is set by the vehicle interior temperature setting switch, with the use of the target blowing temperature TAO, the blowing air temperature from the vehicle interior evaporator 20, and the compressor 11 discharge refrigerant temperature detected by the discharge refrigerant temperature sensor, etc.

In the normal heating operation, the defrosting operation, and the waste heat recovery operation, the opening degree of the air mix door 34 may be controlled so that a total air volume of the vehicle interior blowing air blown from the blower 32 passes through the vehicle interior condenser 12.

Then, the control signal determined as described above is output to the various air conditioning control equipments. Thereafter, a control routine is repeated every given control cycle in the following order: reading the above-mentioned detection signals and operation signals; calculating the target blowing temperature TAO; determining the actuation state of the various air conditioning control equipments; and outputting the control voltage and the control signal, until an actuation stop of the vehicle air conditioner is required by the operation panel. The repetition of this control routine is also basically conducted in other operation.

In the heat pump cycle 10 during the normal heating operation, a high pressure refrigerant discharged from the compressor 11 flows into the vehicle interior condenser 12. The refrigerant that has flowed into the vehicle interior condenser 12 is blown from the blower 32 conducts the heat exchange with the vehicle interior blowing air that has been blown from the blower 32, and passed through the vehicle interior evaporator 20, to radiate the heat. With this operation, the vehicle interior blowing air is heated.

Since the on-off valve 15a is closed, the high pressure refrigerant flowing from the vehicle interior condenser 12 flows into the heating fixed aperture 13, and is decompressed and expanded. Then, the low pressure refrigerant decompressed and expanded by the heating fixed aperture 13 flows into the vehicle exterior heat exchange unit 16. The low pressure refrigerant that has flowed into the vehicle exterior heat exchange unit 16 is heat-absorbed from the outside air blown by the air blowing fan 17, and evaporated.

In this situation, since the coolant circulation circuit 40 is switched to the coolant circuit in which the coolant flows while bypassing the radiator unit 43, there is no case in which the coolant is radiated to the refrigerant flowing in the vehicle exterior heat exchange unit 16, or the coolant absorbs heat from the refrigerant flowing in the vehicle exterior heat exchange unit 16. That is, the coolant does not thermally affect the refrigerant flowing in the vehicle exterior heat exchange unit 16.

The refrigerant flowing out of the vehicle exterior heat exchange unit 16 flows into the accumulator 18, and is separated into vapor and liquid since the three-way valve 15b is switched to the refrigerant passage that connects the outlet side of the vehicle exterior heat exchange unit 16 and the input side of the accumulator 18. Then, a gas phase refrigerant separated by the accumulator 18 is sucked into the compressor 11, and again compressed.

As described above, in the normal heating operation, the vehicle interior blowing air is heated by the heat quantity of the refrigerant discharged from the compressor 11 through the vehicle interior condenser 12 so that the vehicle interior can be heated.

(b) Defrosting Operation

Subsequently, the defrosting operation will be described. As in the heat pump cycle 10 according to this embodiment, in the refrigeration cycle device where the heat exchange is conducted between the refrigerant and the outside air to evaporate the refrigerant by the vehicle exterior heat exchange unit 16, frost could be formed in the vehicle exterior heat exchange unit 16 if a refrigerant evaporation temperature in the vehicle exterior heat exchange unit 16 becomes equal to or lower than the frost formation temperature (specifically 0° C.).

When the frost is thus formed, since an outdoor air passages 70a of the heat exchanger 70 is blocked by frost, the heat exchange capability of the vehicle exterior heat exchange unit 16 could be remarkably degraded. Under the circumstances, in the heat pump cycle 10 according to this embodiment, in the heating operation, the defrosting operation is executed when it is determined by the frost formation determining device that the frost is formed in the vehicle exterior heat exchange unit 16.

In the defrosting operation, the air conditioning control device stops the actuation of the compressor 11, and also stops the actuation of the air blowing fan 17. Therefore, in the defrosting operation, the refrigerant flow rate flowing in the vehicle exterior heat exchange unit 16 is reduced, and the air volume of the outside air flowing into the outdoor air passages 70a is reduced as compared with the normal heating operation.

Figure 2:
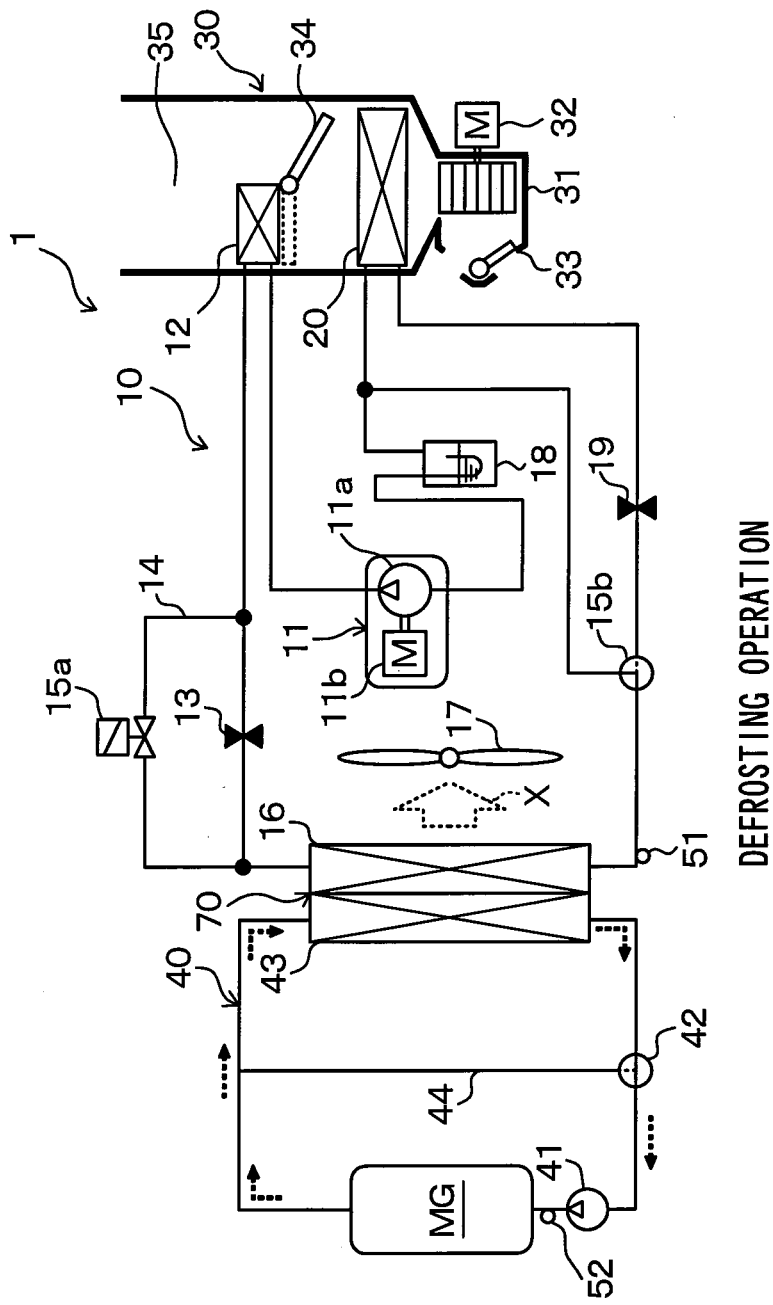
FIG. 2 is a schematic diagram illustrating a defrosting operation of the vehicle air conditioner including the heat exchanger according to the first embodiment.

Further, the air conditioning control device switches the three-way valve 42 of the coolant circulation circuit 40 to the refrigerant medium circuit that allows the coolant to flow into the radiator unit 43 as indicated by dashed arrows in FIG. 2. As a result, the refrigerant is not circulated in the heat pump cycle 10, and the coolant circulation circuit 40 is switched to the refrigerant medium circuit in which the refrigerant flows as indicated by dashed arrows in FIG. 2.

Therefore, the heat quantity of the coolant flowing in the coolant tubes 43a of the radiator unit 43 is transferred to the vehicle exterior heat exchange unit 16 through the outer fins 50, to defrost the vehicle exterior heat exchange unit 16. That is, defrosting is realized effectively with using heat exhaust of the travel electric motor MG.

(c) Waste Heat Recovery Operation

Subsequently, the waste heat recovery operation will be described. In order to suppress overheat of the travel electric motor MG, it is desirable to maintain the temperature of the coolant at a given upper limit temperature or lower. Additionally, in order to reduce a friction loss caused by an increase in viscosity of a lubricating oil sealed within the travel electric motor MG, it is desirable to maintain the temperature of the coolant at a given lower limit temperature or higher.

Under the circumstances, in the heat pump cycle 10 according to this embodiment, in the heating operation, the waste heat recovery operation is executed when the coolant temperature Tw becomes a predetermined reference temperature (60° C. in this embodiment) or higher. In this waste heat recovery operation, the three-way valve 15b of the heat pump cycle 10 is actuated in the same manner as the normal heating operation, and the three-way valve 42 of the coolant circulation circuit 40 is switched to the coolant circuit that allows the coolant to flow into the radiator unit 43 as indicated by dashed arrows in FIG. 3 in the same manner as the defrosting operation.

Figure 3:
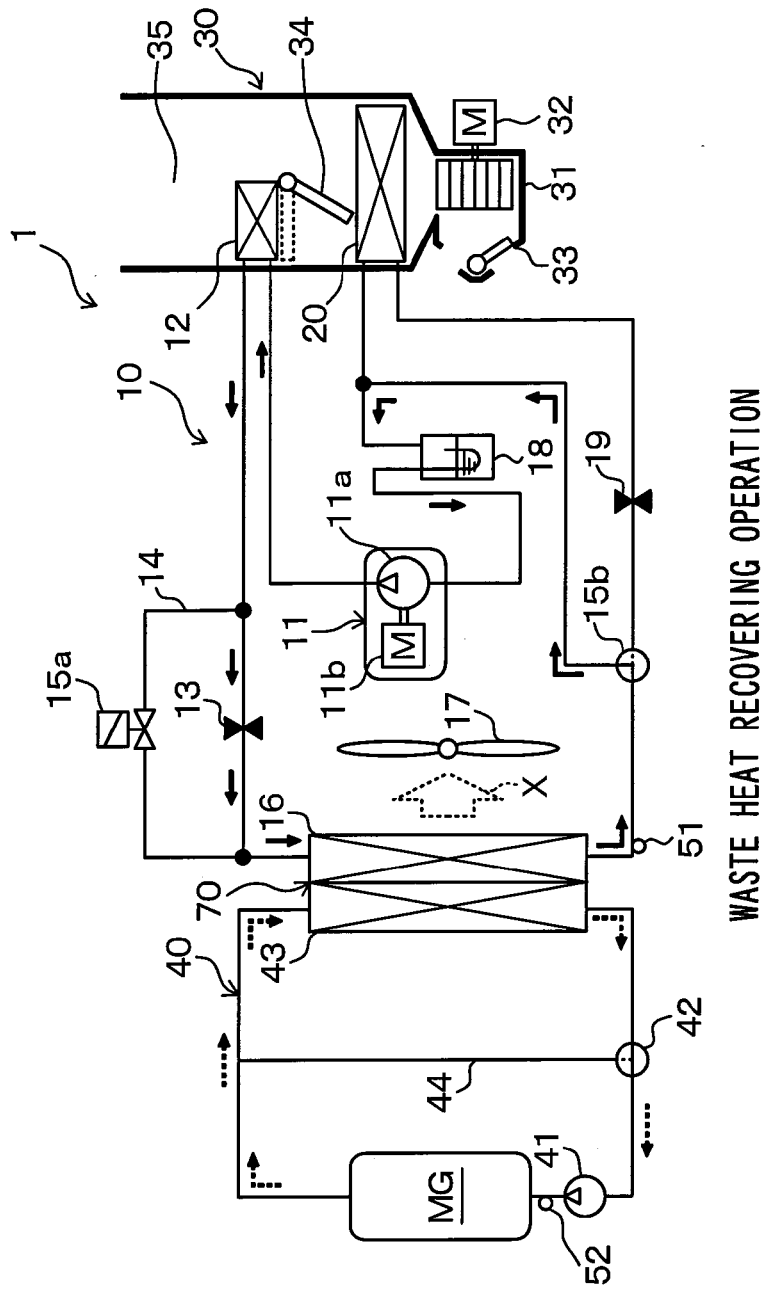
FIG. 3 is a schematic diagram illustrating a waste heat recovering operation of the vehicle air conditioner including the heat exchanger according to the first embodiment.

Therefore, as indicated by the solid arrows in FIG. 3, the high pressure and temperature refrigerant discharged from the compressor 11 heats the vehicle interior blowing air by the vehicle interior condenser 12, is decompressed and expanded by the heating fixed aperture 13, and flows into the vehicle exterior heat exchange unit 16 as in the same manner as the normal heating operation.

Since the low pressure refrigerant that has flowed into the vehicle exterior heat exchange unit 16 absorbs both the heat quantity of the outside air blown by the air blowing fan 17 and the heat quantity of the coolant heat-transferred through the outer fins 50, and is evaporate since the three-way valve 42 is switched to the coolant circuit that allows the coolant to flow into the radiator unit 43. The other actuation is identical with that in the normal heating operation.

As described above, in the waste heat recovery operation, the vehicle interior blowing air is heated by the heat quantity of the refrigerant discharged from the compressor 11 through the vehicle interior condenser 12 so that the vehicle interior can be heated. In this situation, the refrigerant absorbs not only the heat quantity of the outside air but also the heat quantity of the coolant heat-transferred through the outer fins 50. Therefore, the heating of the vehicle interior can be realized by effectively using the waste heat of the travel electric motor MG.

(d) Cooling Operation

The cooling operation starts when a cooling operation mode is selected by the select switch in a state where the actuation switch of the operation panel is on. In the cooling operation, the air conditioning control device opens the on-off valve 15a, and switches the three-way valve 15b to the refrigerant passage that connects the outlet side of the vehicle exterior heat exchange unit 16 and the inlet side of the cooling fixed aperture 19. As a result, the heat pump cycle 10 is switched to the refrigerant passage in which the refrigerant flows as indicated by the solid arrows in FIG. 4.

Figure 4:
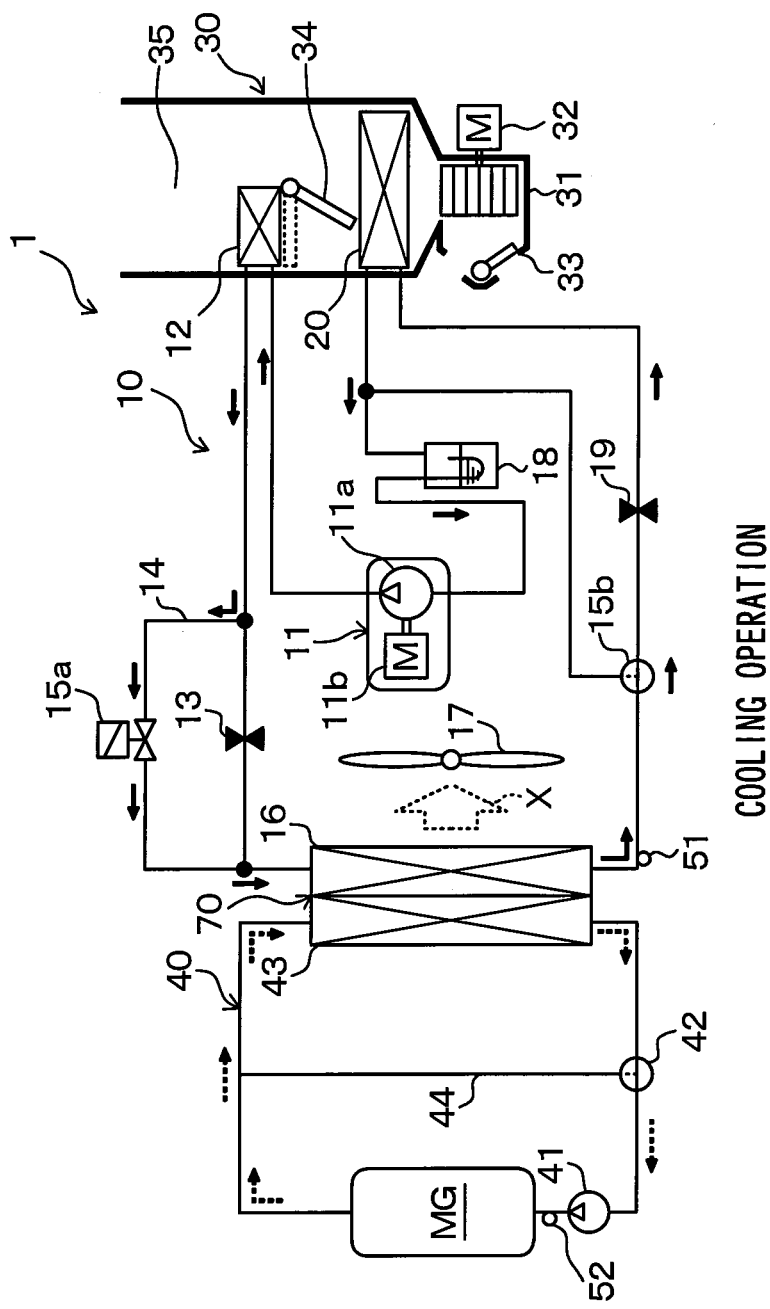
FIG. 4 is a schematic diagram illustrating a cooling operation of the vehicle air conditioner including the heat exchanger according to the first embodiment.

In this situation, the three-way valve 42 of the coolant circulation circuit 40 is switched to the coolant circuit that allows the coolant to flow into the radiator unit 43 when the coolant temperature Tw becomes equal to or higher than the reference temperature, and switched to the coolant circuit in which the coolant flows while bypassing the radiator unit 43 when the coolant temperature Tw becomes lower than the predetermined reference temperature. In FIG. 4, a flow of the coolant when the coolant temperature Tw becomes equal to or higher than the reference temperature is indicated by the dashed arrows.

In the heat pump cycle 10 during the cooling operation, the high pressure refrigerant discharged from the compressor 11 flows into the vehicle interior condenser 12, and conducts the heat exchange with the vehicle interior blowing air that has been blown from the blower 32 and passed through the vehicle interior evaporator 20 to radiate the heat. Since the on-off valve 15a is opened, the high pressure refrigerant flowing out of the vehicle interior condenser 12 flows into the vehicle exterior heat exchange unit 16 through the fixed aperture bypass passage 14. The high pressure refrigerant that has flowed into the vehicle exterior heat exchange unit 16 further radiates the heat to the outside air blown by the air blowing fan 17.

Since the three-way valve 15b is switched to the refrigerant passage that connects the outlet side of the vehicle exterior heat exchange unit 16 and the inlet side of the cooling fixed aperture 19, the refrigerant flowing out of the vehicle exterior heat exchange unit 16 is decompressed and expanded by the cooling fixed aperture 19. The refrigerant flowing out of the cooling fixed aperture 19 flows into the vehicle interior evaporator 20, absorbs heat from the vehicle interior blowing air blown by the blower 32, and is evaporated. As a result, the vehicle interior blowing air is cooled.

The refrigerant flowing from the vehicle interior evaporator 20 flows into the accumulator 18, and is separated into gas and liquid. Then, a gas phase refrigerant separated by the accumulator 18 is sucked into the compressor 11, and again compressed. As described above, in the cooling operation, the low pressure refrigerant absorbs the heat from the vehicle interior blowing air, and is evaporated by the vehicle interior evaporator 20 so that the vehicle interior blowing air can be cooled to cool the vehicle interior.

In the vehicle air conditioner 1 according to this embodiment, as described above, various operation can be executed by switching between the refrigerant passage of the heat pump cycle 10 and the coolant circuit of the coolant circulation circuit 40. Further, in this embodiment, since the above-mentioned characteristic heat exchanger 70 is applied, an appropriate heat exchange can be conducted among three types of fluids including the refrigerant, the coolant, and the outside air in the respective operation.

In more detail, in the heat exchanger 70 according to this embodiment, the outer fins 50 are arranged in the outdoor air passages 70a formed between the refrigerant tubes 16a of the vehicle exterior heat exchange unit 16 and the coolant tubes 43a of the radiator unit 43. Then, the heat transfer between the refrigerant tubes 16a and the coolant tubes 43a can be performed by the outer fins 50.

With the above configuration, in the defrosting operation, since the heat quantity of the coolant can be transferred to the vehicle exterior heat exchange unit 16 through the outer fins 50, the waste heat of the travel electric motor MG can be effectively used for the purpose of defrosting the vehicle exterior heat exchange unit 16.

Further, in this embodiment, in the defrosting operation, the actuation of the compressor 11 stops to reduce the refrigerant flow rate flowing into the vehicle exterior heat exchange unit 16. Therefore, the heat quantity to be transferred to the vehicle exterior heat exchange unit 16 through the outer fins 50 and the refrigerant tubes 16a can be prevented from being absorbed by the refrigerant flowing in the refrigerant tubes 16a. That is, unnecessary heat exchange between the coolant and the refrigerant can be suppressed.

Further, in the defrosting operation, since the actuation of the air blowing fan 17 stops to reduce the air volume of the outside air flowing into the outdoor air passages 70a, the heat quantity to be transferred to the vehicle exterior heat exchange unit 16 through the outer fins 50 can be prevented from being absorbed by the outside air flowing in the outdoor air passages 70a. That is, the unnecessary heat exchange between the coolant and the outside air can be suppressed.

Also, in the waste heat recovery operation, the heat exchange is conducted between the coolant and the refrigerant through the refrigerant tubes 16a, the coolant tubes 43a, and the outer fins 50 so that the waste heat of the travel electric motor MG can be absorbed by the refrigerant. Also, the heat exchange is conducted between the coolant and the outside air through the coolant tubes 43a and the outer fins 50 so that the unnecessary waste heat of the travel electric motor MG can be radiated to the outside air.

Also, in the normal heating operation, the heat exchange is conducted between the refrigerant and the outside air through the refrigerant tubes 16a and the outer fins 50 so that the heat quantity of the outside air can be absorbed by the refrigerant. Further, in the normal heating operation, the three-way valve 42 of the coolant circulation circuit 40 is switched to the coolant circuit that allows the coolant to flow while bypassing the radiator unit 43. Therefore, the unnecessary heat exchange between the coolant and the outside air is suppressed so that the waste heat of the travel electric motor MG can be stored in the coolant, and the warm-up of the travel electric motor MG can be facilitated.

Further, since the heat exchanger 70 according to this embodiment employs a configuration in which both the refrigerant tubes 16a and the coolant tubes 43a are fixed to both tanks of the refrigerant side tank unit 16c and the coolant side tank unit 43c, the configuration of the heat exchanger can be prevented from being complicated and upsized.

That is, both the refrigerant tubes 16a and the coolant tubes 43a are fixed to the refrigerant side tank unit 16c which is an essential configuration for collecting or distributing the refrigerant flowing through the refrigerant tubes 16a, and the coolant side tank unit 43c which is an essential configuration for collecting or distributing the coolant flowing through the coolant tubes 43a. With this configuration, both the tubes 16a and 43a can be formed into substantially the same shape. For example, a straight tube can be applied as both the tubes 16a and 43a.

Therefore, there is no need to employ a configuration in which one of the refrigerant tubes 16a and the coolant tubes 43a is curved, as a result of which the configuration of the overall heat exchanger 70 can be prevented from being complicated and upsized.

Further, in the heat exchanger 70 according to this embodiment, the refrigerant side intermediate plate member 162 is formed with the second communication holes 162a that communicate the refrigerant tubes 16a with an internal space of the refrigerant side tank formation member 163, and the coolant side intermediate plate member 432 is formed with the first communication holes 432a that communicates the coolant tubes 43a with an internal space of the coolant side tank formation member 433.

As a result, a configuration can be easily and surely realized in which even if both the tubes 16a and 43a are fixed to the refrigerant side tank unit 16c and the coolant side tank unit 43c, the refrigerant side tank unit 16c achieves a function of collecting or distributing the refrigerant flowing through the refrigerant tubes 16a, and the coolant side tank unit 43c achieves a function of collecting or distributing the coolant flowing through the coolant tubes 43a.

Further, in the heat exchanger 70 according to this embodiment, the refrigerant tubes 16a and the coolant tubes 43a are arranged in multiple rows in the flow direction X of the outside air flowing through the outside air passages 70a, and the coolant communication spaces 162c that communicate the respective coolant tubes 43a arranged in the flow direction X of the outside air with each other are formed between the refrigerant side fixing plate member 161 and the refrigerant side intermediate plate member 162.

In addition, the refrigerant communication spaces 432c that communicate the respective refrigerant tubes 16a arranged in the flow direction X of the outside air with each other are formed between the coolant side fixing plate member 431 and the coolant side intermediate plate member 432.

With the above configuration, the coolant communication spaces 162c as a passage for circulating the coolant flowing out of the coolant tubes 43a fixed to the refrigerant side tank unit 16c can be formed within the refrigerant side tank unit 16c, and the refrigerant communication spaces 432c as a passage for circulating the refrigerant flowing out of the refrigerant tubes 16a fixed to the coolant side tank unit 43c can be formed within the coolant side tank unit 43c. As a result, even in the heat exchanger in which the refrigerant tubes 16a and the coolant tubes 43a are arranged in multiple rows in the flow direction X of the outside air, the overall heat exchanger can be prevented from being upsized.

Further, in the heat exchanger 70 according to this embodiment, the coolant that is equal to or higher than 0° C., and higher in the temperature than the refrigerant in the collection space 163a and the distribution space 163b flows through the coolant communication spaces 162c formed within the refrigerant side tank unit 16c. With this configuration, during the defrosting operation, the amount of heat of the coolant can be transmitted to an outer wall of the refrigerant side tank unit 16c (specifically, the refrigerant side fixing plate member 161 and the refrigerant side tank formation member 163). As a result, the defrosting operation of the refrigerant side tank unit 16c can be promoted.

Also, in the coolant communication spaces 162c, the coolant is capable of flowing in contact with an outer wall of the refrigerant side tank unit 16c. As a result, heat transfer from the coolant to the outer wall of the refrigerant side tank unit 16c can be improved to further promote defrosting of the refrigerant side tank unit 16c.

Also, the coolant communication spaces 162c are arranged to be nearer to the exposed portion exposed to the external of the refrigerant tubes 16a than the collection space 163a and the distribution space 163b. As a result, the defrosting of the refrigerant side tank unit 16c can be efficiently conducted.

Also, the coolant communication spaces 162c are extended in the flow direction X of the outside air, and formed over the collection space 163a and the distribution space 163b. As a result, the coolant communication spaces 162c can be enlarged in the flow direction X of the outside air, and the coolant flows along the flow direction X of the outside air in the coolant communication spaces 162c with the result that the heat conductivity can be improved.

Also, in the flow direction X of the outside air, the width A1 of the coolant communication spaces 162c is set to be larger than the width A2 of the coolant tubes 43a. As a result, the heat of the coolant is likely to be transferred to a large area of the refrigerant side tank unit 16c, and the defrosting of the refrigerant side tank unit 16c can be further promoted.

Also, in the flow direction X of the outside air, the width A1 of the coolant communication spaces 162c is set to be larger than the respective widths A3 of the collection space 163a and the distribution space 163b. As a result, the heat of the coolant is likely to be transferred to the large area of the refrigerant side tank unit 16c, and the defrosting of the refrigerant side tank unit 16c can be further promoted. In particular, when the coolant communication spaces 162c are arranged to be nearer to the first tubes 16a than the collection space 163a and the distribution space 163b, that is, when the coolant communication spaces 162c are arranged to be nearer to the exposed portion of the refrigerant tubes 16a than the collection space 163a and the distribution space 163b, the cold heat of the refrigerant flowing through the collection space 163a and the distribution space 163b can be prevented from being transferred to the outer wall of the refrigerant side tank unit 16c which is located on the first tube 16a side.

Also, in the stack direction of the refrigerant tubes 16a and the coolant tubes 43a, the width B1 of the coolant communication spaces 162c is set to be larger than the width B2 of the coolant tubes 43a. As a result, the heat of coolant is likely to be transferred to the large area of the refrigerant side tank unit 16c, and the defrosting of the refrigerant side tank unit 16c can be further promoted.

Also, as illustrated in FIG. 7, since the coolant tubes 43a are connected to be communicated with the coolant communication spaces 162c formed within the refrigerant side tank unit 16c, the heat exchanger 70 does not need to be configured, for example, so that the coolant tubes 43a traverse the collection space 163a or the distribution space 163b of the refrigerant side tank unit 16c. For that reason, the refrigerant side tank unit 16c can be configured so that the coolant tubes 43a does not block the refrigerant flow in the stack direction of the tubes 16a and 43a within the collection space 163a and the distribution space 163b.

Also, as illustrated in FIG. 7(d), the coolant communication spaces 162c through which the coolant flows is arranged adjacent to connection portions (portions S in FIG. 7(d)) of the refrigerant side tank unit 16c which are connected with the refrigerant tubes 16a adjacent to the coolant tubes 43a connected to the coolant communication spaces 162c in the stack direction of the tubes 16a and 43a. For example, as found from a fact that the width B1 is larger than the width B2 as illustrated in FIG. 7(d), the coolant communication spaces 162c are arranged to be nearer to the refrigerant tubes 16a than the coolant tubes 43a adjacent to the refrigerant tubes 16a in the stack direction of the tubes 16a and 43a. In this configuration, for example, during the defrosting operation, the refrigerant side tank unit 16c is defrosted by the coolant within the coolant communication spaces 162c, which are higher in temperature than the refrigerant within the collection space 163a and the distribution space 163b of the refrigerant side tank unit 16c. Therefore, since the heat from the coolant within the coolant communication spaces 162c included in the refrigerant side tank unit 16c is effectively transferred to a portion of the refrigerant side tank unit 16c which is likely to be frosted, the frosting of the refrigerant side tank unit 16c can be promoted.

Also, the refrigerant tubes 16a and the coolant tubes 43a are arranged to be alternately stacked on each other at given intervals so that respective flat surfaces of their outer surfaces are parallel to each other, and face each other. That is, as illustrated in FIG. 7(d), the refrigerant tubes 16a and the coolant tubes 43a are spaced apart from each other. With this configuration, in the refrigerant side tank unit 16c, the coolant communication spaces 162c are sectioned to be surrounded by the members other than the refrigerant tubes 16a, and the heat exchanger 70 is configured so that the coolant within the coolant communication spaces 162c comes out of direct contact with the refrigerant tubes 16a. Therefore, as compared with a configuration in which the coolant within the coolant communication spaces 162c comes in direct contact with the refrigerant tubes 16a, since the heat from the coolant is hardly consumed by the refrigerant tubes 16a, the heat from the coolant can be efficiently transferred to the portion of the refrigerant side tank unit 16c, which is likely to be frosted.

Also, as understood from FIG. 7(d), the arrangement of the second communication holes 162a formed in the refrigerant side intermediate plate member 162, and the arrangement of the recesses 162b are replaced with each other in the refrigerant side tank unit 16c. The same arrangement replacement is also conducted in the coolant side intermediate plate member 432 of the coolant side tank unit 43c. With this configuration, the fluid (refrigerant, coolant) flowing through the respective tubes 16a and 43a can be replaced with each other. That is, that the refrigerant flows in the refrigerant tubes 16a, and the coolant flows in the coolant tubes 43a is determined on the basis of the arrangement of the second communication holes 162a in the refrigerant side intermediate plate member 162. Therefore, which of the multiple tubes 16a and 43a each fluid (refrigerant, coolant) is allowed to be circulated can be simply determined according to the configuration of the refrigerant side intermediate plate member 162.

Second Embodiment

In this embodiment, the refrigerant side intermediate plate member 162 is formed by stacking multiple plate members.

Figure 9:
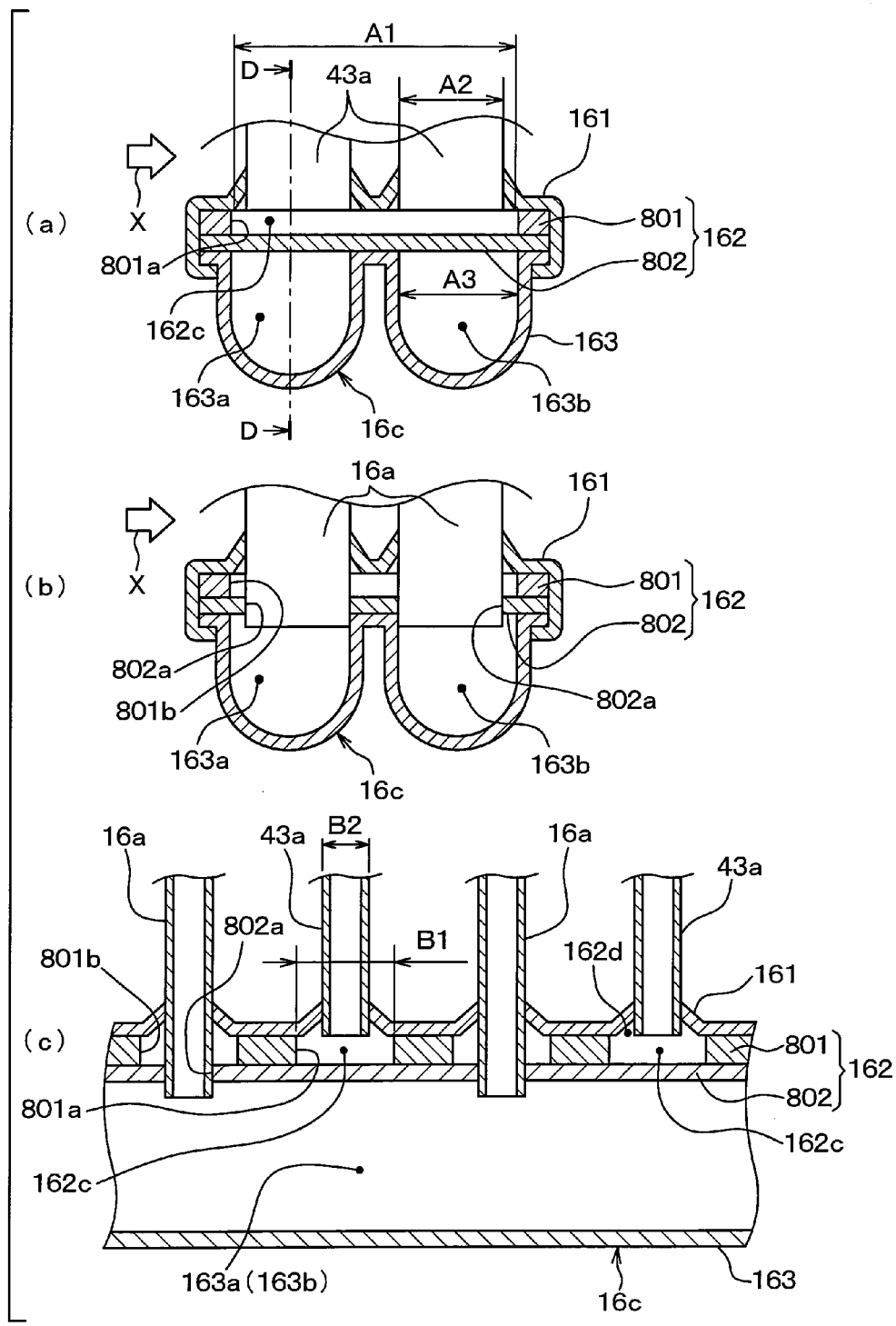
FIG. 9(a) is a cross-sectional view of a portion in which coolant tubes overlap with each other in an air flow direction in a refrigerant side tank unit of a heat exchanger according to a second embodiment of the present disclosure.
FIG. 9(b) is a cross-sectional view of a portion in which refrigerant tubes overlap with each other in the air flow direction in the refrigerant side tank unit of the heat exchanger according to the second embodiment.
FIG. 9(c) is a cross-sectional view taken along a line D-D in FIG. 9(a).

The detailed configuration of the heat exchanger 70 according to this embodiment will be described with reference to FIG. 9. FIG. 9(a) is a cross-sectional view of the heat exchanger 70, which corresponds to FIG. 7(b) of the first embodiment. FIG. 9(b) is a cross-sectional view of the heat exchanger 70, which corresponds to FIG. 7(c) of the first embodiment. In FIG. 9, parts identical with or equivalent to those in the first embodiment are denoted by the same symbols. The same is applied to the following drawings.

The refrigerant side intermediate plate member 162 is formed by stacking two plate members of a communication space formation plate member 801 and a partition plate member 802 on each other. The communication space formation plate member 801 is arranged on the coolant tubes 43a side (upper side of FIG. 9), and the partition plate member 802 is arranged on an opposite side (lower side of FIG. 9) of the coolant tubes 43a.

As illustrated in FIG. 9(a), multiple through-holes 801a that penetrate through both sides of the communication space formation plate member 801 are formed in portions of the communication space formation plate member 801, which correspond to the coolant tubes 43a. The multiple through-holes 801a extend in the flow direction X of the outside air, and closed by the partition plate member 802 from an opposite side of the coolant tubes 43a. With this configuration, each inner space of the through-holes 801a functions as the coolant communication space 162c that communicate the respective coolant tubes 43a aligned in two rows in the flow direction X of the outside air with each other.

As illustrated in FIG. 9(b), multiple through-holes 801b that penetrate through both sides of the communication space formation plate member 801 are formed in portions of the communication space formation plate member 801, which correspond to the refrigerant tubes 16a. The multiple through-holes 801b overlap with the through-hole 802a formed in the partition plate member 802.

Also, as illustrated in FIG. 9(c), leading ends of the coolant tubes 43a are protruded into the respective coolant communication spaces 162c, as a result of which coolant tube adjacent spaces 162d that come in contact with the leading ends of the coolant tubes 43a in the stack direction of the tubes 16a and 43a are formed within the respective coolant communication spaces 162c. That is, the coolant communication spaces 162c include the respective coolant tube adjacent spaces 162d. The coolant within the coolant tube adjacent spaces 162d comes into contact with an outer wall of the refrigerant side tank unit 16c between the refrigerant tubes 16a and the coolant tubes 43a, which are adjacent to each other. Specifically, the coolant comes into contact with the refrigerant side fixing plate member 161 that configures a part of the outer wall of the refrigerant side tank unit 16c. With this configuration, the heat from the coolant within the coolant communication spaces 162c can be efficiently transferred to a portion of the outer wall of the refrigerant side tank unit 16c, which is likely to be frosted, for example, the outer wall of the refrigerant side tank unit 16c on a side connected with the refrigerant tubes 16a. The coolant tube adjacent spaces 162d may correspond to second tube adjacent spaces according to the present disclosure.

The refrigerant tubes 16a penetrate through the through-holes 801b of the communication space formation plate member 801, and the through-hole 802a of the partition plate member 802. With this configuration, the refrigerant tubes 16a are communicated with the space formed within the refrigerant side tank formation member 163.

The coolant communication spaces 162c are formed in the same manner as that in the first embodiment. That is, at least a part of the coolant communication spaces 162c is separated by only the external of the refrigerant side tank unit 16c and the refrigerant side fixing plate member 161. Therefore, in the coolant communication spaces 162c, the coolant can be circulated in contact with the outer wall of the refrigerant side tank unit 16c.

The coolant communication spaces 162c are arranged to be nearer to the refrigerant tubes 16a than the collection space 163a and the distribution space 163b. Also, the coolant communication spaces 162c are extended in the flow direction X of the outside air, and formed over both the collection space 163a and the distribution space 163b.

In the flow direction X of the outside air, the width A1 of the coolant communication spaces 162c is set to be larger than the width A2 of the coolant tubes 43a. Also, in the flow direction X of the outside air, the width A1 of the coolant communication spaces 162c is set to be larger than the respective widths A3 of the collection space 163a and the distribution space 163b.

As illustrated in FIG. 9(c), in the stack direction of the refrigerant tubes 16a and the coolant tubes 43a, the width B1 of the coolant communication spaces 162c is set to be larger than the width B2 of the coolant tubes 43a.

For that reason, also in this embodiment, as in the first embodiment, the frosting of the refrigerant side tank unit 16c can be promoted.

Further, according to this embodiment, the through-holes 801a and 801b of the communication space formation plate member 801, and the through-hole 802a of the partition plate member 802 can be formed by simple hole processing. As a result, the manufacture is facilitated as compared with a case in which the recesses 162b are formed in the refrigerant side intermediate plate member 162 as in the first embodiment.

Third Embodiment

Figure 10:
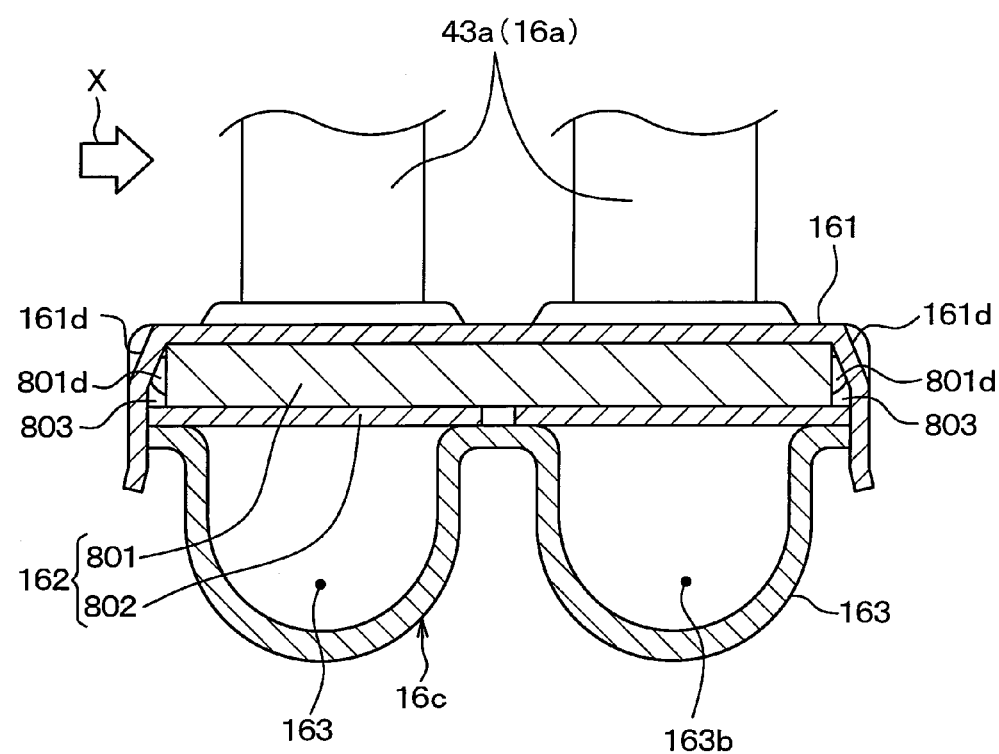
FIG. 10 is a cross-sectional view of a refrigerant side tank unit according to a third embodiment of the present disclosure.
Figure 11:
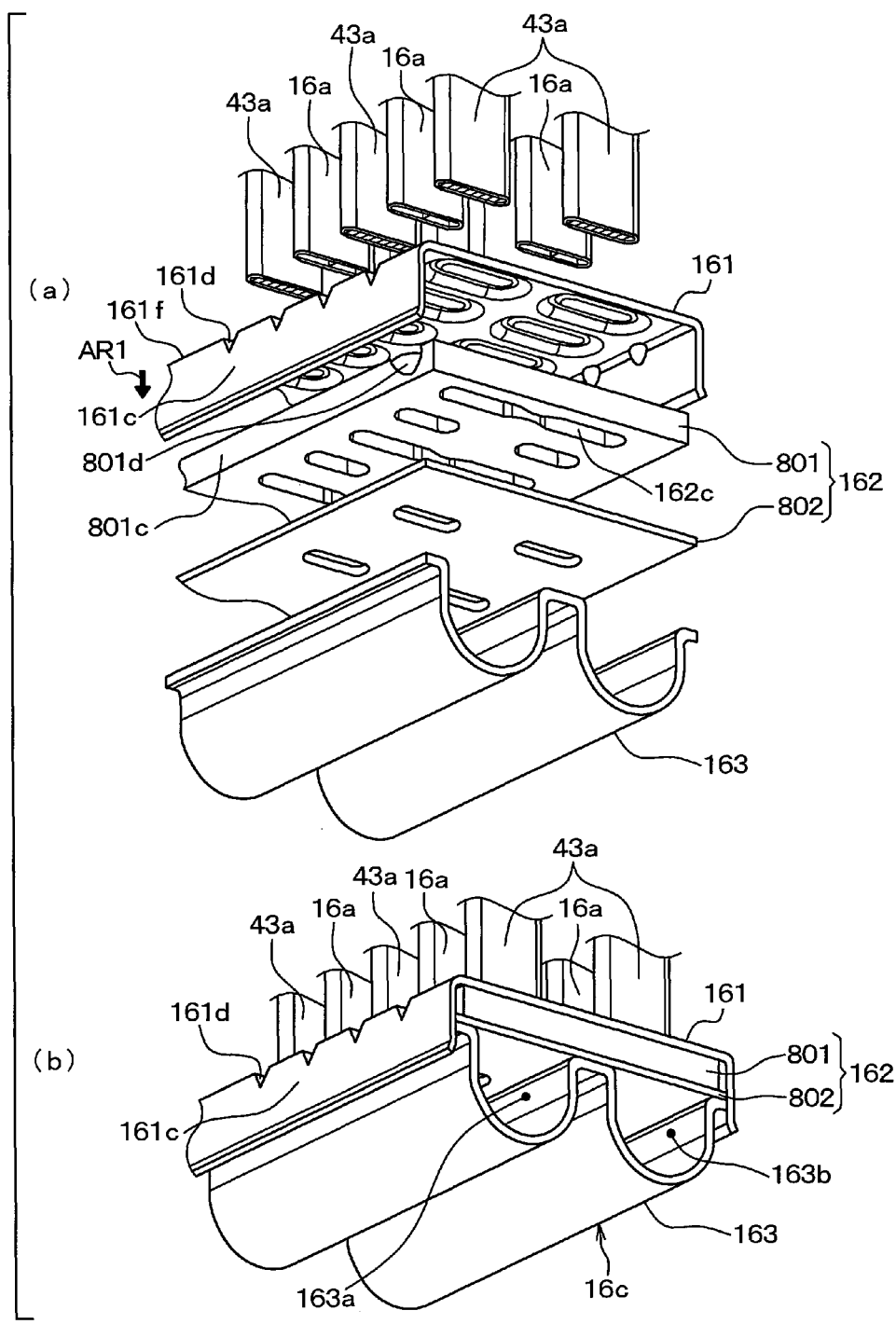
FIG. 11(a) is a disassembled view of the refrigerant side tank unit according to the third embodiment.
FIG. 11(b) is an assembled view of the refrigerant side tank unit according to the third embodiment.

In this embodiment, as illustrated in FIGS. 10 and 11, drain ditches for improving a drainage performance of the melted water defrosted by the vehicle exterior heat exchange unit 16 are formed in side surfaces of the refrigerant side tank unit 16c.

FIG. 10 is a cross-sectional view of the tank unit 16c according to this embodiment. FIG. 11(a) is an exploded view of the tank unit 16c according to this embodiment, and FIG. 11(b) is a perspective view of the tank unit 16c according to this embodiment.

As described above, the refrigerant side tank unit 16c includes the refrigerant side fixing plate member 161 (outer wall component) to which both the refrigerant tubes 16a and the coolant tubes 43a are fixed, the refrigerant side intermediate plate member 162 (intermediate plate member) fixed to the refrigerant side fixing plate member 161, and a refrigerant side tank formation member 163 (outer wall component).

The refrigerant side tank formation member 163 is fixed to the refrigerant side fixing plate member 161 and the refrigerant side intermediate plate member 162, to thereby form the collection space 163a for collecting the refrigerant, and the distribution space 163b for distributing the refrigerant therein. The collection space 163a and the distribution space 163b may be used as an example of the first tank space.

The refrigerant side intermediate plate member 162 is formed by stacking two plate members of the communication space formation plate member 801 (tube side plate member) and the partition plate member 802 on each other. The communication space formation plate member 801 is arranged on the coolant tubes 43a side, and the partition plate member 802 is arranged on an opposite side of the coolant tubes 43a.

Further, multiple protrusions 801d that contact a side wall portion 161c of the refrigerant side fixing plate member 161 are locally formed on a side surface portion 801c of the communication space formation plate member 801.

Separation spaces 803 separated from the collection space 163a and the distribution space 163b by the partition plate member 802 are formed between portions of the side surface portion 801c of the communication space formation plate member 801 in which the protrusions 801d are not formed, and the side wall portion 161c of the refrigerant side fixing plate member 161.

Recesses 161d concaved toward the separation spaces 803 are formed in portions of the side wall portion 161c of the refrigerant side fixing plate member 161 which do not contact the protrusions 801d of the communication space formation plate member 801. Specifically, the recesses 161d are formed toward an inside (a direction of an arrow AR1 in FIG. 11) of the side wall portion 161c from an end edge 161f of the side wall portion 161c on the refrigerant tubes 16a side in the side wall portion 161c, when viewing the side wall portion 161c along the flow direction X of the outside air (refer to FIG. 10). A width dimension of the recesses 161d in the stack direction of the tubes 16a and 43a on an outer surface of the side wall portion 161c is smaller from the end edge 161f of the side wall portion 161c on the refrigerant tubes 16a side toward the inside of the side wall portion 161c.

According to this embodiment, the melted water defrosted by the vehicle exterior heat exchange unit 16 flows into the recesses 161d of the refrigerant side fixing plate member 161, and flows down toward a lower side of the refrigerant side tank unit 16c. That is, the recesses 161d of the refrigerant side fixing plate member 161 achieve a function of the drain ditches.

For that reason, even if the refrigerant side tank unit 16c is protruded toward the outside (left side and right side in FIG. 10) more than the tubes 16a and 43a in the flow direction X of the outside air, the drainage performance of the melted water defrosted by the vehicle exterior heat exchange unit 16 can be improved.

Also, the recesses 161d of the refrigerant side fixing plate member 161 are concaved toward the separation spaces 803 separated from the collection space 163a and the distribution space 163b by the partition plate member 802. As a result, the drain ditches can be formed in the side surfaces of the tank unit 16c without damaging sealing of the collection space 163a and the distribution space 163b.

Fourth Embodiment

Figure 12:
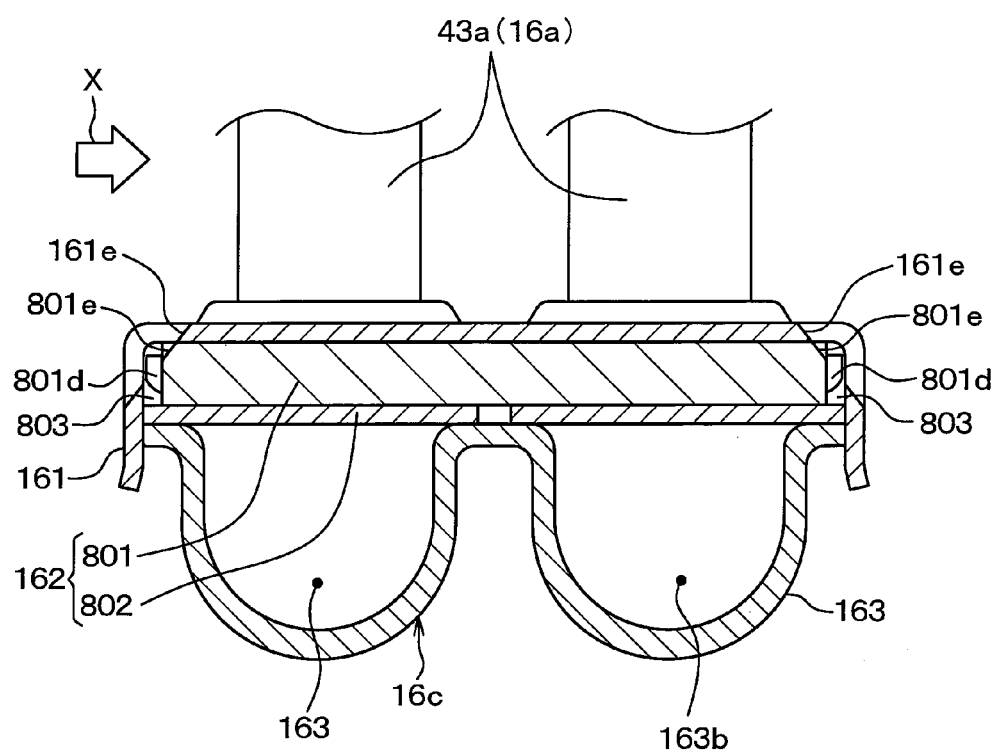
FIG. 12 is a cross-sectional view of a refrigerant side tank unit according to a fourth embodiment of the present disclosure.
Figure 13:
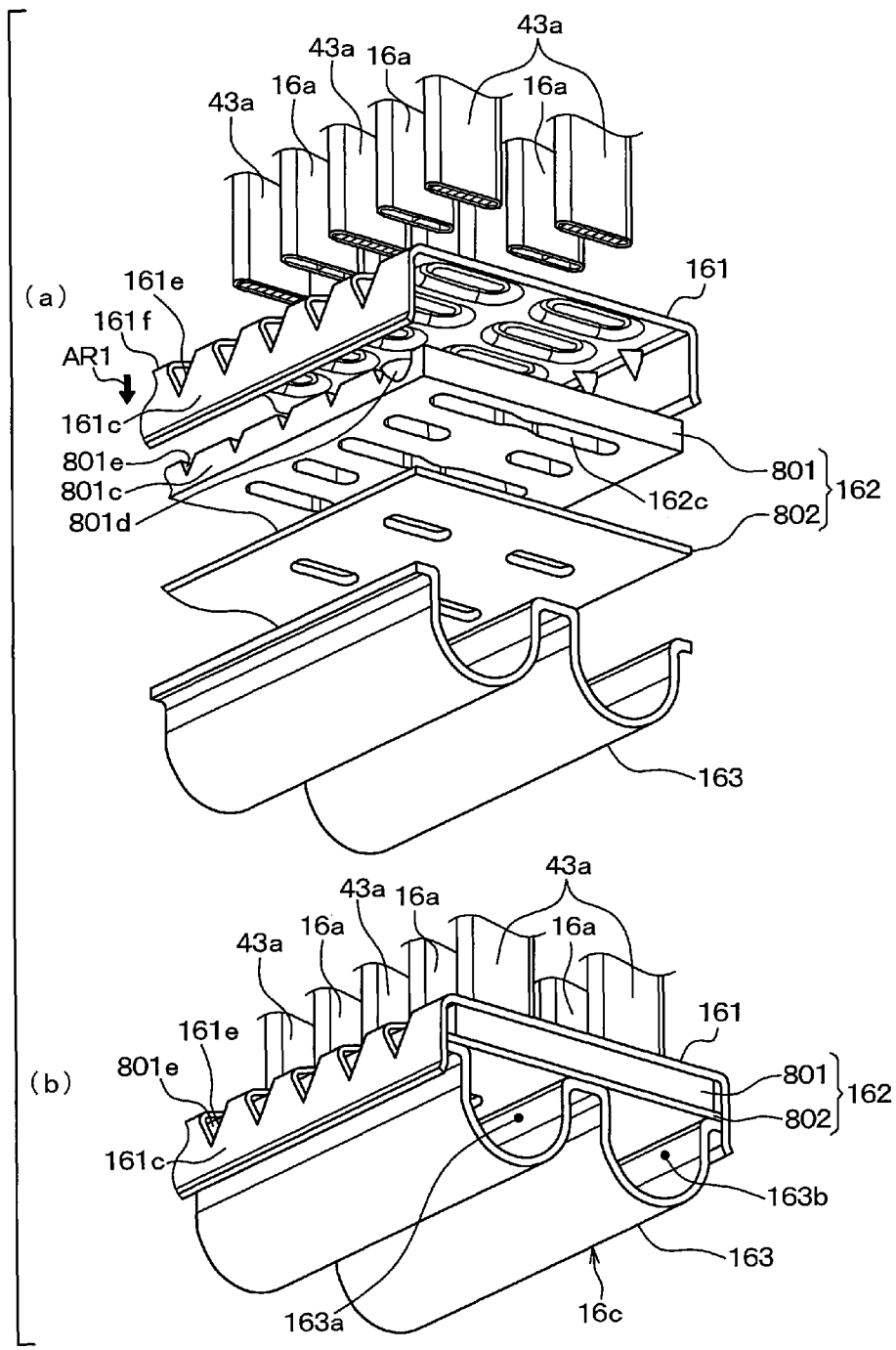
FIG. 13(a) is a disassembled view of the refrigerant side tank unit according to the fourth embodiment.
FIG. 13(b) is an assembled view of the refrigerant side tank unit according to the fourth embodiment.

In the above third embodiment, the recesses 161d formed in the refrigerant side fixing plate member 161 function as the drain ditches. On the other hand, in this fourth embodiment, as illustrated in FIGS. 12 and 13, notches 161e formed in the refrigerant side fixing plate member 161, and cuts 801e formed in the communication space formation plate member 801 function as the drain ditches.

The cuts 801e cut toward the inside of the communication space formation plate member 801 are formed in the side surface portion 801c of the communication space formation plate member 801.

The notches 161e notches toward the separation spaces 803 and the cut 801e are formed in portions of the side wall portion 161c of the refrigerant side fixing plate member 161, which correspond to the cut 801e of the communication space formation plate member 801. Specifically, the notches 161e are formed toward an inside (a direction of an arrow AR1 in FIG. 13) of the side wall portion 161c from the end edge 161f of the side wall portion 161c on the refrigerant tubes 16a side in the side wall portion 161c, when viewing the side wall portion 161c along the flow direction X of the outside air (refer to FIG. 12). A width dimension of the notches 161e in the stack direction of the tubes 16a and 43a on the outer surface of the side wall portion 161c is smaller from the end edge 161f of the side wall portion 161c on the refrigerant tubes 16a side toward the inside of the side wall portion 161c.

According to this embodiment, as in the above third embodiment, the drainage performance of the melted water defrosted by the vehicle exterior heat exchange unit 16 can be improved.

Also, the cut 801e corresponding to the notches 161e of the refrigerant side fixing plate member 161 is formed in the communication space formation plate member 801, and no cut is formed in the partition plate member 802. As a result, the drain ditches can be formed in the side surfaces of the tank unit 16c without damaging sealing of the collection space 163a and the distribution space 163b.

The notches 161e may be replaced with the same recesses as the recesses 161d in the above third embodiment. Also, the protrusions 801d of the communication space formation plate member 801 may be eliminated so that the separation spaces 803 are not formed.

Fifth Embodiment

Figure 14:
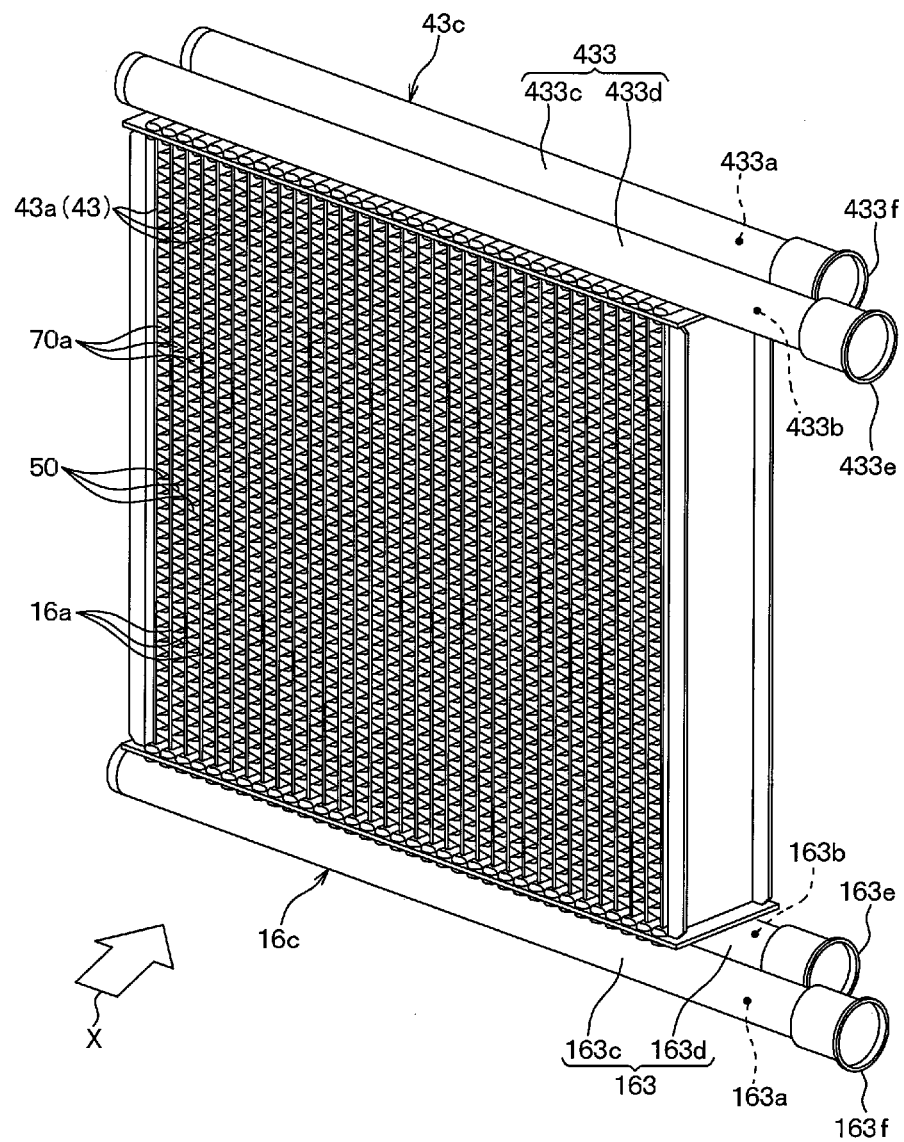
FIG. 14 is a perspective view of a heat exchanger according to a fifth embodiment of the present disclosure.

In this embodiment, an example in which the configuration of the heat exchanger 70 is changed in the first embodiment will be described. The detailed configuration of the heat exchanger 70 according to this embodiment will be described with reference to FIGS. 14 and 15. FIG. 14 is an external perspective view of the heat exchanger 70, which corresponds to FIG. 5 of the first embodiment. Also, FIG. 15 is an exploded view of the heat exchanger 70, which corresponds to FIG. 6 of the first embodiment.

Figure 15:
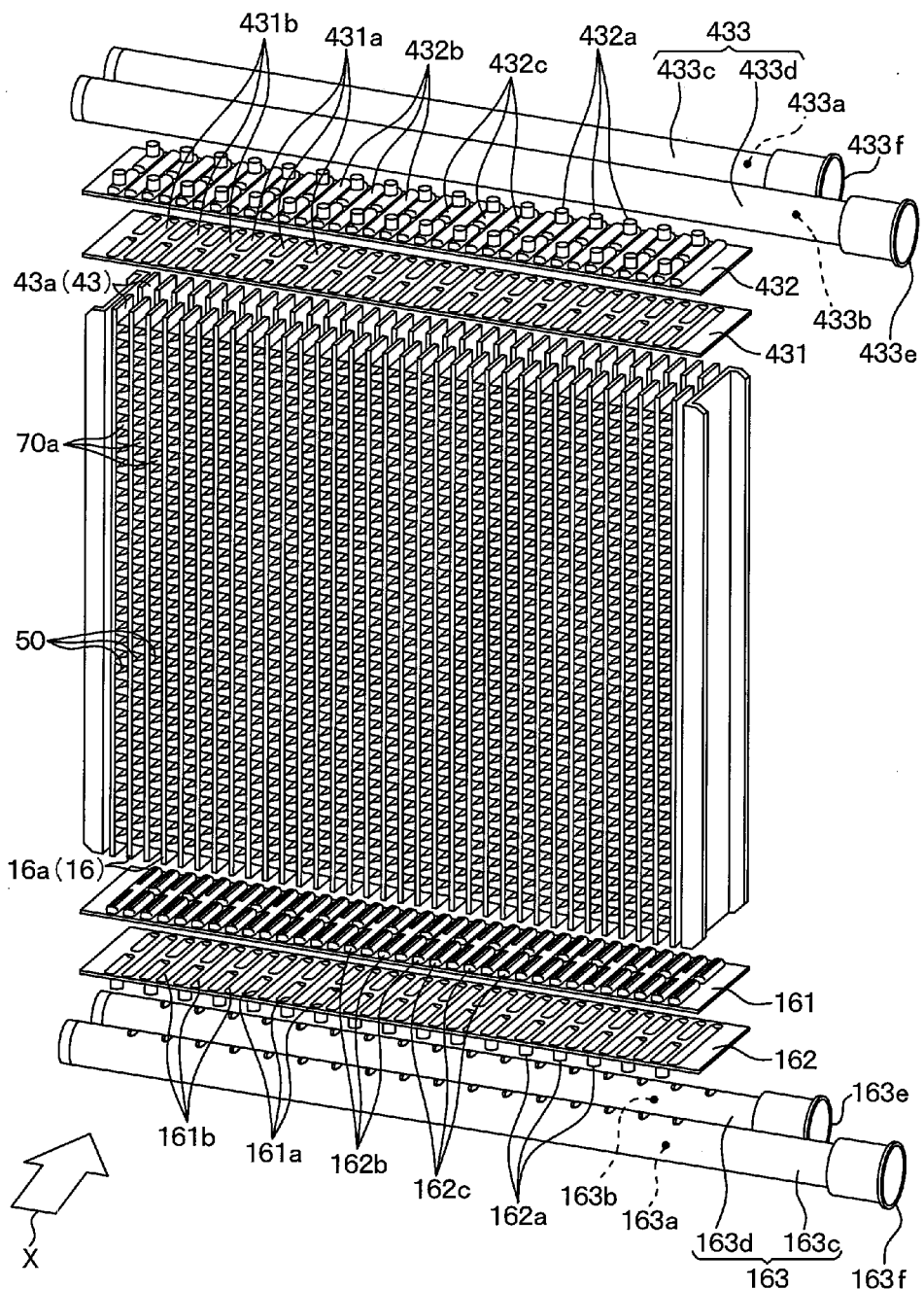
FIG. 15 is an exploded view of the heat exchanger according to the fifth embodiment.

First, as illustrated in FIGS. 14 and 15, as in the first embodiment, the vehicle exterior heat exchange unit 16 and the radiator unit 43 of the heat exchanger 70 are each configured by a so-called tank and tube type heat exchanger structure having the refrigerant tubes 16a and the coolant tubes 43a.

Also, in this embodiment, the basic configurations of the refrigerant side tank unit 16c and the coolant side tank unit 43c are identical with each other. First, the refrigerant side tank unit 16c according to this embodiment includes the refrigerant side fixing plate member 161 and the refrigerant side intermediate plate member 162 as well as a refrigerant side collection tank formation member 163c and a refrigerant side distribution tank formation member 163d as the refrigerant side tank formation member 163.

Further, the refrigerant side collection tank formation member 163c and the refrigerant side distribution tank formation member 163d are each made of a tubular member, and have the collection space 163a and the distribution space 163b independent from each other formed therein.

An end of one end side of the refrigerant side distribution tank formation member 163d in the longitudinal direction thereof is provided with a refrigerant inflow port 163e that allows the refrigerant to flow into the distribution space 163b formed therein, and an end of the other end side thereof is closed. Also, an end of one end side of the refrigerant side collection tank formation member 163c in the longitudinal direction thereof is provided with a refrigerant outflow port 163f that allows the refrigerant to flow out of the collection space 163a formed therein, and the other end side thereof is closed.

Also, the refrigerant side intermediate plate member 162 according to this embodiment is formed with the second communication holes 162a that penetrate through both sides of the refrigerant side intermediate plate member 162. The refrigerant tubes 16a arrayed on the windward side in the flow direction X of the outside air are communicated with the collection space 163a through the second communication holes 162a, and the refrigerant tubes 16a arrayed on the leeward side in the flow direction X of the outside air are communicated with the distribution space 163b.

Further, the same recesses as those in the first embodiment are formed at portions corresponding to the refrigerant tubes 16a and the coolant tubes 43a in the refrigerant side intermediate plate member 162 and the refrigerant side fixing plate member 161 according to this embodiment, respectively.

In more detail, the recesses 162b formed in portions corresponding to the coolant tubes 43a, and the recesses 162c formed in portions corresponding to the refrigerant tubes 16a are provided in the refrigerant side intermediate plate member 162. The recesses 161b formed in portions corresponding to the coolant tubes 43a, and the recesses 161a formed in portions corresponding to the refrigerant tubes 16a are provided in the refrigerant side fixing plate member 161.

Therefore, the refrigerant side intermediate plate member 162 and the refrigerant side fixing plate member 161 are fixed so that spaces are formed between the respective recesses 162c and 161a formed in the portions corresponding to the refrigerant tubes 16a, and spaces are formed between the respective recesses 162b and 161b formed in the portions corresponding to the coolant tubes 43a.

Further, the recesses 162b and 161b formed in the portions corresponding to the coolant tubes 43a extend to an area communicated with both of the coolant tubes 43a aligned in two rows in the flow direction X of the outside air. With this configuration, the spaces formed between the respective recesses 162b and 161b formed in the portions corresponding to the coolant tubes 43a function as the coolant communication spaces that communicate the respective coolant tubes 43a aligned in two rows in the flow direction X of the outside air with each other.

On the other hand, the coolant side tank unit 43c includes the coolant side fixing plate member 431 and the coolant side intermediate plate member 432 having the same configuration as those the refrigerant side tank unit 16c. The coolant side tank unit 43c also includes a coolant side collection tank formation member 433c and a coolant side distribution tank formation member 433d as a coolant side tank formation member 433.

An end of one end side of the coolant side distribution tank formation member 433d in the longitudinal direction thereof is provided with a coolant inflow port 433e that allows the coolant to flow into the distribution space 433b formed therein, and an end of the other end side thereof is closed. Also, an end of one end side of the coolant side collection tank formation member 433c in the longitudinal direction thereof is provided with a coolant outflow port 433f that allows the coolant to flow out of the collection space 433a formed therein, and the other end side thereof is closed.

Further, the coolant side intermediate plate member 432 according to this embodiment is formed with the first communication holes 432a that penetrate through both sides of the coolant side intermediate plate member 432. The coolant tubes 43a arrayed on the windward side in the flow direction X of the outside air are communicated with the distribution space 433b through the first communication holes 432a, and the coolant tubes 43a arrayed on the leeward side in the flow direction X of the outside air are communicated with the collection space 433a.

Also, between the coolant side fixing plate member 431 and the coolant side intermediate plate member 432, spaces are formed between the respective recesses 432c and 431a formed in the portions corresponding to the coolant tubes 43a, and spaces are formed between the respective recesses 432b and 431b formed in the portions corresponding to the refrigerant tubes 16a.

With the above configuration, entirely like FIG. 8 of the first embodiment, in the heat exchanger 70 according to this embodiment, the refrigerant and the coolant can flow therein. The other configurations and actuations of the heat pump cycle 10 (vehicle air conditioner 1) are completely identical with those in the first embodiment. Therefore, even if the vehicle air conditioner 1 according to this embodiment is actuated, the same advantages as those in the first embodiment can be obtained.

Further, in the heat exchanger 70 according to this embodiment, the refrigerant side collection tank formation member 163c and the refrigerant side distribution tank formation member 163d, which are each formed of a tubular member, are employed as the refrigerant side tank formation member 163. The coolant side collection tank formation member 433c and the coolant side distribution tank formation member 433d, which are each formed of a tubular member, are employed as the coolant side tank formation member 433. With the above configuration, the refrigerant side tank formation member 163 and the coolant side tank formation member 434 can be easily formed at low costs.

Further, the heat exchanger 70 according to this embodiment is configured so that the spaces communicated with the respective tubes 16a and 43a are formed between the refrigerant side fixing plate member 161 and the refrigerant side intermediate plate member 162, and the spaces communicated with the respective tubes 16a and 43a are formed between the coolant side fixing plate member 431 and the coolant side intermediate plate member 432.

With the above configuration, there is no need to employ the configuration in which the refrigerant tubes 16a are protruded toward the refrigerant side tank unit 16c more than the coolant tubes 43a, and the configuration in which the coolant tubes 43a are protruded toward the coolant side tank unit 43c side more than the refrigerant tubes 16a. Therefore, the work of positioning the respective tubes 16a and 43a to the respective tank units 16c and 43c is easy, and the respective tubes 16a and 43a can be easily fixed (specifically, to the respective refrigerant side fixing plate members 161 and 431).

Sixth Embodiment

Figure 16:
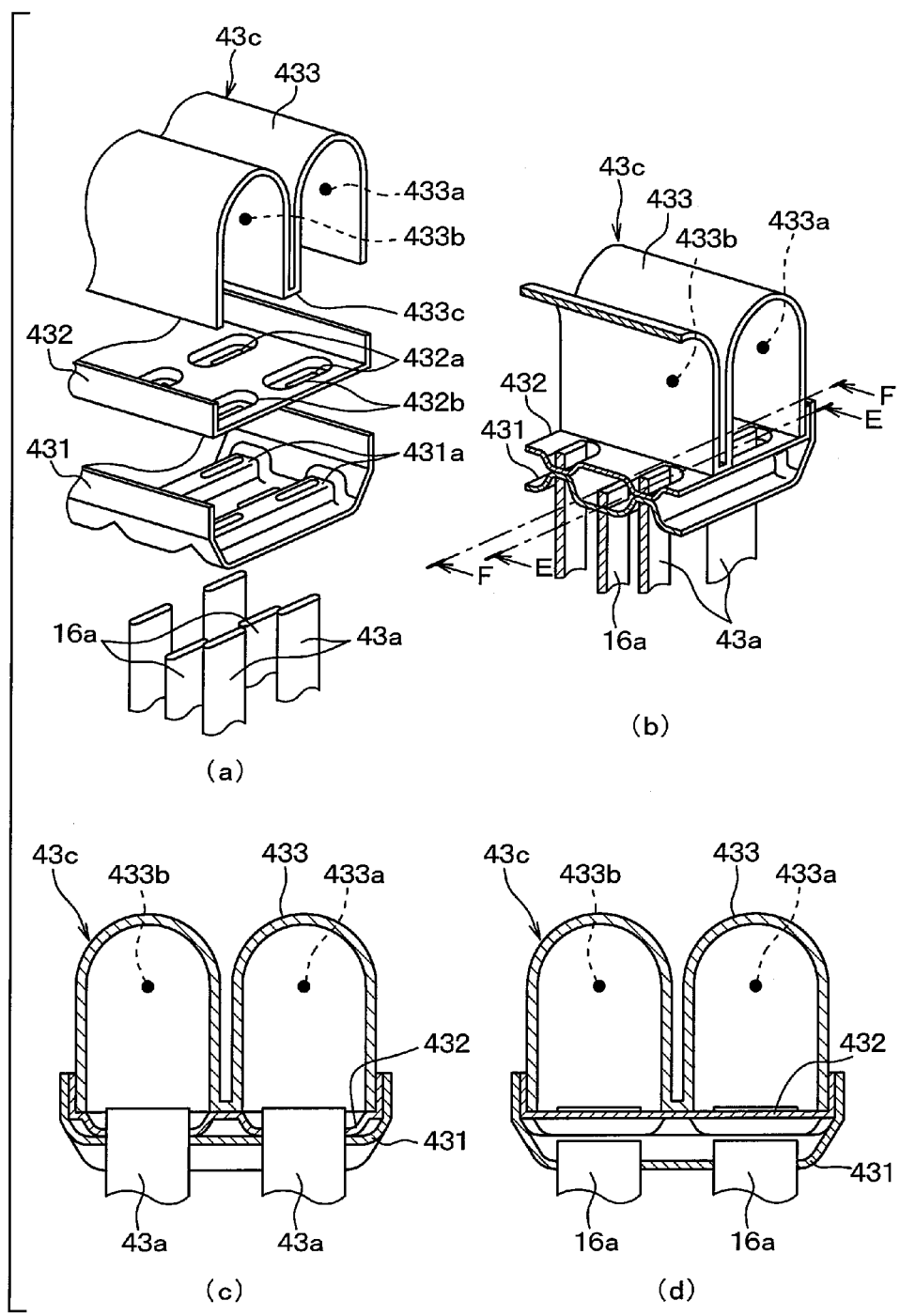
FIG. 16(a) is an exploded view of a heat exchanger according to a sixth embodiment of the present disclosure, which corresponds to a portion B in FIG. 6.
FIG. 16(b) is a partially cross-sectional perspective view of a portion corresponding to FIG. 16(a).
FIG. 16(c) is a cross-sectional view taken along a line E-E in FIG. 16(b).
FIG. 16(d) is a cross-sectional view taken along a line F-F in FIG. 16(b).

In this embodiment, an example in which the configuration of the heat exchanger 70 is changed in the first embodiment will be described. The detailed configuration of the heat exchanger 70 according to this embodiment will be described with reference to FIG. 16. FIG. 16(a) is an exploded view of the heat exchanger 70 according to this embodiment, which corresponds to a portion B in FIG. 6 of the first embodiment. Also, FIG. 16(b) is a partially cross-sectional perspective view of a portion corresponding to FIG. 16(a). Further, FIG. 16(c) is a cross-sectional view taken along a line E-E in FIG. 16(b). FIG. 16(d) is a cross-sectional view taken along a line F-F in FIG. 16(b).

More specifically, in the heat exchanger 70 according to this embodiment, the configurations of the refrigerant side fixing plate member 161 and the refrigerant side intermediate plate member 162 in the refrigerant side tank unit 16c, as well as the coolant side fixing plate member 431 and the coolant side intermediate plate member 432 in the coolant side tank unit 43c is changed in the first embodiment.

As in the first embodiment, since the basic configurations of the refrigerant side tank unit 16c and the coolant side tank unit 43c are identical with each other, the following description will be given of the coolant side tank unit 43c.

First, as illustrated in FIG. 16(a), the coolant side fixing plate member 431 according to this embodiment is formed with recesses 431a concaved toward the coolant side tank formation member 433. The refrigerant tubes 16a are fixed to portions of the coolant side fixing plate member 431 in which the coolant tubes 43a are fixed to the recesses 431a, and the recesses 431a are not formed.

Therefore, as in the first embodiment, on an end of the coolant side tank unit 43c side, the coolant tubes 43a are protruded toward the coolant side tank unit 43c side more than the refrigerant tubes 16a. That is, an end of the refrigerant tubes 16a on the coolant side tank unit 43c side and an end of the coolant tubes 43a on the coolant side tank unit 43c side are unevenly arranged.

Also, the coolant side intermediate plate member 432 is formed with the recesses 432b concaved toward an opposite side of the coolant side tank formation member 433 contrary to the first embodiment. The recesses 432b are formed at positions corresponding to the recesses 431a of the coolant side fixing plate member 431, and the first communication holes 432a through which the coolant tubes 43a penetrate are formed in the recesses 432b.

For that reason, as illustrated in FIG. 16(b), when the coolant side fixing plate member 431 and the coolant side intermediate plate member 432 are fixed, the recesses 431a of the coolant side fixing plate member 431 contact the recesses 432b of the coolant side intermediate plate member 432.

As illustrated in FIG. 16(c), the coolant tubes 43a penetrate through the first communication holes 432a, and are communicated with the collection space 433a or the distribution space 433b which are formed within the coolant side tank formation member 433.

On the other hand, as illustrated in FIG. 16(d), a refrigerant communication space that communicates the respective refrigerant tubes 16a aligned in two rows in the flow direction X of the outside air with each other is formed in a portion in which the recesses 431a of the coolant side fixing plate member 431 do not contact the recesses 432b of the coolant side intermediate plate member 432.

The other configurations of the heat exchanger 70 are identical with those in the first embodiment. Therefore, in the heat exchanger 70 according to this embodiment, as in FIG. 8 of the first embodiment, the refrigerant and the coolant can flow therein. As a result, even if the vehicle air conditioner 1 according to this embodiment is actuated, the same advantages as those in the first embodiment can be obtained.

Further, in the coolant side tank unit 43c of the heat exchanger 70 according to this embodiment, since the recesses 431a and 432b are formed in both the coolant side fixing plate member 431 and the coolant side intermediate plate member 432, the coolant tubes 43a can be easily communicated with the space formed within the coolant side tank formation member 433, and the refrigerant communication space can be easily formed.

Further, in the heat exchanger 70 according to this embodiment, since the recesses 432b of the coolant side intermediate plate member 432 are recessed toward an opposite side of the coolant side tank formation member 433, the center portion 433c of the coolant side tank formation member 433 which sections the collection space 433a and the distribution space 433b can be formed into a flat shape.

As a result, a joint failure when the center portion 433c of the coolant side tank formation member 433 and the coolant side intermediate plate member 432 are brazed together is suppressed, and a sealing failure between the collection space 433a and the distribution space 433b can be suppressed.

Further, when the recesses 431a and 432b are formed in both of the plate members 431 and 432 as in this embodiment, the recess direction or the recess amount of both of the recesses 431a and 432b is adjusted. As a result, the ends of the coolant tubes 43a on the coolant side tank unit 43c side are not protruded more than the ends of the refrigerant tubes 16a on the coolant side tank unit 43c side, and the positions of those ends can be aligned.

In the above description, the detailed description of the refrigerant side tank unit 16c is omitted. However, in this embodiment, the same recesses as those on the coolant side tank unit 43c side are formed in both the refrigerant side fixing plate member 161 and the refrigerant side intermediate plate member 162 of the refrigerant side tank unit 16c.

Seventh Embodiment

Figure 17:
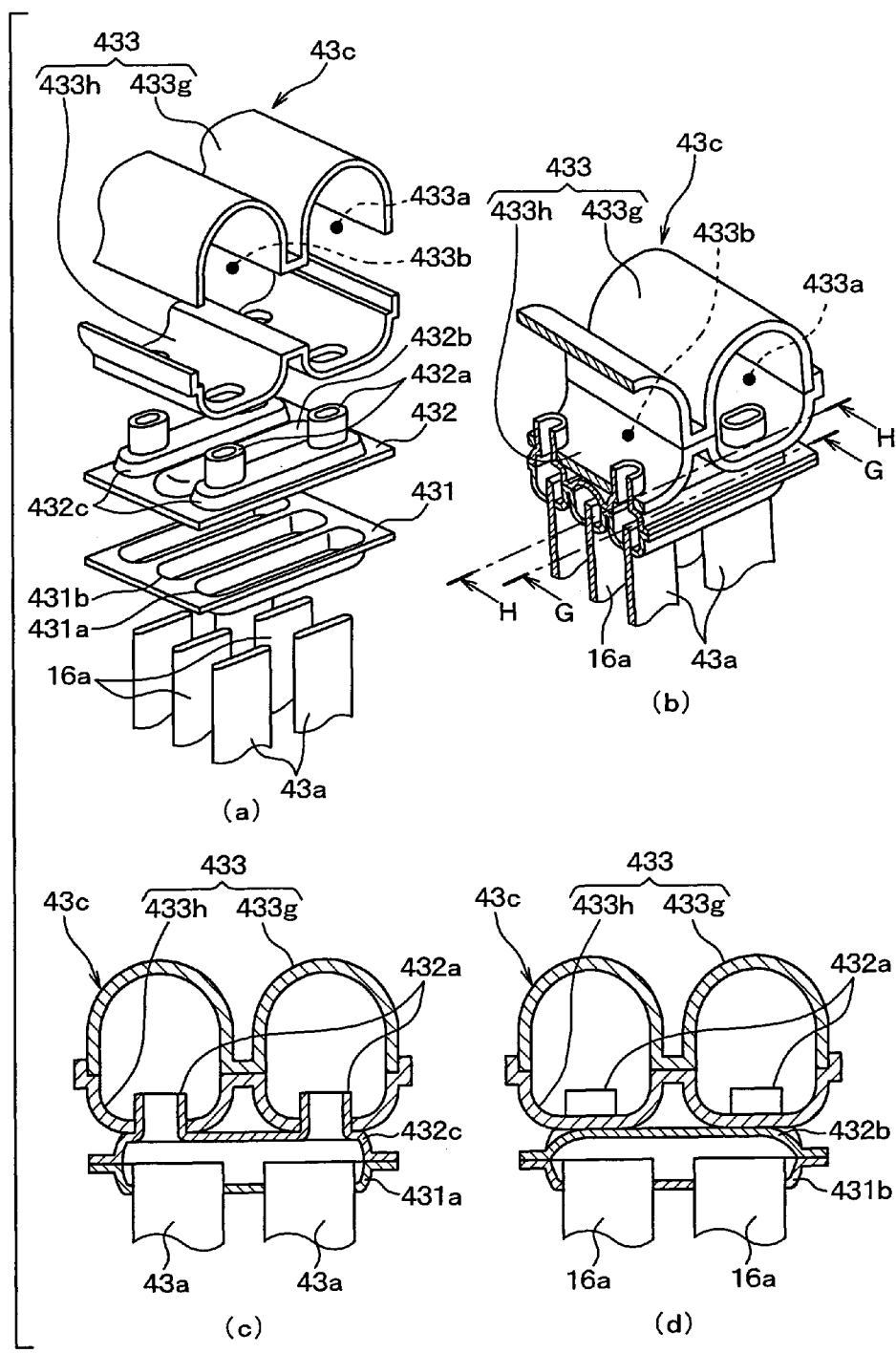
FIG. 17(a) is an exploded view of a heat exchanger according to a seventh embodiment of the present disclosure, which corresponds to a portion B in FIG. 6.
FIG. 17(b) is a partially cross-sectional perspective view of a portion corresponding to FIG. 17(a).
FIG. 17(c) is a cross-sectional view taken along a line G-G in FIG. 17(b).
FIG. 17(d) is a cross-sectional taken along a line H-H in FIG. 17(b).

In this embodiment, an example in which the configuration of the heat exchanger 70 is changed in the fifth embodiment will be described. The detailed configuration of the heat exchanger 70 according to this embodiment will be described with reference to FIG. 17. FIG. 17(a) is an exploded perspective view of the heat exchanger 70 according to this embodiment, which illustrates an enlarged portion corresponding to a portion B in FIG. 6. Also, FIG. 17(b) is a partially cross-sectional perspective view of a portion corresponding to FIG. 17(a). Further, FIG. 17(c) is a cross-sectional view taken along a line G-G in FIG. 17(b), and FIG. 17(d) is a cross-sectional taken along a line H-H in FIG. 17(b).

Since the basic configurations of the refrigerant side tank unit 16c and the coolant side tank unit 43c are identical with each other as in the third embodiment, the following description will be given of the coolant side tank unit 43c, and the detailed description of the refrigerant side tank unit 16c will be omitted.

In more detail, in the second embodiment, the coolant side collection tank formation member 433c and the coolant side distribution tank formation member 433d, which are each formed of a tubular member, are employed as the coolant side tank formation member 433. In this embodiment, as illustrated in FIGS. 17(a) and 17(b), an upper tank formation member 433g and a lower formation member 433h each formed by pressing a plate metal are employed.

The upper tank formation member 433g and the lower formation member 433h are each formed into a two-mountain shape (W-shape) when viewed from the longitudinal direction thereof, and joined to each other so as to be shaped into joined bean-jam-filled wafers, to thereby form the collection space 433a of the coolant and the distribution space 433b of the coolant.

Also, as illustrated in FIG. 17(c), communication holes communicated with the first communication holes 432a formed in the recesses 432c of the coolant side intermediate plate member 432 are formed in the lower formation member 433h, and the coolant tubes 43a are communicated with the collection space 433a and the distribution space 433b through those communication holes.

Further, as illustrated in FIG. 17(d), refrigerant communication spaces are formed between the recesses 432b of the coolant side intermediate plate member 432 and the recesses 431b of the coolant side fixing plate member 431, which are formed in portions corresponding to the refrigerant tubes 16a. Therefore, similarly, in the heat exchanger 70 according to this embodiment, as in FIG. 8 of the first embodiment, the refrigerant and the coolant can flow therein, and the same advantages as those in the fifth embodiment can be obtained.

In this embodiment, an example in which the coolant side tank formation member 433 (coolant side tank unit 43c) are formed of two members 433h and 433g formed by press molding is described. Alternatively, even if the coolant side tank formation member 433 (coolant side tank unit 43c) according to this embodiment can be easily formed at the low costs by extrusion processing or drawing process.

Eighth Embodiment

Figure 18:
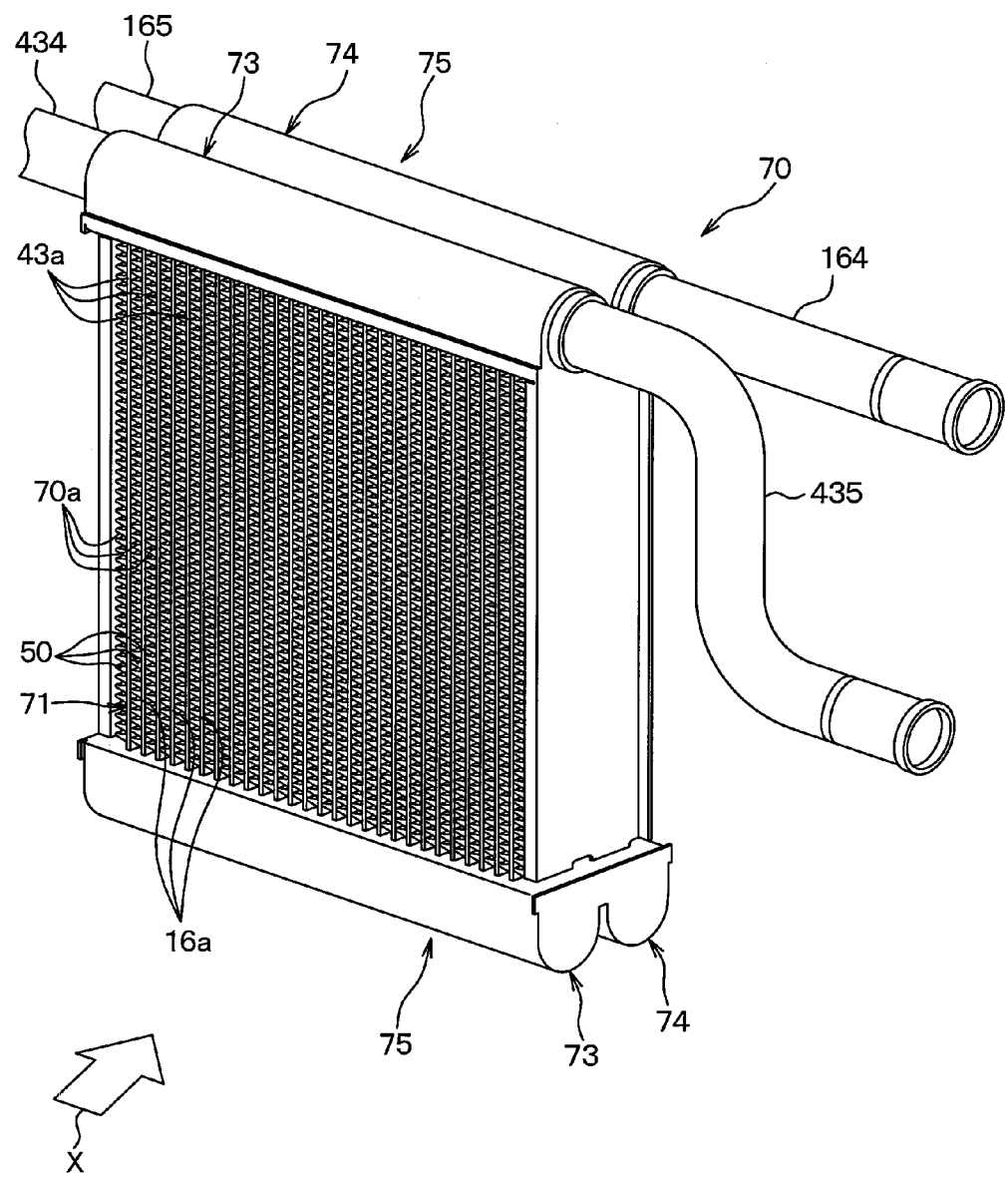
FIG. 18 is a perspective view of a heat exchanger according to an eighth embodiment of the present disclosure.

In this embodiment, an example in which the configuration of the heat exchanger 70 is changed in the first embodiment will be described. The detailed configuration of the heat exchanger 70 according to this embodiment will be described with reference to FIGS. 18 to 24. FIG. 18 is an external perspective view of the heat exchanger 70 according to the eighth embodiment, and FIG. 19 is an exploded perspective view of the heat exchanger 70.

Figure 20:
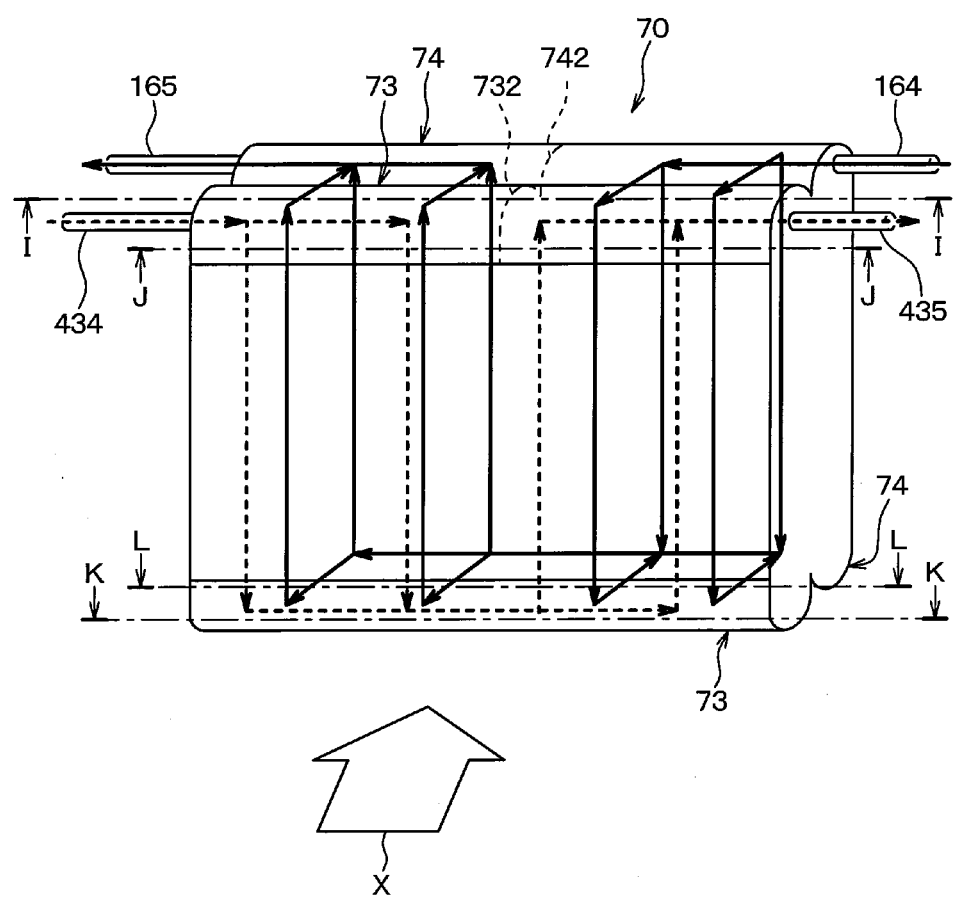
FIG. 20 is a schematic diagram illustrating flows of refrigerant and coolant in the heat exchanger according to the eighth embodiment.

FIG. 20 is a schematic perspective view illustrating a refrigerant flow and coolant flow in the heat exchanger 70. Referring to FIG. 20, a flow of refrigerant in the heat pump cycle 10 is indicated by solid lines, and a flow of coolant in the coolant circulation circuit 40 is indicated by dashed arrows.

Figure 21:
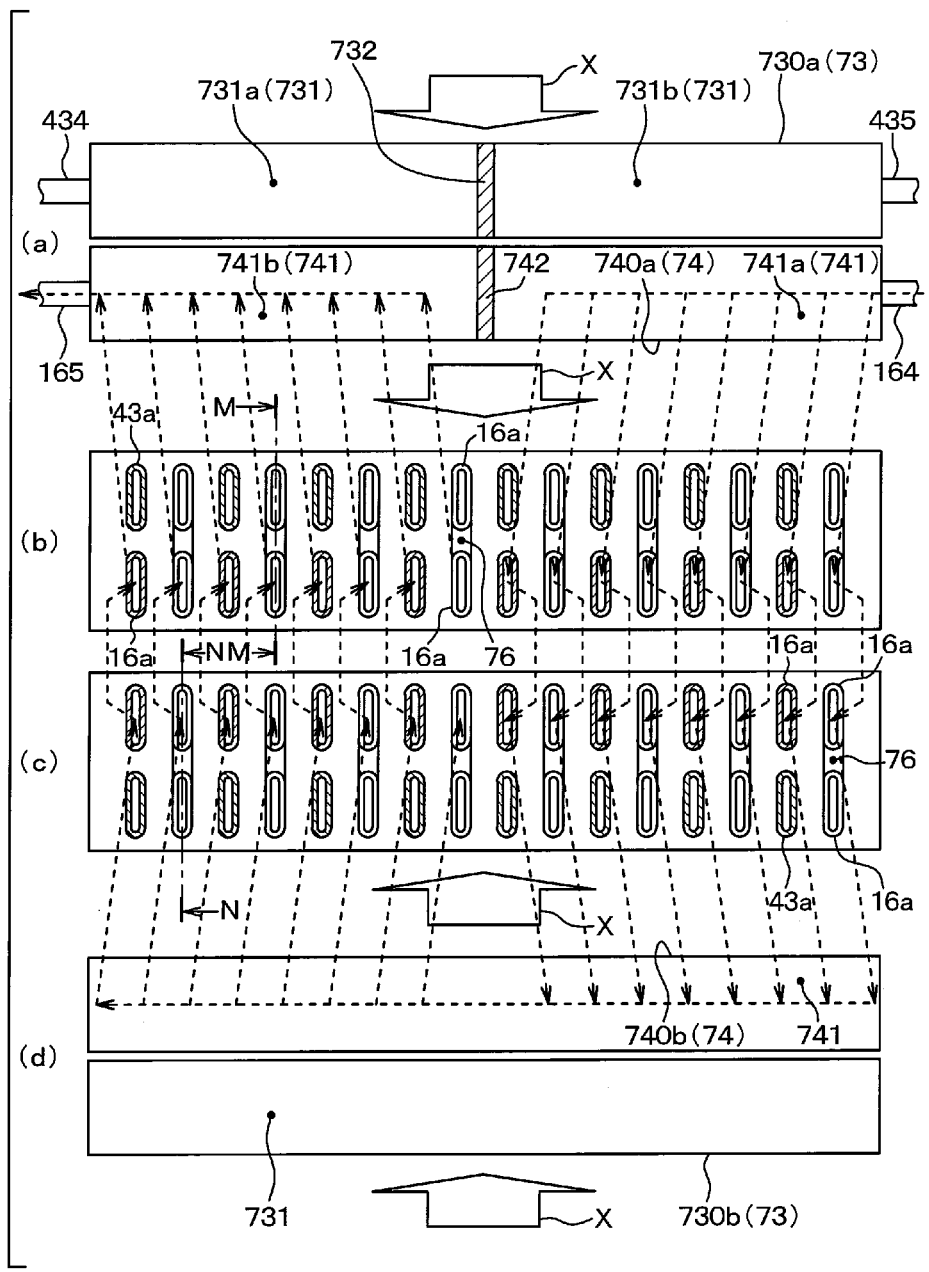
FIG. 21 is a cross-sectional diagram illustrating the refrigerant flow in the heat exchanger according to the eighth embodiment.
Figure 22:
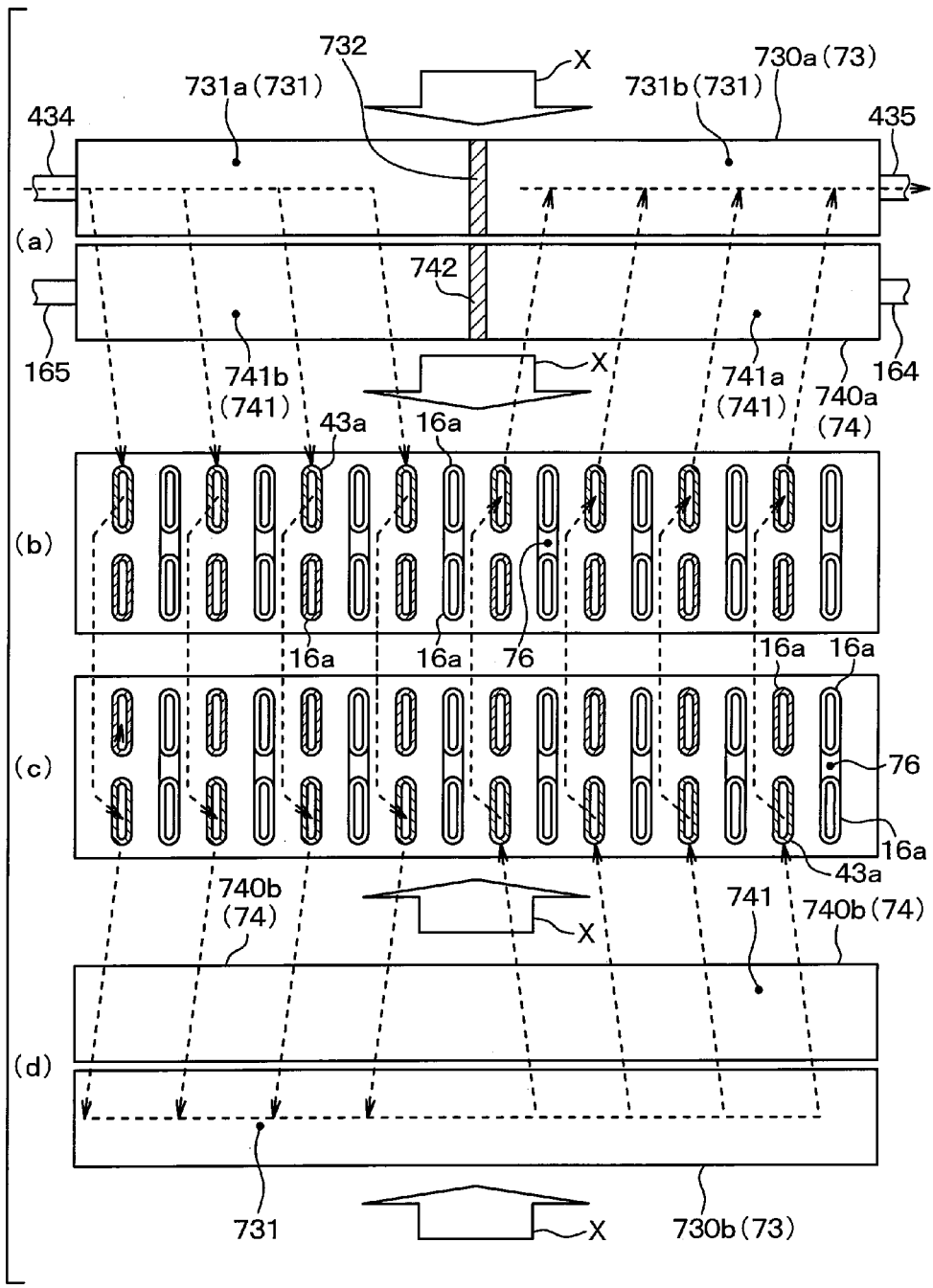
FIG. 22 is a cross-sectional diagram illustrating the coolant flow in the heat exchanger according to the eighth embodiment.
Figure 23:
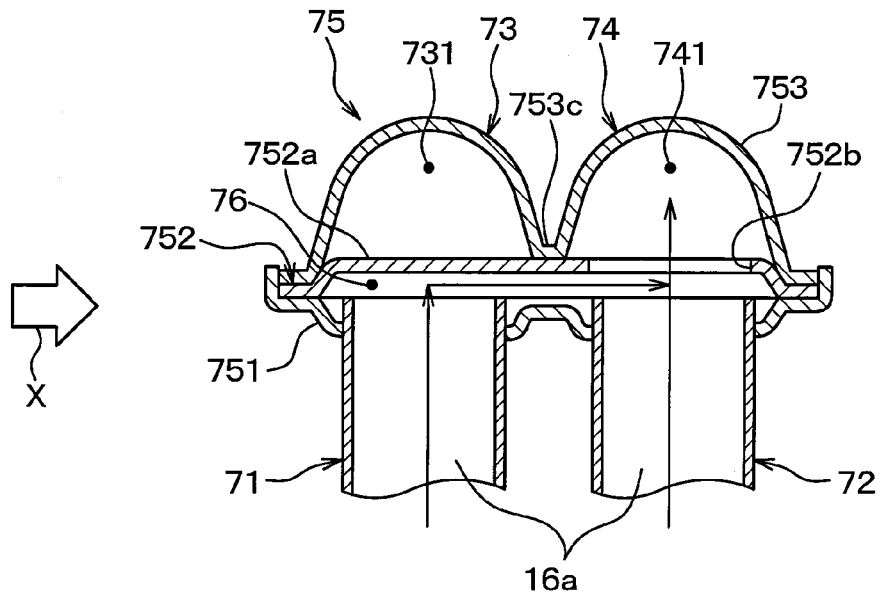
FIG. 23 is a cross-sectional view taken along a line M-M in FIG. 21.
Figure 24:
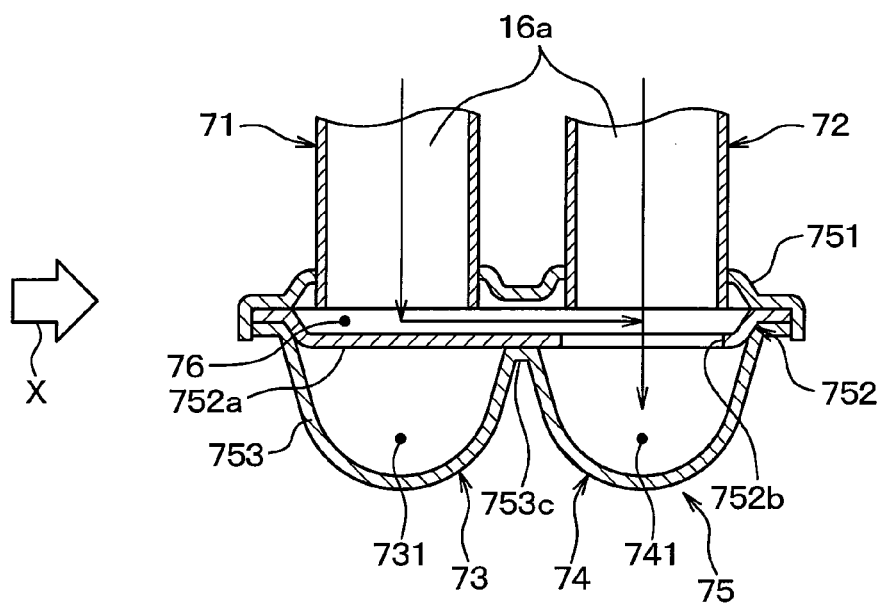
FIG. 24 is a cross-sectional view taken along a line N-N in FIG. 21.

FIGS. 21(a) and 22(a) are cross-sectional views taken along a line I-I in FIG. 20, FIGS. 21(b) and 22(b) are cross-sectional views taken along a line J-J in FIG. 20, FIGS. 21(c) and 22(c) are cross-sectional views taken along a line K-K in FIG. 20, and FIGS. 21(d) and 22(d) are cross-sectional views taken along a line L-L in FIG. 20. Dashed arrows in FIG. 21 indicate the refrigerant flow, and dashed arrows in FIG. 22 indicate the coolant flow. Also, FIG. 23 is a cross-sectional view taken along a line M-M in FIG. 21, and FIG. 24 is a cross-sectional view taken along a line N-N in FIG. 21.

Figure 19:
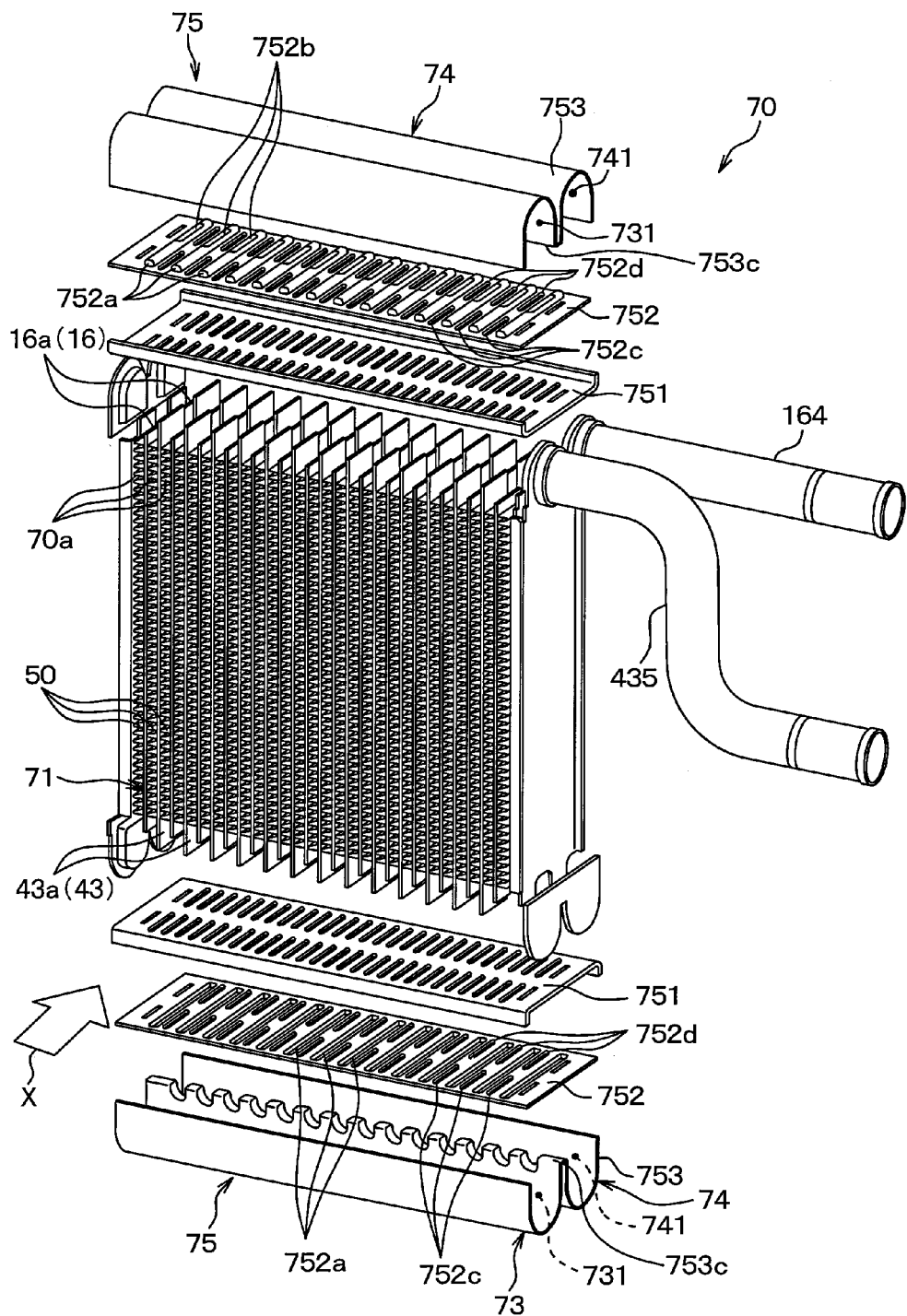
FIG. 19 is an exploded view of the heat exchanger according to the eighth embodiment.

First, as illustrated in FIGS. 19 and 20, the combined heat exchanger 70 includes the upstream heat exchange unit 71 in which the refrigerant tubes 16a and the coolant tubes 43a are alternately stacked on each other. The upstream heat exchange unit 71 conducts heat exchange between the refrigerant flowing through the refrigerant tubes 16a and air (outside air blown by the air blowing fan 17) as the third fluid flowing on peripheries of the refrigerant tubes 16a. The upstream heat exchange unit 71 also conducts heat exchange between the coolant flowing through the coolant tubes 43a and the air (outside air blown by the air blowing fan 17) flowing on peripheries of the coolant tubes 43a.

The downstream heat exchange unit 72 configured so that the refrigerant tubes 16a are stacked on each other is disposed downstream of the upstream heat exchange unit 71 in the flow direction X of the outside air. The downstream heat exchange unit 72 conducts heat exchange between the refrigerant flowing through the refrigerant tubes 16a and the air (outside air blown by the air blowing fan 17) flowing on peripheries of the refrigerant tubes 16a.

The refrigerant tubes 16a that configure the upstream heat exchange unit 71 is arranged between the respective coolant tubes 43a, and the coolant tubes 43a are arranged between the respective refrigerant tubes 16a. Also, the refrigerant tubes 16a which configures the downstream heat exchange unit 72, and the refrigerant tubes 16a or the coolant tubes 43a which configure the upstream heat exchange unit 71 are arranged to overlap with each other in the flow direction of the outside air blown by the air blowing fan 17.

In this example, in the upstream heat exchange unit 71, since the refrigerant tubes 16a and the coolant tubes 43a are alternately arranged one by one, the total number of refrigerant tubes 16a is the same as the total number of coolant tubes 43a. For that reason, a rate of the number (hereinafter called "upstream side number rate") of the refrigerant tubes 16a to the total tube numbers of refrigerant tubes 16a and coolant tubes 43a which configure the upstream heat exchange unit 71 is 0.5.

On the other hand, the downstream heat exchange unit 72 is configured by only the refrigerant tubes 16a. For that reason, a rate of the number (hereinafter called "downstream side number rate") of the refrigerant tubes 16a to the total tube numbers of refrigerant tubes 16a and coolant tubes 43a, which configure the downstream heat exchange unit 72 is 1.

Therefore, in the combined heat exchanger 70 according to this embodiment, in the refrigerant tubes 16a, the upstream side number rate is smaller than the downstream side number rate.

In the heat exchanger 70, the spaces formed between the refrigerant tubes 16a and the coolant tubes 43a, which configure the upstream heat exchange unit 71, and the spaces formed between the adjacent refrigerant tubes 16a that configure the downstream heat exchange unit 72 form the outside air passages 70a (third fluid passage) through which the outside air blown by the air blowing fan 17 flows.

The outer fins 50 are arranged in the outside air passages 70a, which promote the heat exchange between the refrigerant and the outside air, and the heat exchange between the coolant and the outside air, and enable the heat transfer between the refrigerant flowing through the refrigerant tubes 16a and the coolant flowing through the coolant tubes 43a that configure the upstream heat exchange unit 71, and the heat transfer between the respective refrigerants flowing through the adjacent refrigerant tubes 16a that configure the downstream heat exchange unit 72.

Subsequently, the upstream tank unit 73 and the downstream tank unit 74 will be described. The stacked type heat exchanger 70 includes the upstream tank unit 73 extending in the stack direction of the refrigerant tubes 16a and the coolant tubes 43a, which configure the upstream heat exchange unit 71, and the downstream tank unit 74 extending in the stack direction of the refrigerant tubes 16a that configure the downstream heat exchange unit 72.

The upstream tank unit 73 is formed with an upstream coolant space 731 (second tank space) that collects or distributes the coolant flowing through the coolant tubes 43a that configure the upstream heat exchange unit 71. Also, the downstream tank unit 74 is formed with a downstream refrigerant space 741 (first tank space) that collects or distributes the refrigerant tubes 16a that configure the downstream heat exchange unit 72.

The upstream tank unit 73 and the downstream tank unit 74 are formed integrally with each other. Hereinafter, the integrated upstream tank unit 73 and downstream tank unit 74 are called "header tank 75".

The header tank 75 (tank portion) includes the header plate 751 to which both the refrigerant tubes 16a and the coolant tubes 43a each arranged in two rows in the flow direction of the outside air are fixed, the intermediate plate member 752 fixed to the header plate 751, and the tank formation member 753.

The tank formation member 753 is fixed to the header plate 751 and the intermediate plate member 752, to thereby form the above-mentioned upstream coolant space 731 and the downstream refrigerant space 741 therein. Specifically, the tank formation member 753 is formed into a two-mountain shape (W-shape) when viewed from the longitudinal direction thereof, by subjecting a plate metal to pressing.

A two-mountain center portion 753c of the tank formation member 753 is joined to the intermediate plate member 752 to section the upstream coolant space 731 and the downstream refrigerant space 741.

As illustrated in FIGS. 23 and 24, in the intermediate plate member 752, multiple recesses 752a forming multiple communication spaces 76 communicated with the refrigerant tubes 16a between the intermediate plate member 752 and the header plate 751 are formed by fixing the intermediate plate member 752 to the header plate 751.

First through-holes 752b that penetrate through both sides of the recesses 752a are formed in the downstream side of the recesses 752a in the flow direction of the outside air, that is, portions of the downstream tank unit 74 corresponding to the downstream refrigerant space 741. With this configuration, the communication space 76 and the downstream refrigerant space 741 of the downstream tank unit 74 are communicated with each other.

For that reason, the refrigerant flowing from the refrigerant tubes 16a that configure the upstream heat exchange unit 71 into the communication space 76 flows into the downstream refrigerant space 741 from the first through-holes 752b (communication holes). Therefore, the communication space 76 functions as a communication path that communicates the refrigerant tubes 16a that configure the upstream heat exchange unit 71 with the downstream refrigerant space 741 of the downstream tank unit 74.

The communication space 76 extends in a direction connecting the respective ends of the refrigerant tubes 16a arranged to overlap with each other in the flow direction of the outside air in the refrigerant tubes 16a that configure the upstream heat exchange unit 71 and the refrigerant tubes 16a that configure the downstream heat exchange unit 72. More specifically, the communication space 76 extends in the flow direction of the outside air, at the ends of the refrigerant tubes 16a that configure the upstream heat exchange unit 71 and the refrigerant tubes 16a that configure the downstream heat exchange unit 72.

Second through-holes 752c that penetrate through both sides of the intermediate plate member 752 are formed in portions of the intermediate plate member 752 corresponding to the coolant tubes 43a that configure the upstream heat exchange unit 71. The coolant tubes 43a which configure the upstream heat exchange unit 71 penetrate through the Second through-holes 752c. With this configuration, the coolant tubes 43a which configure the upstream heat exchange unit 71 are communicated with the upstream coolant space 731 formed within the tank formation member 753.

Further, as illustrated in FIG. 19, in the end of the upstream heat exchange unit 71 on the header tank 75 side, the coolant tubes 43a are protruded toward the header tank 75 side more than the refrigerant tubes 16a. That is, the ends of the refrigerant tubes 16a on the header tank 75 side, and the ends of the coolant tubes 43a on the header tank 75 side are unevenly arranged.

On the other hand, third through-holes 752d (communication holes) penetrating through both sides of the intermediate plate member 752 are formed in portions corresponding to the refrigerant tubes 16a not communicated with the communication space 76 in the refrigerant tubes 16a that configure the downstream heat exchange unit 72 in the intermediate plate member 752. The refrigerant tubes 16a not communicated with the communication space 76 in the refrigerant tubes 16a which configure the downstream heat exchange unit 72 penetrate through the third through-holes 752d. With the above configuration, the refrigerant tubes 16a not communicated with the communication space 76 in the refrigerant tubes 16a which configure the downstream heat exchange unit 72 are communicated with the downstream refrigerant space 741 formed within the tank formation member 753.

Further, as illustrated in FIG. 19, in the end of the downstream heat exchange unit 72 on the header tank 75 side, the refrigerant tubes 16a not communicated with the communication space 76 are protruded toward the header tank 75 side more than the refrigerant tubes 16a communicated with the communication space 76. That is, the respective ends of the adjacent refrigerant tubes 16a are unevenly arranged.

Incidentally, the center portion 753c of the tank formation member 753 is formed into a shape matching the recesses 752a formed in the intermediate plate member 752. The upstream coolant space 731 and the downstream refrigerant space 741 are sectioned so that the internal coolant or refrigerant is not leaked from a joint portion of the header plate 751 and the intermediate plate member 752.

Also, as illustrated in FIG. 18, the coolant inflow pipe 434 that allows the coolant to flow into the upstream coolant space 731 is connected to one end (left side in a paper plane of the drawing) of the upstream tank unit 73 in the longitudinal direction thereof, which is arranged on one end side (upper side in the paper plane of the drawing) of the coolant tubes 43a in the longitudinal direction thereof. The coolant outflow pipe 435 that allows the coolant to flow out of the upstream coolant space 731 is connected to the other end (right side in the paper plane of the drawing) of the upstream tank unit 73 in the longitudinal direction thereof, which is arranged on one end side of the coolant tubes 43a in the longitudinal direction thereof. Both end sides of the upstream tank unit 73 in the longitudinal direction thereof arranged on the other end side (lower side of the paper plane of the drawing) of the coolant tubes 43a in the longitudinal direction thereof are each closed by a closing member.

Also, the refrigerant outflow pipe 165 that allows the refrigerant to flow out of the downstream refrigerant space 741 is connected to one end (left side in the paper plane of the drawing) of the downstream tank unit 74 in the longitudinal direction thereof, which is arranged on one end side (upper side in the paper plane of the drawing) of the refrigerant tubes 16a in the longitudinal direction thereof. The refrigerant inflow pipe 164 that allows the refrigerant to flow into the downstream refrigerant space 741 is connected to the other end (right side in the paper plane of the drawing) of the downstream tank unit 74 in the longitudinal direction thereof, which is arranged on one end side of the refrigerant tubes 16*a* in the longitudinal direction thereof. Both end sides of the downstream tank unit 74 in the longitudinal direction thereof arranged on the other end side (lower side in the paper plane of the drawing) of the refrigerant tubes 16*a* in the longitudinal direction thereof are each closed by a closing member.

Also, as illustrated in FIGS. 21 and 22, in the upstream tank unit 73 (hereinafter called "first upstream tank unit 730*a*") arranged on one end side (upper side in the paper plane of FIG. 18) of the coolant tubes 43*a* in the longitudinal direction thereof, an upstream partition member 732 that partitions the upstream coolant space 731 into two spaces in the longitudinal direction of the first upstream tank unit 730*a* is arranged.

Hereinafter, in the two upstream coolant spaces 731 partitioned by the upstream partition member 732, a space communicated with the coolant inflow pipe 434 is called "first upstream coolant space 731*a* (second fluid distribution space)", and a space communicated with the coolant outflow pipe 435 is called "second upstream coolant space 731*b* (second fluid collection space)". Also, the upstream tank unit 73 arranged on the other end (lower side in the paper plane of FIG. 18) of the coolant tubes 43*a* in the longitudinal direction thereof is called "second upstream tank unit 730*b*".

On the other hand, in the downstream tank unit 74 (hereinafter called "first downstream tank unit 740*a*") arranged on one end side (upper side in the paper plane of FIG. 18) of the refrigerant tubes 16*a* in the longitudinal direction thereof, a downstream partition member 742 that partitions the downstream refrigerant space 741 into two spaces in the longitudinal direction of the first downstream tank unit 740*a* is arranged.

Hereinafter, in the two downstream refrigerant spaces 741 partitioned by the downstream partition member 742, a space communicated with the refrigerant inflow pipe 164 is called "first downstream refrigerant space 741*a* (first fluid distribution space)", and a space communicated with the refrigerant outflow pipe 165 is called "second downstream refrigerant space 741*b* (first fluid collection space)". Also, the downstream tank unit 74 arranged on the other end (lower side in the paper plane of FIG. 18) of the refrigerant tubes 16*a* in the longitudinal direction thereof is called "second downstream tank unit 740*b*".

Therefore, in the heat exchanger 70 according to this embodiment, as illustrated in FIGS. 20 and 21, a part of the refrigerant flowing into the first downstream refrigerant space 741*a* of the first downstream tank unit 740*a* through the refrigerant inflow pipe 164 flows into the refrigerant tubes 16*a* that configure the downstream heat exchange unit 72, and flows in the refrigerant tubes 16*a* from the upper side toward the lower side in the drawing. Also, another part of the refrigerant flowing into the first downstream refrigerant space 741*a* of the first downstream tank unit 740*a* flows into the refrigerant tubes 16*a* that configure the upstream heat exchange unit 71 through the communication space 76 formed between the header plate 751 and the intermediate plate member 752, and flows in the refrigerant tubes 16*a* from the upper side toward the lower side in the drawing.

The refrigerant flowing out of the refrigerant tubes 16*a* that configure the downstream heat exchange unit 72 is collected by the downstream refrigerant space 741 of the second downstream tank unit 740*b*. Also, the refrigerant flowing out of the refrigerant tubes 16*a* that configure the upstream heat exchange unit 71 is collected into the downstream refrigerant space 741 of the second downstream tank unit 740*b* through the communication space 76 formed between the header plate 751 and the intermediate plate member 752.

The refrigerant collected into the downstream refrigerant space 741 of the second downstream tank unit 740*b* flows from the right side toward the left side in the drawing. Thereafter, a part of refrigerant collected into the downstream refrigerant space 741 of the second downstream tank unit 740*b* flows into the refrigerant tubes 16*a* that configure the downstream heat exchange unit 72, and flows in the refrigerant tubes 16*a* from the lower side toward the upper side in the drawing. Also, another part of the refrigerant collected into the downstream refrigerant space 741 of the second downstream tank unit 740*b* flows into the refrigerant tubes 16*a* that configure the downstream heat exchange unit 72 through the communication space 76 formed between the header plate 751 and the intermediate plate member 752, and flows in the refrigerant tubes 16*a* from the lower side toward the upper side in the drawing.

The refrigerant flowing out of the refrigerant tubes 16*a* that configure the downstream heat exchange unit 72 is collected by the second downstream refrigerant space 741*b* of the first downstream tank unit 740*a*. Also, the refrigerant flowing out of the refrigerant tubes 16*a* that configure the upstream heat exchange unit 71 is collected into the second downstream refrigerant space 741*b* of the first downstream tank unit 740*a* through the communication space 76 formed between the header plate 751 and the intermediate plate member 752.

The refrigerant collected into the second downstream refrigerant space 741*b* of the first downstream tank unit 740*a* flows from the right side toward the left side in the drawing, and flows out of the refrigerant outflow pipe 165.

On the other hand, in the heat exchanger 70 according to this embodiment, as illustrated in FIGS. 20 and 22, the coolant flowing into the first upstream coolant space 731*a* of the first upstream tank unit 730*a* through the coolant inflow pipe 434 flows into the coolant tubes 43*a* that configure the upstream heat exchange unit 71, and flows in the coolant tubes 43*a* from the upper side toward the lower side in the drawing.

The coolant flowing out of the coolant tubes 43*a* that configure the upstream heat exchange unit 71 is collected into the upstream coolant space 731 of the second upstream tank unit 730*b*. Then, the coolant collected into the upstream coolant space 731 of the second upstream tank unit 730*b* flows from the left side toward the right side in the drawing.

Thereafter, the coolant collected from the upstream coolant space 731 of the second upstream tank unit 730*b* flows into the coolant tubes 43*a* that configure the upstream heat exchange unit 71, and flows in the coolant tubes 43*a* from the lower side toward the upper side in the drawing. The coolant flowing out of the coolant tubes 43*a* that configure the upstream heat exchange unit 71 is collected into the second upstream coolant space 731*b* of the first upstream tank unit 730*a*.

The coolant collected into the second upstream coolant space 731*b* of the first upstream tank unit 730*a* flows from the left side toward the right side in the drawing, and flows out of the coolant outflow pipe 435.

In the above-mentioned heat exchanger 70, the vehicle exterior heat exchange unit 16 is configured by both the refrigerant tubes 16*a* that configure the upstream heat exchange unit 71 and the refrigerant tubes 16*a* that configure the downstream heat exchange unit 72. The radiator unit 43 is configured by the coolant tubes 43a that configure the upstream heat exchange unit 71.

Also, the refrigerant tubes 16a, the coolant tubes 43a, the respective components of the header tank 75, and the outer fins 50 in the above-mentioned heat exchanger 70 are each made of the same metal material (aluminum alloy in this embodiment). Then, the header plate 751 and the tank formation member 753 are fixed to each other by caulking in a state where the refrigerant side intermediate plate member 752 is sandwiched between the header plate 751 and the tank formation member 753.

Further, the overall heat exchanger 70 which is fixed by caulking is carried into a heating furnace, and heated. A brazing filler metal cladded in advance is melted on a surface of the respective components, and the heat exchanger 70 is cooled until the brazing filler metal is gain solidified so that the respective components are brazed integrally. As a result, the vehicle exterior heat exchange unit 16 and the radiator unit 43 are integrated together.

According to this embodiment, as illustrated in FIG. 21, in the downstream refrigerant space 741 of the first downstream tank unit 740a, the second downstream refrigerant space 741b (first fluid collection space) for collecting the refrigerant and the first downstream refrigerant space 741a (first fluid distribution space) for distributing the refrigerant are aligned in the stack direction of the tubes 16a and 43a through the downstream partition member 742. Also, as illustrated in FIG. 22, in the upstream coolant space 731 of the first upstream tank unit 730a, the second upstream coolant space 731b for collecting the coolant and the first upstream coolant space 731a for distributing the coolant are aligned in the stack direction of the tubes 16a and 43a through the upstream partition member 732. Therefore, there is advantageous in that, as illustrated in FIG. 18, the refrigerant inflow pipe 164, the refrigerant outflow pipe 165, the coolant inflow pipe 434, and the coolant outflow pipe 435, which are external pipes connected to the heat exchanger 70, are likely to be consolidated in one of core portions in which the refrigerant tubes 16a and the coolant tubes 43a are stacked on each other.

Ninth Embodiment

Figure 25:
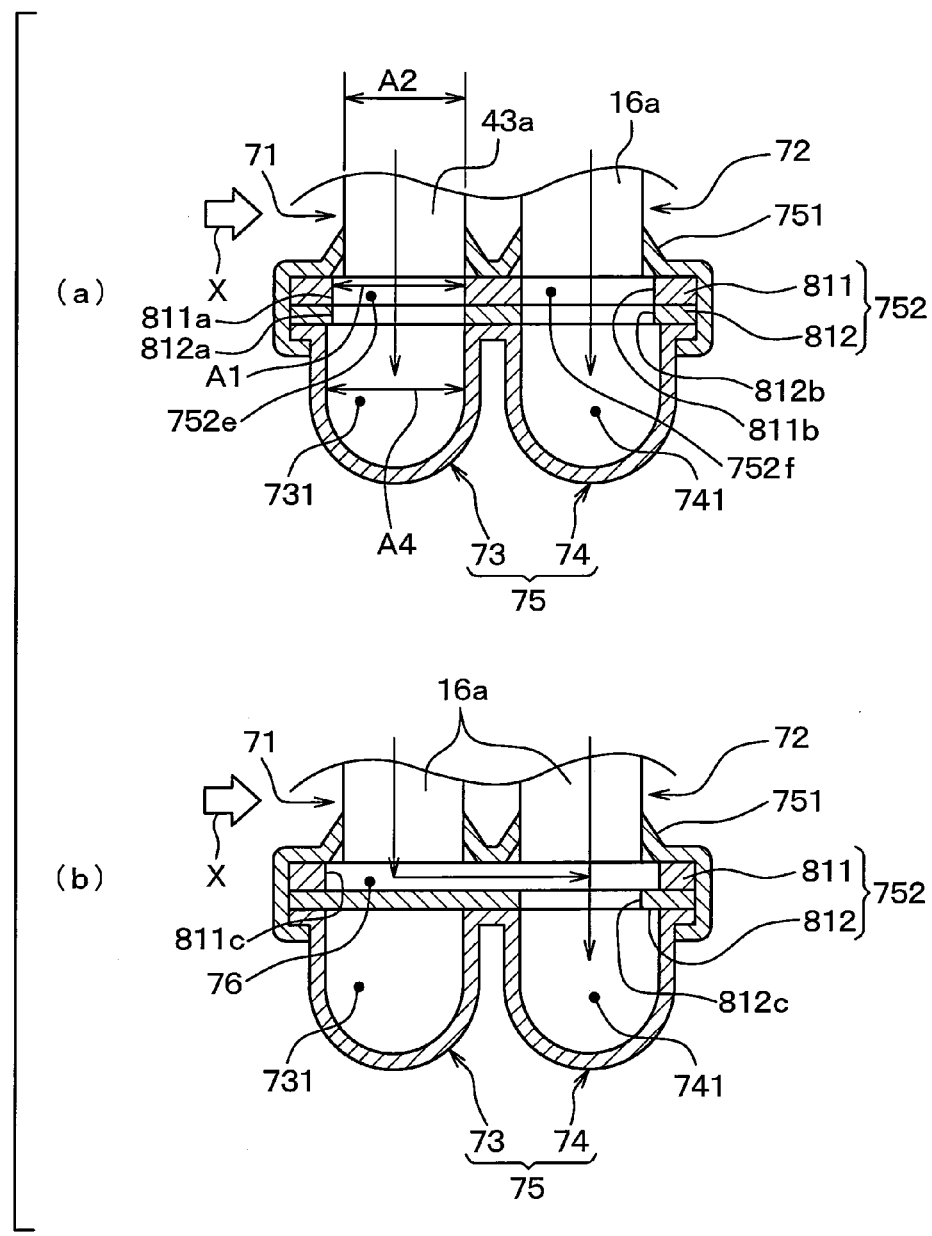
FIG. 25(a) is a cross-sectional view of a portion in which refrigerant tubes and coolant tubes overlap with each other in an air flow direction in a header tank according to a ninth embodiment of the present disclosure.
FIG. 25(b) is a cross-sectional view of a portion in which the refrigerant tubes overlap with each other in the air flow direction in the header tank according to the ninth embodiment.

In a ninth embodiment, as illustrated in FIG. 25, the intermediate plate member 752 according to the eighth embodiment has a structure in which multiple plate members are stacked on each other.

The intermediate plate member 752 is formed by stacking two plate members of a communication space formation plate member 811 and a partition plate member 812.

FIG. 25(a) is a cross-sectional view of a portion in which the coolant tubes 43a that configure the upstream heat exchange unit 71 and the refrigerant tubes 16a that configure the downstream heat exchange unit 72 overlap with each other in the flow direction X of the outside air.

In FIG. 25(a), portions of the communication space formation plate member 811 and the partition plate member 812, which correspond to the coolant tubes 43a, are formed with through-holes 811a and 812a that penetrate through both sides of the communication space formation plate member 811 and the partition plate member 812, respectively. Those through-holes 811a and 812a form a coolant communication space 752e (second fluid flowing space) for communicating the coolant tubes 43a with the upstream coolant space 731. For that reason, the coolant communication space 752e is sectioned from the downstream refrigerant space 741.

The coolant communication space 752e is arranged between the upstream coolant space 731 and the coolant tubes 43a. In the flow direction X of the outside air, a width A1 of the coolant communication space 752e is set to be smaller than a width A4 of the upstream coolant space 731.

Also, since the refrigerant tubes 16a and the coolant tubes 43a are alternately arranged in the upstream heat exchange unit 71, the coolant communication space 752e is arranged adjacent to a connection portion of the header tank 75 which is connected with the refrigerant tubes 16a in the stack direction of the tubes 16a and 43a. This can be understood also in the eighth embodiment in the same manner if it is assumed that, in the above-mentioned eighth embodiment, a space within the coolant tubes 43a, which extends from the connection portion of the coolant tubes 43a to the header plate 751 in the longitudinal direction thereof in FIG. 19 to the upstream coolant space 731 corresponds to the coolant communication space 752e in FIG. 25.

Also, portions of the communication space formation plate member 811 and the partition plate member 812, which correspond to the refrigerant tubes 16a, are formed with through-holes 811b and 812b that penetrate through both sides of the communication space formation plate member 811 and the partition plate member 812, respectively. Those through-holes 811b and 812b form a refrigerant communication space 752f for communicating the refrigerant tubes 16a with the downstream refrigerant space 741.

FIG. 25(b) is a cross-sectional view of a portion in which the refrigerant tubes 16a that configure the upstream heat exchange unit 71 and the refrigerant tubes 16a that configure the downstream heat exchange unit 72 overlap with each other in the flow direction X of the outside air.

In FIG. 25(b), the communication space formation plate member 811 is formed with a through-hole 811c that is communicated with both the refrigerant tubes 16a that configure the upstream heat exchange unit 71 and the refrigerant tubes 16a which configure the downstream heat exchange unit 72.

A portion of the partition plate member 812, which corresponds to the downstream refrigerant space 741, is formed with a through-hole 812c that penetrates through both sides of the partition plate member 812. With this configuration, the refrigerant tubes 16a that configure the upstream heat exchange unit 71, and the refrigerant tubes 16a that configure the downstream heat exchange unit 72 are communicated with the downstream refrigerant space 741 through the through-hole 811c of the communication space formation plate member 811, and the through-hole 812c of the partition plate member 812.

According to this embodiment, since the through-hole 811c of the communication space formation plate member 811 and the through-hole 812c of the partition plate member 812 can be formed by simple hole processing, the manufacture is easy as compared with the case in which the recesses 752a are formed in the intermediate plate member 752.

Also, since the coolant communication space 752e is arranged adjacent to the connection portion of the header tank 75 which is connected with the refrigerant tubes 16a in the stack direction of the tubes 16a and 43a, the heat from the coolant within the coolant communication space 752e is effectively transferred to the portion of the header tank 75 which is likely to be frosted, and the defrosting of the header tank 75 can be promoted.

Also, the coolant communication space 752e is arranged between the upstream coolant space 731 and the coolant tubes 43a, and the A1 of the coolant communication space 752e is set to be smaller than the width A4 of the upstream coolant space 731 in the flow direction X of the outside air. With this configuration, the width of the space through which the coolant flows has a tendency to be sequentially reduced in the following order: the upstream coolant space 731; the coolant communication space 752e; and the coolant tubes 43a, and a tendency to be sequentially enlarged in the following order: the coolant tubes 43a; the coolant communication space 752e; and the upstream coolant space 731. The pressure loss of the coolant is reduced. As a result, since the coolant flow rate can be obtained without increasing a voltage across the coolant pump 41, the basic performance of the heat exchanger becomes excellent, and the defrosting performance becomes also excellent.

In FIG. 25(a), the coolant tubes 43a do not enter the coolant communication space 752e, and the refrigerant tubes 16a also do not enter the refrigerant communication space 752f. Alternatively, the leading ends of the coolant tubes 43a may enter a part of the coolant communication space 752e without any problem. Also, the leading ends of the refrigerant tubes 16a may enter a part of the refrigerant communication space 752f without any problem. The same is applied to FIG. 25(b).

Tenth Embodiment

Figure 26:
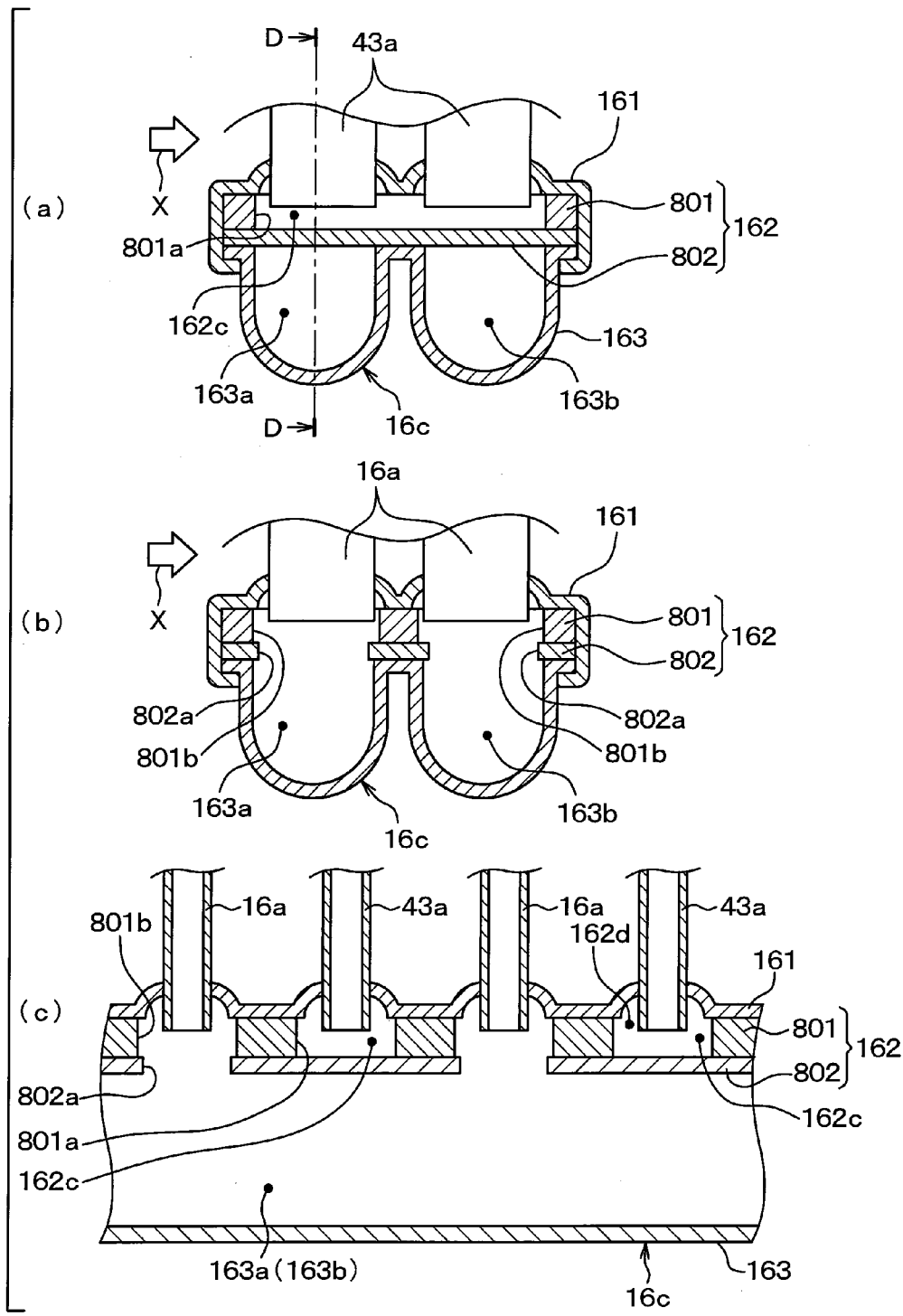
FIG. 26(a) is a cross-sectional view of a portion in which coolant tubes overlap with each other in an air flow direction in a refrigerant side tank unit of a heat exchanger according to a tenth embodiment of the present disclosure.
FIG. 26(b) is a cross-sectional view of a portion in which refrigerant tubes overlap with each other in the air flow direction in the refrigerant side tank unit of the heat exchanger according to the tenth embodiment.
FIG. 26(c) is a cross-sectional view taken along a line D-D in FIG. 26(a).

A heat exchanger 70 according to this embodiment will be described with reference to FIG. 26. FIG. 26(a) corresponds to FIG. 9(a) of the above-mentioned second embodiment, FIG. 26(b) corresponds to FIG. 9(b) of the second embodiment, and FIG. 26(c) corresponds to FIG. 9(c) of the second embodiment. As understood from a comparison between FIGS. 9 and 26, the heat exchanger 70 according to this embodiment have many configuration in common with that of the second embodiment. For example, as illustrated in FIG. 26, the refrigerant side tank unit 16c includes a refrigerant side intermediate plate member 162 that partitions the internal space between the coolant communication spaces 162c, and the collection space 163a or the distribution space 163b. Further, the refrigerant side intermediate plate member 162 is configured by the communication space formation plate member 801 (tube side plate member) and the partition plate member 802 which are sequentially stacked from the refrigerant tubes 16a side in the thickness direction.

Also, as illustrated in FIG. 26(a), a portion of the communication space formation plate member 801, which corresponds to the coolant tubes 43a, is formed with multiple through-holes 801a as in FIG. 9(a). The multiple through-holes 801a are formed to extend in the flow direction X of the outside air, over both of the two coolant tubes 43a aligned in the flow direction X of the outside air. The multiple through-holes 801a are closed by the partition plate member 802 from an opposite side of the coolant tubes 43a. With this configuration, the internal spaces of the through-holes 801a function as the coolant communication spaces 162c as in FIG. 9(a).

On the other hand, as illustrated in FIG. 26(b), a portion of the communication space formation plate member 801, which corresponds to the refrigerant tubes 16a, is formed with multiple through-holes 801b. However, unlike FIG. 9(b), the through-holes 801b are formed in correspondence with the respective refrigerant tubes 16a on the upstream side and the downstream side in the flow direction X of the outside air, individually. That is, in FIG. 26(b), the through-holes 801b are aligned in the flow direction X of the outside air. The respective refrigerant tubes 16a are communicated with the through-holes 801b. Multiple through-holes 802a, which overlap with parts (through-holes 801b) of the multiple through-holes 801a and 801b formed in the communication space formation plate member 801, are formed in the partition plate member 802. Specifically, the through-holes 802a of the partition plate member 802 overlap with the through-holes 801b of the communication space formation plate member 801 on a one-to-one basis. With this configuration, the refrigerant tubes 16a on the upstream side are communicated with the collection space 163a through the corresponding through-holes 802a of the partition plate member 802, and the refrigerant tubes 16a on the downstream side are communicated with the distribution space 163b through the corresponding through-holes 802a of the partition plate member 802.

Also, as illustrated in FIG. 26(c), the coolant communication spaces 162c includes the coolant tube adjacent spaces 162d that come in contact with the leading ends of the coolant tubes 43a within a space thereof in the same manner as that of FIG. 9(c). The coolant within the coolant tube adjacent spaces 162d comes in contact with the outer wall of the refrigerant side tank unit 16c between the refrigerant tubes 16a and the coolant tubes 43a which are adjacent to each other.

Also, in the second embodiment, as illustrated in FIG. 9(c), a leading position of the refrigerant tubes 16a in the longitudinal direction of the tubes 16a and 43a is displaced at the collection space 163a side or the distribution space 163b side of the refrigerant side tank unit 16c as compared with a leading position of the coolant tubes 43a. On the other hand, the configuration in this embodiment is different from this configuration. Specifically, in this embodiment, the leading positions of the refrigerant tubes 16a and the coolant tubes 43a may be displaced with each other in the longitudinal direction of the tubes 16a and 43a as in the second embodiment, or may match each other as illustrated in FIG. 26(c).

According to this embodiment, as in the above-mentioned second embodiment, the defrosting of the refrigerant side tank unit 16c can be promoted. Also, although also applicable to the second embodiment, as understood from FIG. 26(c), for example, the through-holes 802a are formed in the partition plate member 802 at positions corresponding to the refrigerant tubes 16a so that the refrigerant flows into the collection space 163a of the refrigerant side tank unit 16c from the interior of the refrigerant tubes 16a and flows into the refrigerant tubes 16a from the interior of the distribution space 163b. That is, that the refrigerant flows into the refrigerant tubes 16a, and the coolant flows into the coolant tubes 43a is determined on the basis of the arrangement of the through-holes 802a formed in the partition plate member 802. Therefore, which of the tubes 16a and 43a the respective fluids (refrigerant, coolant) flow through can be easily determined according to the configuration of the partition plate member 802.

Other Embodiments

The present disclosure is not limited to the above-mentioned embodiments, but can be variously modified, for example, as follows.

(1) In the above-mentioned first embodiment, as illustrated in FIG. 7, the example in which the coolant communication space is formed within the refrigerant side tank unit 16c, and the refrigerant communication space is formed within the coolant side tank unit 43c has been described. In those communication spaces, there is a concern that the pressure loss is generated in the coolant or the refrigerant. For that reason, it is desirable to enlarge a volume of the communication space as much as possible.

For example, the recessed amount of recesses 432b (162b) of the intermediate plate member 432 (162) may be shaped to be gradually increased toward a center portion from both sides of the intermediate plate member in the array direction (that is, flow direction X of the outside air) of the tubes 16a (43a)

Also, a length of the tubes 16a (43a) in the longitudinal direction thereof may be shaped to be gradually reduced toward the center portion from both sides of the tubes in the array direction of the tubes 16a (43a).

(2) In the above-mentioned embodiments, the example in which the refrigerant of the heat pump cycle 10 is employed as the first fluid, the coolant of the coolant circulation circuit 40 is employed as the second fluid, and the outside air blown by the air blowing fan 17 is employed as the third fluid has been described. However, the first to third fluids are not limited to this example. For example, the vehicle interior blowing air may be employed as the third fluid.

For example, the first fluid may be a high pressure refrigerant of the heat pump cycle 10, or a low pressure refrigerant.

For example, the second fluid may be made of the coolant for cooling an electric equipment such as an inverter that supplies an electric power to an engine, the travel electric motor MG. Also, a cooling oil may be employed as the second fluid, and the second heat exchange unit may function as an oil cooler, or a thermal storage agent or a cold storage agent may be employed as the second fluid.

Further, when the heat pump cycle 10 employing the heat exchanger 70 of the present disclosure is applied to a stationary air conditioner, a cold storage warehouse, or a cooling heating device for a vending machine, a coolant for cooling an engine, an electric motor, and other electric equipments as a drive source of a compressor in the heat pump cycle 10 may be employed as the second fluid.

Further, in the above-mentioned embodiment, the example in which the heat exchanger 70 of the present disclosure is applied to the heat pump cycle (refrigeration cycle) has been described. However, the application of the heat exchanger 70 according to the present disclosure is not limited to this example. That is, the heat exchanger 70 can be extensively applied to devices for conducting the heat exchange among three types of fluids.

For example, the heat exchanger can be applied as a heat exchanger applied to a vehicle cooling system. A first fluid may be a heat medium that absorbs the quantity of heat provided in a first in-vehicle device associated with heat generation during actuation, a second fluid may be a heat medium that absorbs the quantity of heat provided in a second in-vehicle device associated with heat generation during actuation, and a third fluid may be air.

More specifically, when the heat exchanger is applied to a hybrid vehicle, a first in-vehicle device may be an engine EG, the first fluid may be the coolant of the engine EG, a second in-vehicle device may be a travel electric motor, and the second fluid may be the coolant of the travel electric motor.

Since the respective amounts of heat generation in those in-vehicle devices are changed according to the travel state (travel load) of the vehicle, a temperature of the coolant of the engine EG and a temperature of the coolant of the travel electric motor are also changed according to the travel state of the vehicle. Therefore, according to this example, the heat quantity generated in the in-vehicle device large in the amount of heat generation can not only be radiated to the air, but also to the in-vehicle device side small in the amount of heat generation.

The three types of fluids not only mean fluids different in physicality or components, but also mean fluids identical in the physicality or components, but different in temperature, or a state of the fluid such as a gas-phase or a liquid-phase. Therefore, the first to third fluids according to the present disclosure are not limited to the fluids different the physicality or components from each other.

(3) In the above-mentioned embodiments, the example in which the refrigerant tubes 16a of the vehicle exterior heat exchange unit 16, the coolant tubes 43a of the radiator unit 43, and the outer fins 50 are made of aluminum alloy (metal), and joined to each other by brazing has been described. Alternatively, the outer fins 50 may be made of another material excellent in conductivity (for example, carbon nanotube), and joined by joining means such as adhesive.

(4) In the above-mentioned embodiment, the example in which the electric three-way valve 42 is employed as a circuit switching device for switching the coolant circuit of the coolant circulation circuit 40 has been described. However, the circuit switching device is not limited to this example. For example, a thermostat valve may be employed. The thermostat valve is a cooling medium temperature responsive value configured by a mechanical mechanism that opens or closes a cooling medium passage by displacing a valve body through a thermowax (temperature sensitive member) that is changed in volume according to a temperature. Therefore, with the application of the thermostat valve, the coolant temperature sensor 52 can be abolished.

(5) In the above-mentioned embodiment, the example in which the normal fluorocarbon refrigerant is employed as the refrigerant has been described. However, the kind of refrigerant is not limited to this example. A natural refrigerant such as carbon dioxide, or a carbon hydrogen-based refrigerant may be employed. The heat pump cycle 10 may configure a supercritical refrigeration cycle in which the compressor 11 discharge refrigerant becomes equal to or higher than a critical pressure of the refrigerant.

(6) The arrangement of the refrigerant tubes 16a and the coolant tubes 43a is not limited to the above-described embodiments. For example, the coolant tubes 43a may be arranged every two refrigerant tubes 16a. That is, in the upstream heat exchange unit 71, two refrigerant tubes 16a may be arranged between the adjacent coolant tubes 43a.

(7) The flow channel configuration of the heat exchanger 70 is not limited to the above-described embodiments. For example, the flow channel configuration of a U-turn type that U-turns the refrigerant flow, an S-turn type that U-turns the refrigerant flow twice, and a total path type that does not U-turn the refrigerant flow can be applied in the tube group on one side in the tube stacking direction and the tube group on the other side. Likewise, the flow channel configuration such as the U-turn type, the S-turn type, or the total path type can be applied to the coolant flow.

Also, the flow channel configuration such as a parallel flow type in which the refrigerant flow direction and the coolant flow direction are identical with each other, or an opposite flow type in which the refrigerant flow direction and the coolant flow direction are opposite to each other can be applied. For example, the flow of refrigerant in the refrigerant tubes 16a is U-turned from the downstream side in the flow direction X of the outside air to the upstream side in the flow direction X of the outside air, and the flow of coolant in the coolant tubes 43a is U-turned from the upstream side in the flow direction X of the outside air to the downstream side in the flow direction X of the outside air so that the flows of the refrigerant flowing in the adjacent refrigerant tubes 16a, and the coolant flowing in the coolant tubes 43a may be opposite to the flow direction X of the outside air (opposite flow) when macroscopically viewed.

Figure 27:
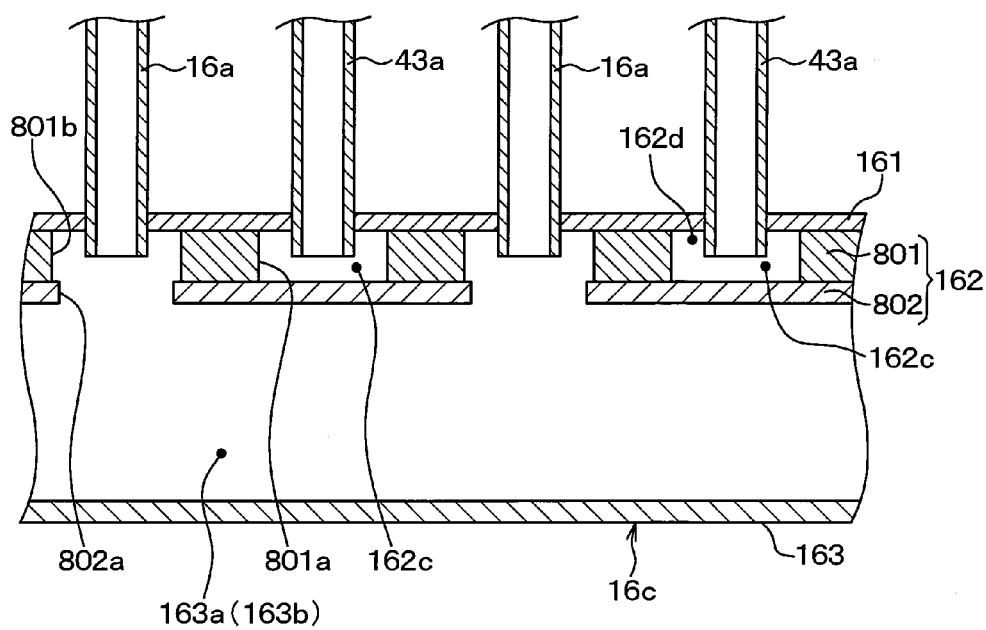
FIG. 27 is a cross-sectional view illustrating a modified example of the refrigerant side tank unit shown in FIG. 26.

(8) In the above-mentioned second and tenth embodiments, in the tube connection portions in which the respective tubes 16a and 43a are connected to the refrigerant side fixing plate member 161, the refrigerant side fixing plate member 161 has a convex shape swelled toward an outside of the refrigerant side tank unit 16c, but such a convex shape is not essential. For example, a diagram corresponding to FIG. 26(c) of the tenth embodiment illustrating the refrigerant side tank unit 16c configured by the refrigerant side fixing plate member 161 having no convex shape is illustrated in FIG. 27. Even in an example illustrated in FIG. 27, as in the tenth embodiment, for example, the coolant communication spaces 162c includes the coolant tube adjacent spaces 162d, and the leading positions of the refrigerant tubes 16a and the coolant tubes 43a in the longitudinal direction of the tubes 16a and 43a match each other.

(9) In the above-mentioned embodiment, the refrigerant side intermediate plate member 162 illustrated in, for example, FIGS. 26 and 27 is configured by multiple components such as the communication space formation plate member 801 and the partition plate member 802. Alternatively, the communication space formation plate member 801 and the partition plate member 802 may be integrally configured as a single component.

The present disclosure is not limited to the above-mentioned embodiments, and can be appropriately changed. Also, the respective embodiments are not unrelated to each other, and can be appropriately combined together unless the combination is clearly impossible. Further, needless to say, in the respective embodiments, constituent elements of the embodiments are not always essential unless the constituent elements are clearly specified to be particularly essential, or unless the constituent elements are obviously considered essential on a theoretical basis. In addition, in the respective embodiments, when the number including count, figure, amount and range, etc. of the constituent elements of the embodiments is mentioned, the number of constituent elements is not limited to a specific number unless the number is clearly specified to be particularly essential, or unless the number is definitely limited to the specific number in principle. Further, when shapes and positional relationships, etc. of the constituent elements, etc. are mentioned in the respective embodiments, the shapes and the positional relationships, etc. are not limited to specific shapes or positional relationship, etc. unless the shapes and the positional relationship is clearly specified to be particularly essential, or unless the shapes and the positional relationship is definitely limited to the specific shapes and positional relationship, etc. in principle.

The invention claimed is:

1. A heat exchanger, comprising:
a first heat exchange portion including first tubes that have first forward tubes through which a first fluid flows in a forward direction, and first backward tubes through which the first fluid flows in a backward direction opposite to the forward direction, and the first heat exchange portion performing heat exchange between the first fluid and a third fluid flowing on peripheries of the first tubes;
a second heat exchange portion including second tubes that have second forward tubes through which a second fluid flows in the forward direction, and second backward tubes through which the second fluid flows in the backward direction, and the second heat exchange portion performing heat exchange between the second fluid and the third fluid flowing on peripheries of the second tubes;
a tank portion including a first tank space communicating with the first tubes to collect the first fluid from the first tubes or distribute the first fluid to the first tubes;
a third fluid passage through which the third fluid flows; and
an outer fin, wherein
at least one of the first tubes is arranged between the second tubes in a stack direction,
at least one of the second tubes is arranged between the first tubes in the stack direction,
the third fluid passage is formed between the first tubes and the second tubes,
the outer fin is arranged in the third fluid passage, promotes heat exchange in the first and second heat exchange portions, and enables heat transfer between the first fluid flowing through the first tubes and the second fluid flowing through the second tubes,
the tank portion includes therein a second fluid flowing space communicating with the second tubes,
the second fluid flowing space is partitioned from the first tank space,
the second fluid flowing space is positioned adjacent to the first tubes in the stack direction of the first and second tubes and located adjacent to a connection portion of the tank portion which is directly connected to the first tubes,
an outer wall of the tank portion includes a recess part that is recessed outward from the tank portion,
leading ends of the second tubes extend through the recess part of the outer wall of the tank portion and protrude into the second fluid flowing space,
the second fluid flowing space includes a second tube adjacent space provided inside the recess part and defined by the outer wall and a lateral surface of the leading ends of the second tubes,
the second tube adjacent space is located between the lateral surface of the leading ends of the second tubes and the first tubes in the stack direction of the first and second tubes,
the tank portion includes a second tank space that collects or distributes the second fluid flowing through the second tubes, and
the second fluid flowing space is arranged between the second tank space and the second tubes.

2. The heat exchanger according to claim 1, wherein
the first tubes and the second tubes are spaced apart from each other so that the second fluid within the second fluid flowing space is kept from directly contacting the first tubes.

3. The heat exchanger according to claim 1, wherein
the tank portion includes an intermediate plate member that partitions an internal space of the tank portion into the first tank space and the second fluid flowing space,
the intermediate plate member is provided with communication holes through which the first tubes communicate with the first tank space, and whether the first fluid flows into the first tubes and whether the second fluid flows into the second tubes are determined on the basis of an arrangement of the communication holes in the intermediate plate members.

4. The heat exchanger according to claim 1, wherein the tank portion includes an intermediate plate member that partitions an internal space of the tank portion into the first tank space and the second fluid flowing space, the intermediate plate member includes a tube side plate member and a partition plate member which are stacked on each other in a thickness direction of the intermediate plate member, the tube side plate member is located to be nearer to the first tubes than the partition plate member, the tube side plate member includes through-holes, the partition plate member includes through-holes, the through-holes of the partition plate member overlap with a part of the through-holes of the tube side plate member in the thickness direction of the intermediate plate member, and whether the first fluid flows in the first tubes and whether the second fluid flows in the second tubes are determined on the basis of an arrangement of the communication holes in the partition plate member.

5. The heat exchanger according to claim 1, wherein the second fluid flowing space is arranged to be nearer to exposed portions of the first tubes exposed to an exterior than the first tank space.

6. The heat exchanger according to claim 5, wherein the tank portion includes an intermediate plate member that partitions an internal space of the tank portion into the first tank space and the second fluid flowing space, the intermediate plate member is provided with communication holes through which the first tubes communicate with the first tank space, and the first tubes penetrate through the communication holes to communicate with the first tank space.

7. The heat exchanger according to claim 1, wherein a width of the second fluid flowing space is larger than a width of the second tubes in a flow direction of the third fluid.

8. The heat exchanger according to claim 1, wherein a width of the second fluid flowing space is larger than a width of the second tubes in the stack direction of the first and second tubes.

9. The heat exchanger according to claim 1, wherein a width of the second fluid flowing space is larger than a width of the first tank space in a flow direction of the third fluid.

10. The heat exchanger according to claim 1, wherein a width of the second fluid flowing space is smaller than a width of the second tank space in a flow direction of the third fluid.

11. The heat exchanger according to claim 1, wherein the first tubes and the second tubes are arranged in a plurality of rows in a flow direction of the third fluid, and the first tank space and the second tank space are aligned in the flow direction of the third fluid.

12. The heat exchanger according to claim 11, wherein the first tank space includes a first fluid collection space that collects the first fluid, and a first fluid distribution space that distributes the first fluid, the first fluid collection space and the first fluid distribution space are aligned in the stack direction of the first and second tubes, the second tank space includes a second fluid collection space that collects the second fluid, and a second fluid distribution space that distributes the second fluid, and the second fluid collection space and the second fluid distribution space are aligned in the stack direction of the first and second tubes.

13. The heat exchanger according to claim 1, wherein the first tubes are arranged in a plurality of rows in a flow direction of the third fluid, and the tank portion includes a plurality of the first tank spaces along the flow direction of the third fluid.

14. The heat exchanger according to claim 13, wherein the second fluid flowing space extends in the flow direction of the third fluid over the plurality of first tank spaces.

15. The heat exchanger according to claim 1, wherein the first fluid and the second fluid are heat media circulating in fluid circulation circuits different from each other.

16. The heat exchanger according to claim 1, wherein the heat exchanger being used as an evaporator that evaporates a refrigerant in a refrigerant cycle of a vapor compression type, wherein the first fluid is a refrigerant of the refrigerant cycle, the second fluid is a heat medium which absorbs heat of an external heat source, and the third fluid is air.

17. The heat exchanger according to claim 1, wherein the heat exchanger being applied to a vehicle cooling system, wherein the first fluid is a heat medium which absorbs heat of a first in-vehicle device that generates heat during actuation, the second fluid is a heat medium which absorbs heat of a second in-vehicle device that generates heat during actuation, and the third fluid is air.

18. A heat exchanger, comprising:

a first heat exchange portion including first tubes that have first forward tubes through which a first fluid flows in a forward direction, and first backward tubes through which the first fluid flows in a backward direction opposite to the forward direction, and the first heat exchange portion performing heat exchange between the first fluid and a third fluid flowing on peripheries of the first tubes;

a second heat exchange portion including second tubes that have second forward tubes through which a second fluid flows in the forward direction, and second backward tubes through which the second fluid flows in the backward direction, and the second heat exchange portion performing heat exchange between the second fluid and the third fluid flowing on peripheries of the second tubes;

a tank portion including a first tank space that communicates with the first tubes and performs at least one of collection of the first fluid from the first tubes and distribution of the first fluid to the first tubes;

a third fluid passage through which the third fluid flows; and an outer fin, wherein at least one of the first tubes is arranged between the second tubes, at least one of the second tubes is arranged between the first tubes, the third fluid passage is formed between the first tubes and the second tubes, the outer fin is arranged in the third fluid passage, promotes heat exchange in the first and second heat exchange portions, and enables heat transfer between the first fluid flowing through the first tubes and the second fluid flowing through the second tubes, the tank portion includes an outer wall component that configures an outer wall of the tank portion, and an intermediate plate member separating an inner space of the outer wall component into multiple spaces which are fluid-tightly separated from each other, the first tank space is one of the multiple spaces located on an opposite side of the intermediate plate member to the first tubes, the intermediate plate member is provided with communication holes through which the first tank space communicates with the first tubes, a side surface portion of the intermediate plate member is provided with a protrusion contacting a side wall portion of the outer wall component, the side surface portion other than the protrusion and the side wall portion define therebetween an air gap that is separated from the first tank space by the intermediate plate member, the side wall portion other than a portion contacting the protrusion is provided with a recess concaved toward the air gap, or a through-hole notched toward the air gap, the through-hole or the recess is formed on an end edge of the side wall portion on a side of the first tubes and extends inward of the side wall portion, in the side wall portion of the outer wall component, and a width dimension of the through-hole or the recess in the stack direction of the first and second tubes becomes smaller from the end edge of the side wall portion on the side of the first tubes inward of the side wall portion on an outer surface of the side wall portion.

19. A heat exchanger, comprising:
a first heat exchange portion including first tubes that have first forward tubes through which a first fluid flows in a forward direction, and first backward tubes through which the first fluid flows in a backward direction opposite to the forward direction, and the first heat exchange portion performing heat exchange between the first fluid and a third fluid flowing on peripheries of the first tubes;
a second heat exchange portion including second tubes that have second forward tubes through which a second fluid flows in the forward direction, and second backward tubes through which the second fluid flows in the backward direction, and the second heat exchange portion performing heat exchange between the second fluid and the third fluid flowing on peripheries of the second tubes;
a tank portion including a first tank space that communicates with the first tubes and performs at least one of collection of the first fluid from the first tubes and distribution of the first fluid to the first tubes;
a third fluid passage through which the third fluid flows; and
an outer fin, wherein
at least one of the first tubes is arranged between the second tubes,
at least one of the second tubes is arranged between the first tubes,
the third fluid passage is formed between the first tubes and the second tubes, the outer fin is arranged in the third fluid passages, promotes heat exchange in the first and second heat exchange portions, and enables heat transfer between the first fluid flowing through the first tubes and the second fluid flowing through the second tubes, the tank portion includes an outer wall component that configures an outer wall of the tank portion, and an intermediate plate member separating an inner space of the outer wall component into multiple spaces which are fluid-tightly separated from each other, the first tank space is one of the multiple spaces located at an opposite side of the intermediate plate member to the first tubes, the intermediate plate member is formed with communication holes through which the first tank space communicates with the refrigerant tubes, the intermediate plate member includes a tube side plate member and a partition plate member, the tube side plate member and the partition plate member are stacked on each other in a thickness direction of the intermediate plate member, the tube side plate member is located to be nearer to the first tubes than the partition plate member, the partition plate member is located to be nearer to the first tank space than the tube side plate member, a side surface portion of the tube side plate member is provided with a cut inward of the tube side plate member, a part of a side wall portion of the outer wall component, which corresponds to the cut, is provided with a through-hole notched toward the cut, or a recess concaved toward the cut, the through-hole or the recess is formed on an end edge of the side wall portion on a side of the first tubes and extends inward of the side wall portion, in the side wall portion of the outer wall component, and a width dimension of the through-hole or the recess in the stack direction of the first and second tubes becomes smaller from the end edge of the side wall portion on the side of the first tubes inward of the side wall portion on an outer surface of the side wall portion.

20. The heat exchanger according to claim 18, wherein
the tank portion includes therein a second fluid flowing space communicating with the second tubes,
the second fluid flowing space is partitioned from the first tank space,
the second fluid flowing space is positioned adjacent to the first tubes in the stack direction of the first and second tubes and located adjacent to a connection portion of the tank portion which is directly connected to the first tubes,
an outer wall of the tank portion includes a recess part that is recessed outward from the tank portion,
leading ends of the second tubes extend through the recess part of the outer wall of the tank portion and protrude into the second fluid flowing space,
the second fluid flowing space includes a second tube adjacent space provided inside the recess part and defined by the outer wall and a lateral surface of the leading ends of the second tubes, and
the second tube adjacent space is located between the lateral surface of the leading ends of the second tubes and the first tubes in the stack direction of the first and second tubes.

21. The heat exchanger according to claim 19, wherein
the tank portion includes therein a second fluid flowing space communicating with the second tubes, the second fluid flowing space is partitioned from the first tank space,
the second fluid flowing space is positioned adjacent to the first tubes in the stack direction of the first and second tubes and located adjacent to a connection portion of the tank portion which is directly connected to the first tubes,
an outer wall of the tank portion includes a recess part that is recessed outward from the tank portion,
leading ends of the second tubes extend through the recess part of the outer wall of the tank portion and protrude into the second fluid flowing space,
the second fluid flowing space includes a second tube adjacent space provided inside the recess part and defined by the outer wall and a lateral surface of the leading ends of the second tubes, and
the second tube adjacent space is located between the lateral surface of the leading ends of the second tubes and the first tubes in the stack direction of the first and second tubes.

* * * * *